United States Patent
Perdomo

(10) Patent No.: US 11,297,688 B2
(45) Date of Patent: Apr. 5, 2022

(54) MESH NETWORK DEPLOYMENT KIT

(71) Applicant: goTenna, Inc., Brooklyn, NY (US)

(72) Inventor: Jorge Perdomo, New York, NY (US)

(73) Assignee: GOTENNA INC., Brooklyn, NY (US)

( * ) Notice: Subject to any disclaimer, the term of this patent is extended or adjusted under 35 U.S.C. 154(b) by 0 days.

(21) Appl. No.: 17/074,594

(22) Filed: Oct. 19, 2020

(65) Prior Publication Data

US 2021/0176822 A1 Jun. 10, 2021

Related U.S. Application Data

(62) Division of application No. 16/360,874, filed on Mar. 21, 2019, now Pat. No. 10,813,169.

(60) Provisional application No. 62/646,684, filed on Mar. 22, 2018.

(51) Int. Cl.
| | |
|---|---|
| *H04W 88/08* | (2009.01) |
| *H04L 41/0806* | (2022.01) |
| *H04W 16/20* | (2009.01) |
| *H04W 84/18* | (2009.01) |
| *G06F 8/65* | (2018.01) |
| *G06F 8/61* | (2018.01) |
| *H04W 84/12* | (2009.01) |

(52) U.S. Cl.
CPC .............. *H04W 88/08* (2013.01); *G06F 8/61* (2013.01); *G06F 8/65* (2013.01); *H04L 41/0809* (2013.01); *H04W 16/20* (2013.01); *H04W 84/18* (2013.01); *H04W 84/12* (2013.01)

(58) Field of Classification Search
CPC ..... H04W 24/02; H04W 88/08; H04W 84/18; H04W 16/20; H04L 41/0809; H04L 41/082

See application file for complete search history.

(56) References Cited

U.S. PATENT DOCUMENTS

| | | |
|---|---|---|
| 6,754,192 B2 | 6/2004 | Kennedy |
| 6,763,013 B2 | 7/2004 | Kennedy |
| 6,763,014 B2 | 7/2004 | Kennedy |
| 6,850,511 B2 | 2/2005 | Kats et al. |
| 6,879,574 B2 | 4/2005 | Naghian et al. |
| 6,894,985 B2 | 5/2005 | Billhartz |
| 6,940,832 B2 | 9/2005 | Saadawi et al. |
| 6,954,435 B2 | 10/2005 | Billhartz et al. |
| 6,961,310 B2 | 11/2005 | Cain |
| 6,975,614 B2 | 12/2005 | Kennedy |
| 6,985,476 B1 | 1/2006 | Elliott et al. |
| 7,007,102 B2 | 2/2006 | Billhartz et al. |
| 7,027,426 B2 | 4/2006 | Billhartz |
| 7,058,021 B2 | 6/2006 | Srikrishna et al. |
| 7,068,600 B2 | 6/2006 | Cain |
| 7,068,605 B2 | 6/2006 | Cain et al. |
| 7,079,552 B2 | 7/2006 | Cain et al. |

(Continued)

*Primary Examiner* — Syed Ali

(74) *Attorney, Agent, or Firm* — Hoffberg & Associates; Steven M. Hoffberg

(57) ABSTRACT

A local software deployment system, comprising a server, configured to: provide an access point for a wireless network; redirect an incoming request to a web page selectively customized based on characteristics of the requestor; present an option, through the wireless network, on the customized web page, to a device connected to the server through the wireless network, to download a file from the server, selectively dependent on the customized web page; and download the file from the server.

19 Claims, 1 Drawing Sheet

(56) References Cited

U.S. PATENT DOCUMENTS

| | | |
|---|---|---|
| 7,085,290 B2 | 8/2006 | Cain et al. |
| 7,110,779 B2 | 9/2006 | Billhartz et al. |
| 7,116,661 B2 | 10/2006 | Patton |
| 7,129,890 B1 | 10/2006 | Redi et al. |
| 7,142,524 B2 | 11/2006 | Stanforth et al. |
| 7,142,866 B2 | 11/2006 | Windham et al. |
| 7,177,295 B1 | 2/2007 | Sholander et al. |
| 7,177,594 B2 | 2/2007 | Burr |
| 7,190,961 B2 | 3/2007 | Burr |
| 7,271,736 B2 | 9/2007 | Siegel et al. |
| 7,299,038 B2 | 11/2007 | Kennedy et al. |
| 7,321,777 B2 | 1/2008 | Billhartz et al. |
| 7,339,897 B2 | 3/2008 | Larsson et al. |
| 7,342,876 B2 | 3/2008 | Bellur et al. |
| 7,342,907 B2 | 3/2008 | Kim et al. |
| 7,343,244 B2 | 3/2008 | Flick |
| 7,356,329 B2 | 4/2008 | Willey et al. |
| 7,373,108 B2 | 5/2008 | Vidaillac |
| 7,382,765 B2 | 6/2008 | Kennedy et al. |
| 7,391,730 B1 | 6/2008 | Chandra et al. |
| 7,394,826 B2 | 7/2008 | Cain et al. |
| 7,417,962 B2 | 8/2008 | McBride |
| 7,447,174 B2 | 11/2008 | Joshi |
| 7,450,517 B2 | 11/2008 | Cho |
| 7,453,864 B2 | 11/2008 | Kennedy et al. |
| 7,463,612 B2 | 12/2008 | Fonseca, Jr. et al. |
| 7,468,954 B2 | 12/2008 | Sherman |
| 7,471,626 B2 | 12/2008 | Naghian et al. |
| 7,480,248 B2 | 1/2009 | Duggi et al. |
| 7,486,627 B2 | 2/2009 | Zhang et al. |
| 7,495,687 B2 | 2/2009 | DuMas et al. |
| 7,512,079 B2 | 3/2009 | Labrador et al. |
| 7,512,783 B2 | 3/2009 | Naghian et al. |
| 7,519,045 B2 | 4/2009 | Kim et al. |
| 7,522,547 B2 | 4/2009 | Lee et al. |
| 7,535,881 B2 | 5/2009 | Maekawa et al. |
| 7,542,437 B1 | 6/2009 | Redi et al. |
| 7,548,915 B2 | 6/2009 | Ramer et al. |
| 7,551,892 B1 | 6/2009 | Elliott |
| 7,554,982 B2 | 6/2009 | Nakamura et al. |
| 7,570,927 B2 | 8/2009 | Correal et al. |
| 7,573,835 B2 | 8/2009 | Sahinoglu et al. |
| 7,577,107 B2 | 8/2009 | Zhang et al. |
| 7,577,108 B2 | 8/2009 | Zhang et al. |
| 7,577,665 B2 | 8/2009 | Ramer et al. |
| 7,590,589 B2 | 9/2009 | Hoffberg |
| 7,599,665 B2 | 10/2009 | Sinivaara |
| 7,603,360 B2 | 10/2009 | Ramer et al. |
| 7,606,176 B2 | 10/2009 | Joshi et al. |
| 7,616,961 B2 | 11/2009 | Billhartz |
| 7,634,230 B2 | 12/2009 | Ji et al. |
| 7,639,681 B2 | 12/2009 | Kelly et al. |
| 7,643,509 B2 | 1/2010 | Han et al. |
| 7,644,105 B2 | 1/2010 | Huang et al. |
| 7,646,754 B2 | 1/2010 | McLaughlin et al. |
| 7,649,872 B2 | 1/2010 | Naghian et al. |
| 7,653,355 B2 | 1/2010 | Ji |
| 7,656,857 B2 | 2/2010 | Thubert et al. |
| 7,656,879 B2 | 2/2010 | Riedel et al. |
| 7,660,319 B2 | 2/2010 | Kobayashi et al. |
| 7,660,581 B2 | 2/2010 | Ramer et al. |
| 7,668,958 B2 | 2/2010 | Burr |
| 7,676,394 B2 | 3/2010 | Ramer et al. |
| 7,693,093 B2 | 4/2010 | Riedel et al. |
| 7,693,119 B2 | 4/2010 | Lee et al. |
| 7,693,167 B2 | 4/2010 | Koenck et al. |
| 7,697,456 B2 | 4/2010 | Ekl et al. |
| 7,702,318 B2 | 4/2010 | Ramer et al. |
| 7,710,870 B2 | 5/2010 | Lee et al. |
| 7,715,885 B2 | 5/2010 | Arunan et al. |
| 7,719,987 B2 | 5/2010 | Kobayashi et al. |
| 7,719,988 B1 | 5/2010 | Ruiz et al. |
| 7,719,989 B2 | 5/2010 | Yau |
| 7,733,818 B2 | 6/2010 | Twitchell, Jr. |
| 7,734,278 B2 | 6/2010 | Jayapalan et al. |
| 7,752,209 B2 | 7/2010 | Ramer et al. |
| 7,756,041 B2 | 7/2010 | Whitehill et al. |
| 7,764,617 B2 | 7/2010 | Cain et al. |
| 7,764,635 B2 | 7/2010 | Chen et al. |
| 7,769,764 B2 | 8/2010 | Ramer et al. |
| 7,778,230 B2 | 8/2010 | Fulknier et al. |
| 7,787,865 B2 | 8/2010 | Willey et al. |
| 7,788,387 B2 | 8/2010 | Kumar et al. |
| 7,801,058 B2 | 9/2010 | Wang |
| 7,813,314 B2 | 10/2010 | Fulknier et al. |
| 7,813,326 B1 | 10/2010 | Keim et al. |
| 7,822,023 B2 | 10/2010 | Lahetkangas et al. |
| 7,822,384 B2 | 10/2010 | Anschutz et al. |
| 7,822,852 B2 | 10/2010 | Qi et al. |
| 7,840,427 B2 | 11/2010 | O'Sullivan |
| 7,843,822 B1 | 11/2010 | Paul et al. |
| 7,849,139 B2 | 12/2010 | Wolfson et al. |
| 7,852,763 B2 | 12/2010 | Ghanadan et al. |
| 7,852,816 B2 | 12/2010 | Jung |
| 7,860,871 B2 | 12/2010 | Ramer et al. |
| 7,860,968 B2 | 12/2010 | Bornhoevd et al. |
| 7,865,187 B2 | 1/2011 | Ramer et al. |
| 7,876,706 B2 | 1/2011 | Ekl et al. |
| 7,877,176 B2 | 1/2011 | Reeser et al. |
| 7,881,340 B2 | 2/2011 | Farrag et al. |
| 7,881,667 B2 | 2/2011 | Ji et al. |
| 7,890,568 B2 | 2/2011 | Belenki |
| 7,898,979 B2 | 3/2011 | Isozu |
| 7,899,455 B2 | 3/2011 | Ramer et al. |
| 7,902,973 B2 | 3/2011 | Thubert et al. |
| 7,907,940 B2 | 3/2011 | Ramer et al. |
| 7,912,458 B2 | 3/2011 | Ramer et al. |
| 7,924,745 B2 | 4/2011 | Hirano et al. |
| 7,936,697 B2 | 5/2011 | Reza et al. |
| 7,944,899 B2 | 5/2011 | Nordmark et al. |
| 7,948,966 B2 | 5/2011 | Hughes et al. |
| 7,957,355 B1 | 6/2011 | Heiferling et al. |
| 7,961,626 B2 | 6/2011 | Reeve |
| 7,965,671 B2 | 6/2011 | Anderson et al. |
| 7,965,845 B2 | 6/2011 | Baldus et al. |
| 7,969,914 B1 | 6/2011 | Gerber et al. |
| 7,970,389 B2 | 6/2011 | Ramer et al. |
| 7,974,302 B2 | 7/2011 | Han et al. |
| 7,983,619 B2 | 7/2011 | Ji |
| 7,983,662 B1 | 7/2011 | Ramer et al. |
| 7,983,835 B2 | 7/2011 | Lagassey |
| 8,005,100 B2 | 8/2011 | Barrett et al. |
| 8,005,879 B2 | 8/2011 | Bornhoevd et al. |
| 8,009,648 B2 | 8/2011 | Kuliner et al. |
| 8,014,404 B2 | 9/2011 | Eki et al. |
| 8,018,840 B2 | 9/2011 | Bellur et al. |
| 8,023,425 B2 | 9/2011 | Raleigh |
| 8,027,273 B2 | 9/2011 | Nguyen |
| 8,027,879 B2 | 9/2011 | Ramer et al. |
| 8,041,717 B2 | 10/2011 | Ramer et al. |
| 8,050,675 B2 | 11/2011 | Ramer et al. |
| 8,054,762 B2 | 11/2011 | Potkonjak |
| 8,054,819 B2 | 11/2011 | Chamberlain et al. |
| 8,060,013 B1 | 11/2011 | Burr |
| 8,060,017 B2 | 11/2011 | Schlicht et al. |
| 8,060,389 B2 | 11/2011 | Johnson |
| 8,060,590 B2 | 11/2011 | Lobbert |
| 8,064,879 B2 | 11/2011 | Willey et al. |
| 8,065,411 B2 | 11/2011 | Spiess et al. |
| 8,065,419 B2 | 11/2011 | Vimpari et al. |
| 8,072,906 B2 | 12/2011 | Naghian |
| 8,072,928 B2 | 12/2011 | Sinha |
| 8,073,565 B2 | 12/2011 | Johnson |
| 8,078,139 B2 | 12/2011 | Twitchell, Jr. |
| 8,085,686 B2 | 12/2011 | Thubert et al. |
| 8,090,395 B2 | 1/2012 | Ngai et al. |
| 8,099,434 B2 | 1/2012 | Ramer et al. |
| 8,099,505 B2 | 1/2012 | Tran et al. |
| 8,103,545 B2 | 1/2012 | Ramer et al. |
| 8,115,617 B2 | 2/2012 | Thubert et al. |
| 8,121,066 B2 | 2/2012 | Monden et al. |
| 8,127,039 B2 | 2/2012 | Patton et al. |
| 8,131,271 B2 | 3/2012 | Ramer et al. |
| 8,131,737 B2 | 3/2012 | Ramer et al. |

(56) References Cited

U.S. PATENT DOCUMENTS

| | | |
|---|---|---|
| 8,131,838 B2 | 3/2012 | Bornhoevd et al. |
| 8,135,021 B2 | 3/2012 | Westphal |
| 8,139,504 B2 | 3/2012 | Mankins et al. |
| 8,144,619 B2 | 3/2012 | Hoffberg |
| 8,149,716 B2 | 4/2012 | Ramanathan et al. |
| 8,149,733 B2 | 4/2012 | Basu et al. |
| 8,150,372 B2 | 4/2012 | Orlassino |
| 8,150,835 B2 | 4/2012 | Boldyrev et al. |
| 8,155,045 B2 | 4/2012 | Sherman et al. |
| 8,155,711 B2 | 4/2012 | Deshpande et al. |
| 8,156,128 B2 | 4/2012 | Ramer et al. |
| 8,156,208 B2 | 4/2012 | Bornhoevd et al. |
| 8,165,143 B2 | 4/2012 | Samajpati |
| 8,175,585 B2 | 5/2012 | Ramer et al. |
| 8,180,332 B2 | 5/2012 | Ramer et al. |
| 8,180,352 B2 | 5/2012 | Nordmark et al. |
| 8,185,101 B1 | 5/2012 | Wiseman et al. |
| 8,190,938 B2 | 5/2012 | Nurminen et al. |
| 8,191,128 B2 | 5/2012 | Nedkov et al. |
| 8,194,541 B2 | 6/2012 | Leppanen et al. |
| 8,195,133 B2 | 6/2012 | Ramer et al. |
| 8,195,513 B2 | 6/2012 | Ramer et al. |
| 8,199,664 B2 | 6/2012 | Nakamura et al. |
| 8,200,205 B2 | 6/2012 | Ramer et al. |
| 8,201,094 B2 | 6/2012 | Wang et al. |
| 8,204,800 B2 | 6/2012 | Aarni et al. |
| 8,204,886 B2 | 6/2012 | Bickel et al. |
| 8,209,344 B2 | 6/2012 | Ramer et al. |
| 8,213,409 B2 | 7/2012 | Rudnick et al. |
| 8,218,511 B2 | 7/2012 | Prehofer et al. |
| 8,218,514 B2 | 7/2012 | Twitchell, Jr. |
| 8,219,309 B2 | 7/2012 | Nirhamo |
| 8,228,954 B2 | 7/2012 | Thubert et al. |
| 8,229,440 B2 | 7/2012 | Yoon et al. |
| 8,229,812 B2 | 7/2012 | Raleigh |
| 8,229,914 B2 | 7/2012 | Ramer et al. |
| 8,238,288 B2 | 8/2012 | Ahn |
| 8,238,888 B2 | 8/2012 | Ramer et al. |
| 8,243,639 B2 | 8/2012 | Fonseca, Jr. et al. |
| 8,244,246 B2 | 8/2012 | Gandhi et al. |
| 8,245,315 B2 | 8/2012 | Cassett et al. |
| 8,250,207 B2 | 8/2012 | Raleigh |
| 8,255,469 B2 | 8/2012 | Leppanen et al. |
| 8,255,716 B2 | 8/2012 | Mandyam |
| 8,266,551 B2 | 9/2012 | Boldyrev et al. |
| 8,270,310 B2 | 9/2012 | Raleigh |
| 8,270,952 B2 | 9/2012 | Raleigh |
| 8,270,955 B2 | 9/2012 | Ramer et al. |
| 8,271,433 B2 | 9/2012 | Boldyrev et al. |
| 8,280,308 B2 | 10/2012 | Anschutz et al. |
| 8,280,345 B2 | 10/2012 | Twitchell, Jr. |
| 8,285,859 B2 | 10/2012 | Boldyrev et al. |
| 8,290,516 B2 | 10/2012 | Chandra et al. |
| 8,290,810 B2 | 10/2012 | Ramer et al. |
| 8,290,952 B2 | 10/2012 | Manea |
| 8,296,184 B2 | 10/2012 | Ramer et al. |
| 8,296,408 B2 | 10/2012 | Anke et al. |
| 8,296,413 B2 | 10/2012 | Bornhoevd et al. |
| 8,300,615 B2 | 10/2012 | Copeland et al. |
| 8,301,125 B2 | 10/2012 | Ramer et al. |
| 8,301,838 B2 | 10/2012 | Grigoriev et al. |
| 8,302,030 B2 | 10/2012 | Soroca et al. |
| 8,311,888 B2 | 11/2012 | Ramer et al. |
| 8,315,791 B2 | 11/2012 | Bales et al. |
| 8,316,031 B2 | 11/2012 | Ramer et al. |
| 8,320,879 B2 | 11/2012 | Willey et al. |
| 8,321,228 B2 | 11/2012 | Chipchase et al. |
| 8,321,526 B2 | 11/2012 | Raleigh |
| 8,321,587 B2 | 11/2012 | Burr |
| 8,325,612 B1 | 12/2012 | Ruiz et al. |
| 8,326,958 B1 | 12/2012 | Raleigh |
| 8,331,901 B2 | 12/2012 | Raleigh |
| 8,332,397 B2 | 12/2012 | Ramer et al. |
| 8,332,624 B2 | 12/2012 | Sovio et al. |
| 8,335,522 B2 | 12/2012 | Mate et al. |
| 8,335,819 B2 | 12/2012 | Fu |
| 8,335,989 B2 | 12/2012 | Barraclough et al. |
| 8,335,990 B2 | 12/2012 | Arrasvuori |
| 8,340,666 B2 | 12/2012 | Ramer et al. |
| 8,341,185 B2 | 12/2012 | Sathish |
| 8,341,196 B2 | 12/2012 | Immonen et al. |
| 8,341,279 B2 | 12/2012 | Thubert et al. |
| 8,341,289 B2 | 12/2012 | Hellhake et al. |
| 8,346,210 B2 | 1/2013 | Balsan et al. |
| 8,346,915 B2 | 1/2013 | Kies et al. |
| 8,351,861 B2 | 1/2013 | Min et al. |
| 8,351,884 B2 | 1/2013 | Posti et al. |
| 8,351,898 B2 | 1/2013 | Raleigh |
| 8,351,933 B2 | 1/2013 | Ramer et al. |
| 8,355,337 B2 | 1/2013 | Raleigh |
| 8,355,410 B2 | 1/2013 | Hall |
| 8,359,019 B2 | 1/2013 | Ramer et al. |
| 8,363,662 B2 | 1/2013 | Thubert et al. |
| 8,364,521 B2 | 1/2013 | Ramer et al. |
| 8,364,540 B2 | 1/2013 | Soroca et al. |
| 8,369,242 B2 | 2/2013 | Potkonjak |
| 8,370,863 B2 | 2/2013 | Grigoriev et al. |
| 8,374,170 B2 | 2/2013 | Wu |
| 8,385,240 B2 | 2/2013 | Krishnaswamy |
| 8,385,916 B2 | 2/2013 | Raleigh |
| 8,386,715 B2 | 2/2013 | Fischer |
| 8,391,401 B2 | 3/2013 | Wang et al. |
| 8,392,541 B2 | 3/2013 | Agarwal et al. |
| 8,396,458 B2 | 3/2013 | Raleigh |
| 8,396,788 B2 | 3/2013 | Anke |
| 8,401,191 B2 | 3/2013 | Chen et al. |
| 8,401,560 B2 | 3/2013 | Potkonjak |
| 8,401,572 B2 | 3/2013 | Chandra et al. |
| 8,401,934 B2 | 3/2013 | Boldyrev et al. |
| 8,406,153 B2 | 3/2013 | Vasseur et al. |
| 8,406,733 B2 | 3/2013 | Raleigh |
| 8,407,351 B2 | 3/2013 | Fu |
| 8,411,567 B2 | 4/2013 | Wong et al. |
| 8,411,590 B2 | 4/2013 | Wang |
| 8,412,185 B2 | 4/2013 | Cader et al. |
| 8,422,957 B2 | 4/2013 | Ji |
| 8,423,508 B2 | 4/2013 | Price et al. |
| 8,427,508 B2 | 4/2013 | Mattila et al. |
| 8,429,398 B2 | 4/2013 | Strandell |
| 8,433,297 B2 | 4/2013 | Ramer et al. |
| 8,437,271 B2 | 5/2013 | Raleigh |
| 8,441,989 B2 | 5/2013 | Raleigh |
| 8,442,549 B2 | 5/2013 | Niranjan et al. |
| 8,447,849 B2 | 5/2013 | Shaffer et al. |
| 8,447,974 B2 | 5/2013 | Boldyrev et al. |
| 8,451,744 B2 | 5/2013 | Vasseur |
| 8,452,572 B2 | 5/2013 | Vasseur et al. |
| 8,452,784 B2 | 5/2013 | Arrasvuori |
| 8,452,858 B2 | 5/2013 | Wu et al. |
| 8,457,067 B2 | 6/2013 | Rezaiifar et al. |
| 8,457,607 B2 | 6/2013 | Ramer et al. |
| 8,457,653 B2 | 6/2013 | Ledlie |
| 8,458,799 B2 | 6/2013 | Fu et al. |
| 8,463,249 B2 | 6/2013 | Ramer et al. |
| 8,467,312 B2 | 6/2013 | Raleigh |
| 8,467,774 B2 | 6/2013 | Ramer et al. |
| 8,472,348 B2 | 6/2013 | Hui et al. |
| 8,478,667 B2 | 7/2013 | Raleigh |
| 8,478,812 B2 | 7/2013 | Oliver et al. |
| 8,479,107 B2 | 7/2013 | Vainio et al. |
| 8,483,671 B2 | 7/2013 | Ramer et al. |
| 8,483,674 B2 | 7/2013 | Ramer et al. |
| 8,484,234 B2 | 7/2013 | Ramer et al. |
| 8,484,661 B2 | 7/2013 | Walsh |
| 8,488,589 B2 | 7/2013 | Rudnick et al. |
| 8,488,783 B2 | 7/2013 | Sovio et al. |
| 8,489,077 B2 | 7/2013 | Ramer et al. |
| 8,489,600 B2 | 7/2013 | Hannuksela |
| 8,489,669 B2 | 7/2013 | Johnson |
| 8,489,765 B2 | 7/2013 | Vasseur et al. |
| 8,490,075 B2 | 7/2013 | Waris et al. |
| 8,490,151 B2 | 7/2013 | Boldyrev et al. |
| 8,493,407 B2 | 7/2013 | Arrasvuori |
| 8,494,500 B2 | 7/2013 | Ramer et al. |

(56) References Cited

U.S. PATENT DOCUMENTS

| | | |
|---|---|---|
| 8,498,224 B2 | 7/2013 | Thubert et al. |
| 8,498,416 B2 | 7/2013 | Otte et al. |
| 8,503,309 B2 | 8/2013 | Vasseur et al. |
| 8,503,363 B2 | 8/2013 | Fulknier et al. |
| 8,503,995 B2 | 8/2013 | Ramer et al. |
| 8,504,285 B2 | 8/2013 | Vepsalainen |
| 8,508,471 B2 | 8/2013 | Suh |
| 8,509,088 B2 | 8/2013 | Kondo |
| 8,509,180 B2 | 8/2013 | Maheshwari et al. |
| 8,509,750 B2 | 8/2013 | Ramer et al. |
| 8,510,025 B2 | 8/2013 | Chan et al. |
| 8,514,829 B2 | 8/2013 | Sun et al. |
| 8,515,400 B2 | 8/2013 | Ramer et al. |
| 8,515,401 B2 | 8/2013 | Ramer et al. |
| 8,515,409 B2 | 8/2013 | Ramo et al. |
| 8,516,552 B2 | 8/2013 | Raleigh |
| 8,520,606 B2 | 8/2013 | Cleveland |
| 8,520,676 B2 | 8/2013 | Shaffer et al. |
| 8,521,887 B2 | 8/2013 | Tran et al. |
| 8,522,341 B2 | 8/2013 | Nochta et al. |
| 8,527,584 B2 | 9/2013 | Sathish |
| 8,527,622 B2 | 9/2013 | Moreira Sa de Souza |
| 8,531,986 B2 | 9/2013 | Raleigh |
| 8,532,633 B2 | 9/2013 | Ramer et al. |
| 8,532,634 B2 | 9/2013 | Ramer et al. |
| 8,538,678 B2 | 9/2013 | Arrasvuori et al. |
| 8,538,812 B2 | 9/2013 | Ramer et al. |
| 8,543,143 B2 | 9/2013 | Chandra et al. |
| 8,543,532 B2 | 9/2013 | Sathish et al. |
| 8,543,665 B2 | 9/2013 | Ansari et al. |
| 8,543,917 B2 | 9/2013 | Ketola et al. |
| 8,547,232 B2 | 10/2013 | Boldyrev et al. |
| 8,547,872 B2 | 10/2013 | Raleigh |
| 8,547,875 B2 | 10/2013 | Adams et al. |
| 8,549,010 B2 | 10/2013 | Oikarinen |
| 8,553,688 B2 | 10/2013 | Vasseur et al. |
| 8,553,728 B2 | 10/2013 | Tu et al. |
| 8,554,131 B2 | 10/2013 | Lee et al. |
| 8,554,192 B2 | 10/2013 | Ramer et al. |
| 8,554,251 B2 | 10/2013 | Bhattacharjee et al. |
| 8,555,349 B2 | 10/2013 | Simula et al. |
| 8,559,442 B2 | 10/2013 | Vasseur et al. |
| 8,560,537 B2 | 10/2013 | Ramer et al. |
| 8,566,020 B2 | 10/2013 | Arrasvuori |
| 8,570,892 B2 | 10/2013 | Ghanadan et al. |
| 8,570,908 B2 | 10/2013 | Raleigh |
| 8,571,004 B2 | 10/2013 | Chamberlain et al. |
| 8,571,467 B2 | 10/2013 | Uusitalo et al. |
| 8,571,519 B2 | 10/2013 | Ginzboorg |
| 8,576,184 B2 | 11/2013 | Arrasvuori et al. |
| 8,576,846 B2 | 11/2013 | Kumar et al. |
| 8,578,015 B2 | 11/2013 | Billhartz |
| 8,578,054 B2 | 11/2013 | Thubert et al. |
| 8,582,593 B2 | 11/2013 | Chen et al. |
| 8,583,089 B2 | 11/2013 | Ramer et al. |
| 8,583,781 B2 | 11/2013 | Raleigh |
| 8,583,978 B2 | 11/2013 | Shaffer et al. |
| 8,588,108 B2 | 11/2013 | Vasseur et al. |
| 8,588,110 B2 | 11/2013 | Raleigh |
| 8,588,126 B2 | 11/2013 | Blair et al. |
| 8,593,253 B2 | 11/2013 | Iyer et al. |
| 8,593,255 B2 | 11/2013 | Pang et al. |
| 8,593,331 B2 | 11/2013 | Tsai et al. |
| 8,593,986 B2 | 11/2013 | Vasseur et al. |
| 8,594,625 B2 | 11/2013 | Plymoth et al. |
| 8,595,359 B2 | 11/2013 | Shaffer et al. |
| 8,599,014 B2 | 12/2013 | Prykari et al. |
| 8,600,402 B2 | 12/2013 | Mate et al. |
| 8,600,619 B2 | 12/2013 | Bales et al. |
| 8,600,830 B2 | 12/2013 | Hoffberg |
| 8,601,137 B2 | 12/2013 | Kong et al. |
| 8,601,380 B2 | 12/2013 | Vaittinen et al. |
| 8,606,329 B2 | 12/2013 | Yu et al. |
| 8,606,499 B2 | 12/2013 | Li et al. |
| 8,612,583 B2 | 12/2013 | Hui et al. |
| 8,615,505 B2 | 12/2013 | Ramer et al. |
| 8,615,551 B2 | 12/2013 | Balandin et al. |
| 8,615,719 B2 | 12/2013 | Ramer et al. |
| 8,619,576 B2 | 12/2013 | Vasseur et al. |
| 8,619,789 B2 | 12/2013 | Hui et al. |
| 8,620,285 B2 | 12/2013 | Ramer et al. |
| 8,621,203 B2 | 12/2013 | Ekberg et al. |
| 8,621,563 B2 | 12/2013 | Sathish |
| 8,621,656 B2 | 12/2013 | Miettinen et al. |
| 8,625,544 B2 | 1/2014 | Kats et al. |
| 8,626,736 B2 | 1/2014 | Ramer et al. |
| 8,627,092 B2 | 1/2014 | Fischer et al. |
| 8,630,177 B2 | 1/2014 | Vasseur et al. |
| 8,630,192 B2 | 1/2014 | Raleigh |
| 8,630,275 B2 | 1/2014 | Ji et al. |
| 8,630,291 B2 | 1/2014 | Shaffer et al. |
| 8,630,611 B2 | 1/2014 | Raleigh |
| 8,631,018 B2 | 1/2014 | Ramer et al. |
| 8,631,102 B2 | 1/2014 | Raleigh |
| 8,631,436 B2 | 1/2014 | Arrasvuori et al. |
| 8,634,348 B2 | 1/2014 | Vogedes et al. |
| 8,635,678 B2 | 1/2014 | Raleigh |
| 8,639,811 B2 | 1/2014 | Raleigh |
| 8,639,935 B2 | 1/2014 | Raleigh |
| 8,640,198 B2 | 1/2014 | Raleigh |
| 8,655,891 B2 | 2/2014 | Ramer et al. |
| 8,660,891 B2 | 2/2014 | Ramer et al. |
| 8,666,364 B2 | 3/2014 | Raleigh |
| 8,666,376 B2 | 3/2014 | Ramer et al. |
| 8,667,571 B2 | 3/2014 | Raleigh |
| 8,675,507 B2 | 3/2014 | Raleigh |
| 8,688,088 B2 | 4/2014 | Ramer et al. |
| 8,688,099 B2 | 4/2014 | Raleigh |
| 8,688,671 B2 | 4/2014 | Ramer et al. |
| 8,695,073 B2 | 4/2014 | Raleigh |
| 8,712,395 B2 | 4/2014 | Ramer et al. |
| 8,713,589 B2 | 4/2014 | Menezes et al. |
| 8,713,630 B2 | 4/2014 | Raleigh |
| 8,718,617 B2 | 5/2014 | Ramer et al. |
| 8,724,554 B2 | 5/2014 | Raleigh |
| 8,725,126 B2 | 5/2014 | Ramer et al. |
| 8,737,957 B2 | 5/2014 | Raleigh |
| 8,737,972 B2 | 5/2014 | Ramer et al. |
| 8,744,485 B2 | 6/2014 | Potkonjak |
| 8,745,121 B2 | 6/2014 | Boldyrev et al. |
| 8,750,167 B2 | 6/2014 | Waheed |
| 8,750,845 B2 | 6/2014 | Iwuchukwu |
| 8,751,159 B2 | 6/2014 | Hall |
| 8,751,644 B2 | 6/2014 | Bornhoevd et al. |
| 8,755,776 B2 | 6/2014 | Ramer et al. |
| 8,756,002 B2 | 6/2014 | Sathish |
| 8,756,173 B2 | 6/2014 | Hunzinger et al. |
| 8,756,449 B2 | 6/2014 | Shaffer et al. |
| 8,761,285 B2 | 6/2014 | Addepalli et al. |
| 8,762,276 B2 | 6/2014 | Lepisto et al. |
| 8,768,319 B2 | 7/2014 | Ramer et al. |
| 8,768,865 B2 | 7/2014 | Narayanan et al. |
| 8,769,125 B2 | 7/2014 | Fu |
| 8,769,320 B2 | 7/2014 | Mandyam |
| 8,774,050 B2 | 7/2014 | Vasseur et al. |
| 8,774,147 B2 | 7/2014 | Corinella et al. |
| 8,774,777 B2 | 7/2014 | Ramer et al. |
| 8,777,752 B2 | 7/2014 | Hall |
| 8,780,136 B2 | 7/2014 | Mattila et al. |
| 8,780,953 B2 | 7/2014 | Shaffer et al. |
| 8,781,392 B2 | 7/2014 | Viswanath |
| 8,782,309 B2 | 7/2014 | Pugsley et al. |
| 8,787,392 B2 | 7/2014 | Vasseur et al. |
| 8,788,369 B2 | 7/2014 | Puura et al. |
| 8,789,204 B2 | 7/2014 | Helander et al. |
| 8,792,860 B2 | 7/2014 | Willey et al. |
| 8,797,878 B1 | 8/2014 | Ruiz et al. |
| 8,797,908 B2 | 8/2014 | Raleigh |
| 8,798,592 B2 | 8/2014 | Ramer et al. |
| 8,798,594 B2 | 8/2014 | Ramer et al. |
| 8,798,595 B2 | 8/2014 | Ramer et al. |
| 8,798,634 B2 | 8/2014 | Yoon et al. |
| 8,799,228 B2 | 8/2014 | Pan et al. |
| 8,799,451 B2 | 8/2014 | Raleigh |

(56) References Cited

U.S. PATENT DOCUMENTS

| | | |
|---|---|---|
| 8,799,510 B2 | 8/2014 | Vasseur et al. |
| 8,800,010 B2 | 8/2014 | Hui et al. |
| 8,803,089 B2 | 8/2014 | Walerow et al. |
| 8,803,661 B2 | 8/2014 | Kaaja et al. |
| 8,805,339 B2 | 8/2014 | Ramer et al. |
| 8,805,598 B2 | 8/2014 | Shaffer et al. |
| 8,806,633 B2 | 8/2014 | Shaffer et al. |
| 8,810,368 B2 | 8/2014 | Sovio et al. |
| 8,811,514 B2 | 8/2014 | Huang et al. |
| 8,811,942 B2 | 8/2014 | Luoma et al. |
| 8,812,228 B2 | 8/2014 | Konig |
| 8,812,232 B2 | 8/2014 | Nurminen et al. |
| 8,812,499 B2 | 8/2014 | Sathish et al. |
| 8,812,526 B2 | 8/2014 | Ramer et al. |
| 8,812,688 B2 | 8/2014 | Luukkala et al. |
| 8,812,990 B2 | 8/2014 | Reponen et al. |
| 8,816,845 B2 | 8/2014 | Hoover et al. |
| 8,817,665 B2 | 8/2014 | Thubert et al. |
| 8,818,025 B2 | 8/2014 | Salminen et al. |
| 8,818,331 B2 | 8/2014 | Mohammed et al. |
| 8,818,396 B2 | 8/2014 | Fok et al. |
| 8,818,397 B2 | 8/2014 | Shikowitz et al. |
| 8,818,927 B2 | 8/2014 | Ruf et al. |
| 8,819,191 B2 | 8/2014 | Hui et al. |
| 8,819,659 B2 | 8/2014 | Ramer et al. |
| 8,821,293 B2 | 9/2014 | Hall |
| 8,832,100 B2 | 9/2014 | Ramer et al. |
| 8,839,387 B2 | 9/2014 | Raleigh |
| 8,839,388 B2 | 9/2014 | Raleigh |
| 8,843,395 B2 | 9/2014 | Ramer et al. |
| 8,843,396 B2 | 9/2014 | Ramer et al. |
| 8,849,246 B2 | 9/2014 | Daigle |
| 8,867,575 B2 | 10/2014 | Mohammed et al. |
| 8,886,162 B2 | 11/2014 | Raleigh |
| 8,897,743 B2 | 11/2014 | Raleigh |
| 8,897,744 B2 | 11/2014 | Raleigh |
| 8,898,079 B2 | 11/2014 | Raleigh |
| 8,903,452 B2 | 12/2014 | Raleigh |
| 8,903,962 B2 | 12/2014 | Wu et al. |
| 8,924,549 B2 | 12/2014 | Raleigh |
| 8,930,233 B2 | 1/2015 | Johnson |
| 8,958,773 B2 | 2/2015 | Mohammed et al. |
| 8,958,779 B2 | 2/2015 | Ramer et al. |
| 8,984,059 B2 | 3/2015 | Johnson |
| 8,989,718 B2 | 3/2015 | Ramer et al. |
| 8,995,968 B2 | 3/2015 | Ramer et al. |
| 8,995,973 B2 | 3/2015 | Ramer et al. |
| 8,995,998 B2 | 3/2015 | Singh et al. |
| 8,996,666 B2 | 3/2015 | Vasseur |
| 8,996,688 B2 | 3/2015 | Arrasvuori |
| 8,996,693 B2 | 3/2015 | Boldyrev et al. |
| 9,000,917 B1 | 4/2015 | Meyers |
| 9,001,645 B2 | 4/2015 | Hellhake et al. |
| 9,001,669 B2 | 4/2015 | Vasseur et al. |
| 9,001,676 B2 | 4/2015 | Hui et al. |
| 9,001,806 B2 | 4/2015 | Segev et al. |
| 9,001,914 B2 | 4/2015 | Ruan et al. |
| 9,002,006 B2 | 4/2015 | Chen et al. |
| 9,003,488 B2 | 4/2015 | Spencer et al. |
| 9,008,092 B2 | 4/2015 | Thubert et al. |
| 9,008,693 B2 | 4/2015 | Boldyrev et al. |
| 9,008,709 B2 | 4/2015 | Bajko |
| 9,009,810 B2 | 4/2015 | Grigoriev et al. |
| 9,013,983 B2 | 4/2015 | Vasseur et al. |
| 9,014,026 B2 | 4/2015 | Raleigh |
| 9,014,640 B2 | 4/2015 | Krishnaswamy et al. |
| 9,014,914 B2 | 4/2015 | Beaurepaire et al. |
| 9,014,977 B2 | 4/2015 | Beaurepaire et al. |
| 9,015,126 B2 | 4/2015 | Rambacher et al. |
| 9,015,228 B2 | 4/2015 | Sainio et al. |
| 9,019,846 B2 | 4/2015 | Shaffer et al. |
| 9,020,008 B2 | 4/2015 | Hui et al. |
| 9,020,697 B2 | 4/2015 | Ricci et al. |
| 9,025,607 B2 | 5/2015 | Zeger et al. |
| 9,025,767 B2 | 5/2015 | Sovio et al. |
| 9,026,609 B2 | 5/2015 | Oliver et al. |
| 9,030,939 B2 | 5/2015 | Hui et al. |
| 9,031,986 B2 | 5/2015 | Ramer et al. |
| 9,032,053 B2 | 5/2015 | Kosuru et al. |
| 9,037,127 B2 | 5/2015 | Raleigh |
| 9,037,896 B2 | 5/2015 | Addepalli et al. |
| 9,038,197 B2 | 5/2015 | Boldyrev et al. |
| 9,042,816 B2 | 5/2015 | Frankland |
| 9,043,260 B2 | 5/2015 | Athas et al. |
| 9,043,323 B2 | 5/2015 | Kalra et al. |
| 9,043,478 B2 | 5/2015 | Burns et al. |
| 9,046,376 B2 | 6/2015 | Tuukkanen |
| 9,047,766 B2 | 6/2015 | Tuukkanen et al. |
| 9,049,605 B2 | 6/2015 | Mate et al. |
| 9,049,628 B2 | 6/2015 | Swaminathan et al. |
| 9,052,208 B2 | 6/2015 | Blom et al. |
| 9,054,750 B2 | 6/2015 | Hillan |
| 9,055,020 B2 | 6/2015 | Miettinen et al. |
| 9,055,105 B2 | 6/2015 | Leppanen et al. |
| 9,055,425 B2 | 6/2015 | Luukkala et al. |
| 9,055,435 B2 | 6/2015 | Ekberg et al. |
| 9,055,596 B2 | 6/2015 | Pankaj et al. |
| 9,058,406 B2 | 6/2015 | Soroca et al. |
| 9,059,929 B2 | 6/2015 | Sudhaakar et al. |
| 9,059,942 B2 | 6/2015 | Boldyrev et al. |
| 9,063,165 B2 | 6/2015 | Valentino et al. |
| 9,066,221 B2 | 6/2015 | Lee |
| 9,068,839 B2 | 6/2015 | Mattila |
| 9,069,575 B2 | 6/2015 | Mandyam et al. |
| 9,071,451 B2 | 6/2015 | Hall |
| 9,071,533 B2 | 6/2015 | Hui et al. |
| 9,072,100 B2 | 6/2015 | Vasseur et al. |
| 9,075,146 B1 | 7/2015 | Valentino et al. |
| 9,075,801 B2 | 7/2015 | Eggert |
| 9,076,009 B2 | 7/2015 | Sathish et al. |
| 9,076,175 B2 | 7/2015 | Ramer et al. |
| 9,077,772 B2 | 7/2015 | Hui et al. |
| 9,078,091 B2 | 7/2015 | Lehtiniemi et al. |
| 9,078,121 B2 | 7/2015 | Georgescu et al. |
| 9,079,311 B2 | 7/2015 | Wang et al. |
| 9,081,567 B1 | 7/2015 | Mahamuni et al. |
| 9,082,239 B2 | 7/2015 | Ricci |
| 9,083,627 B2 | 7/2015 | Vasseur et al. |
| 9,087,284 B2 | 7/2015 | Luong |
| 9,087,412 B2 | 7/2015 | Fulks et al. |
| 9,088,493 B2 | 7/2015 | Ahola |
| 9,088,624 B2 | 7/2015 | Grigoriev |
| 9,088,643 B2 | 7/2015 | Maguire et al. |
| 9,088,983 B2 | 7/2015 | Hui et al. |
| 9,090,295 B2 | 7/2015 | Lagassey |
| 9,093,021 B2 | 7/2015 | Chen et al. |
| 9,094,049 B2 | 7/2015 | Hillan et al. |
| 9,094,324 B2 | 7/2015 | Vasseur et al. |
| 9,094,538 B2 | 7/2015 | Mohammed et al. |
| 9,094,781 B2 | 7/2015 | Wang et al. |
| 9,094,853 B2 | 7/2015 | Ghanadan et al. |
| 9,097,551 B2 | 8/2015 | Dorum et al. |
| 9,098,420 B2 | 8/2015 | Bulut et al. |
| 9,100,305 B2 | 8/2015 | Hui et al. |
| 9,100,772 B2 | 8/2015 | Jantunen et al. |
| 9,100,793 B2 | 8/2015 | Johnson |
| 9,100,918 B2 | 8/2015 | Ruvalcaba et al. |
| 9,100,989 B2 | 8/2015 | Ray et al. |
| 9,102,330 B2 | 8/2015 | Beaurepaire et al. |
| 9,103,694 B2 | 8/2015 | Ozturk |
| 9,103,920 B2 | 8/2015 | Valentino et al. |
| 9,105,053 B2 | 8/2015 | Cao et al. |
| 9,106,268 B2 | 8/2015 | Luong et al. |
| 9,106,555 B2 | 8/2015 | Agarwal et al. |
| 9,106,672 B2 | 8/2015 | Zhang et al. |
| 9,106,768 B2 | 8/2015 | Mohammed et al. |
| 9,107,058 B2 | 8/2015 | Inha et al. |
| 9,109,915 B2 | 8/2015 | Letz |
| 9,110,556 B2 | 8/2015 | Kozitsyn et al. |
| 9,110,685 B2 | 8/2015 | Suryanarayana et al. |
| 9,110,939 B2 | 8/2015 | Pfeifle et al. |
| 9,110,996 B2 | 8/2015 | Ramer et al. |
| 9,112,541 B2 | 8/2015 | Hillan et al. |
| 9,112,649 B2 | 8/2015 | Geng et al. |

(56) References Cited

U.S. PATENT DOCUMENTS

| | | |
|---|---|---|
| 9,112,805 B2 | 8/2015 | Hui et al. |
| 9,112,861 B2 | 8/2015 | Menezes et al. |
| 9,112,871 B2 | 8/2015 | Borzsei et al. |
| 9,113,284 B2 | 8/2015 | Hillan et al. |
| 9,113,371 B2 | 8/2015 | Sun et al. |
| 9,113,373 B2 | 8/2015 | Hillan |
| 9,115,989 B2 | 8/2015 | Valentino et al. |
| 9,117,203 B2 | 8/2015 | Reilly et al. |
| 9,118,539 B2 | 8/2015 | Vasseur et al. |
| 9,118,699 B2 | 8/2015 | Haddad et al. |
| 9,119,130 B2 | 8/2015 | Hui et al. |
| 9,122,532 B2 | 9/2015 | Kosuru et al. |
| 9,122,693 B2 | 9/2015 | Blom et al. |
| 9,122,702 B2 | 9/2015 | Biswas et al. |
| 9,123,078 B2 | 9/2015 | Ugur et al. |
| 9,123,186 B2 | 9/2015 | Ricci |
| 9,124,304 B2 | 9/2015 | Hillan |
| 9,124,403 B2 | 9/2015 | Rafique et al. |
| 9,124,482 B2 | 9/2015 | Vasseur et al. |
| 9,125,066 B2 | 9/2015 | Potkonjak |
| 9,125,211 B2 | 9/2015 | Yang et al. |
| 9,128,689 B2 | 9/2015 | Shaffer et al. |
| 9,129,225 B2 | 9/2015 | Sathish |
| 9,129,333 B2 | 9/2015 | Hardie et al. |
| 9,130,863 B2 | 9/2015 | Vasseur et al. |
| 9,131,441 B2 | 9/2015 | Singhal et al. |
| 9,132,913 B1 | 9/2015 | Shapiro et al. |
| 9,135,664 B2 | 9/2015 | Grassel et al. |
| 9,137,739 B2 | 9/2015 | Raleigh |
| 9,141,618 B2 | 9/2015 | Boldyrev et al. |
| 9,143,456 B2 | 9/2015 | Shaffer et al. |
| 9,143,897 B2 | 9/2015 | Kuramura et al. |
| 9,143,912 B2 | 9/2015 | Leppanen |
| 9,143,975 B2 | 9/2015 | Ghanadan et al. |
| 9,144,003 B2 | 9/2015 | Radulescu et al. |
| 9,148,280 B2 | 9/2015 | Schultz |
| 9,148,373 B2 | 9/2015 | Kahng et al. |
| 9,154,370 B2 | 10/2015 | Hui et al. |
| 9,154,407 B2 | 10/2015 | Hui et al. |
| 9,154,964 B2 | 10/2015 | Potkonjak |
| 9,154,982 B2 | 10/2015 | Chan et al. |
| 9,155,068 B2 | 10/2015 | Takala et al. |
| 9,159,167 B2 | 10/2015 | Tuukkanen |
| 9,160,760 B2 | 10/2015 | Vasseur et al. |
| 9,161,158 B2 | 10/2015 | Hall |
| 9,161,257 B2 | 10/2015 | Ghanadan et al. |
| 9,166,845 B2 | 10/2015 | Hui et al. |
| 9,166,908 B2 | 10/2015 | Vasseur |
| 9,166,953 B2 | 10/2015 | Luukkala et al. |
| 9,167,012 B2 | 10/2015 | Joshi |
| 9,167,426 B2 | 10/2015 | Krishnaswamy et al. |
| 9,168,656 B1 | 10/2015 | Wang et al. |
| 9,168,882 B1 | 10/2015 | Mirza et al. |
| 9,171,110 B2 | 10/2015 | Deindl et al. |
| 9,171,451 B2 | 10/2015 | Blom et al. |
| 9,172,613 B2 | 10/2015 | Hui et al. |
| 9,172,636 B2 | 10/2015 | Agarwal et al. |
| 9,173,104 B2 | 10/2015 | Raleigh |
| 9,176,832 B2 | 11/2015 | Vasseur et al. |
| 9,176,924 B2 | 11/2015 | Ricci |
| 9,178,772 B2 | 11/2015 | Dasgupta et al. |
| 9,179,232 B2 | 11/2015 | Jarske et al. |
| 9,179,308 B2 | 11/2015 | Raleigh |
| 9,179,315 B2 | 11/2015 | Raleigh |
| 9,179,316 B2 | 11/2015 | Raleigh |
| 9,179,353 B2 | 11/2015 | Ghanadan et al. |
| 9,179,367 B2 | 11/2015 | Krishnaswamy et al. |
| 9,182,965 B2 | 11/2015 | Khushraj |
| 9,183,552 B2 | 11/2015 | Kauniskangas et al. |
| 9,183,560 B2 | 11/2015 | Abelow |
| 9,185,521 B2 | 11/2015 | Leppanen et al. |
| 9,188,451 B2 | 11/2015 | Magnusson et al. |
| 9,193,367 B2 | 11/2015 | Hilleary |
| 9,195,864 B2 | 11/2015 | Simmons, Jr. |
| 9,195,980 B2 | 11/2015 | Puura et al. |
| 9,195,993 B2 | 11/2015 | Ramer et al. |
| 9,196,087 B2 | 11/2015 | Kaatz et al. |
| 9,197,380 B2 | 11/2015 | Shetty et al. |
| 9,197,618 B2 | 11/2015 | Montgomery |
| 9,198,117 B2 | 11/2015 | Raleigh |
| 9,198,203 B2 | 11/2015 | Shaffer et al. |
| 9,201,701 B2 | 12/2015 | Boldyrev et al. |
| 9,201,974 B2 | 12/2015 | Arrasvuori et al. |
| 9,201,979 B2 | 12/2015 | Ramer et al. |
| 9,203,609 B2 | 12/2015 | Ekberg et al. |
| 9,203,840 B2 | 12/2015 | Spencer et al. |
| 9,204,374 B2 | 12/2015 | Raleigh |
| 9,207,327 B2 | 12/2015 | Lewis-Evans et al. |
| 9,207,843 B2 | 12/2015 | Mishra |
| 9,210,045 B2 | 12/2015 | Shaffer et al. |
| 9,210,232 B2 | 12/2015 | Strandell et al. |
| 9,210,589 B2 | 12/2015 | Panta et al. |
| 9,214,988 B2 | 12/2015 | Hillan et al. |
| 9,215,638 B2 | 12/2015 | Singh et al. |
| 9,215,685 B2 | 12/2015 | Gupta et al. |
| 9,218,216 B2 | 12/2015 | Vasseur et al. |
| 9,218,381 B2 | 12/2015 | Joshi et al. |
| 9,218,605 B2 | 12/2015 | Sathish et al. |
| 9,219,682 B2 | 12/2015 | Vasseur et al. |
| 9,220,062 B2 | 12/2015 | Lonnfors et al. |
| 9,223,481 B2 | 12/2015 | Dawson |
| 9,223,859 B2 | 12/2015 | Manera et al. |
| 9,223,878 B2 | 12/2015 | Ramer et al. |
| 9,225,589 B2 | 12/2015 | Hui et al. |
| 9,225,616 B2 | 12/2015 | Vasseur et al. |
| 9,225,688 B2 | 12/2015 | Biswas et al. |
| 9,225,760 B2 | 12/2015 | Ralston et al. |
| 9,226,218 B2 | 12/2015 | Ji |
| 9,226,339 B2 | 12/2015 | Soliman |
| 9,228,843 B2 | 1/2016 | Rangarajan et al. |
| 9,229,946 B2 | 1/2016 | Saadat |
| 9,229,955 B2 | 1/2016 | Salminen et al. |
| 9,230,104 B2 | 1/2016 | Vasseur et al. |
| 9,231,850 B2 | 1/2016 | Agarwal et al. |
| 9,231,965 B1 | 1/2016 | Vasseur et al. |
| 9,231,977 B2 | 1/2016 | Biswas et al. |
| 9,232,352 B2 | 1/2016 | Wang et al. |
| 9,232,378 B2 | 1/2016 | Khosla et al. |
| 9,232,403 B2 | 1/2016 | Raleigh |
| 9,232,458 B2 | 1/2016 | Vasseur et al. |
| 9,235,268 B2 | 1/2016 | Arrasvuori et al. |
| 9,235,941 B2 | 1/2016 | Ricci et al. |
| 9,236,904 B2 | 1/2016 | Hui et al. |
| 9,237,220 B2 | 1/2016 | Waris et al. |
| 9,237,593 B2 | 1/2016 | Kirveskoski |
| 9,240,018 B2 | 1/2016 | Ricci |
| 9,240,827 B2 | 1/2016 | Brockenbrough et al. |
| 9,240,913 B2 | 1/2016 | Hui et al. |
| 9,241,248 B2 | 1/2016 | Giacoletto et al. |
| 9,241,265 B2 | 1/2016 | Puura |
| 9,244,150 B2 | 1/2016 | Sathish et al. |
| 9,245,051 B2 | 1/2016 | Licata et al. |
| 9,246,586 B2 | 1/2016 | Patton et al. |
| 9,246,845 B2 | 1/2016 | Hui et al. |
| 9,246,882 B2 | 1/2016 | Oliver |
| 9,246,914 B2 | 1/2016 | Boldyrev et al. |
| 9,246,983 B2 | 1/2016 | Patil et al. |
| 9,247,396 B2 | 1/2016 | Alexander et al. |
| 9,247,482 B2 | 1/2016 | Sherman et al. |
| 9,247,779 B1 | 2/2016 | Aloumanis et al. |
| 9,250,686 B2 | 2/2016 | Nrusimhan N. V et al. |
| 9,253,021 B2 | 2/2016 | Vasseur et al. |
| 9,253,282 B2 | 2/2016 | O'Donoghue et al. |
| 9,253,816 B1 | 2/2016 | Gashette |
| 9,258,034 B2 | 2/2016 | Cargill et al. |
| 9,258,408 B2 | 2/2016 | Huotari et al. |
| 9,261,368 B2 | 2/2016 | Beaurepaire |
| 9,262,120 B2 | 2/2016 | Chipchase et al. |
| 9,264,349 B2 | 2/2016 | Vasseur et al. |
| 9,264,435 B2 | 2/2016 | Liu et al. |
| 9,266,025 B2 | 2/2016 | Hall |
| 9,269,000 B2 | 2/2016 | Korhonen et al. |
| 9,269,059 B2 | 2/2016 | Mandyam et al. |
| 9,270,584 B2 | 2/2016 | Hui et al. |

(56) References Cited

U.S. PATENT DOCUMENTS

| | | |
|---|---|---|
| 9,270,726 B2 | 2/2016 | Keskitalo et al. |
| 9,271,023 B2 | 2/2016 | Ramer et al. |
| 9,271,178 B2 | 2/2016 | Ghanadan et al. |
| 9,274,898 B2 | 3/2016 | Boldyrev et al. |
| 9,275,376 B2 | 3/2016 | Barraclough et al. |
| 9,276,845 B2 | 3/2016 | Shaffer et al. |
| 9,276,931 B2 | 3/2016 | Perez |
| 9,277,400 B2 | 3/2016 | Malaney |
| 9,277,477 B2 | 3/2016 | Leppanen et al. |
| 9,277,482 B2 | 3/2016 | Vasseur et al. |
| 9,277,503 B2 | 3/2016 | Palankar et al. |
| 9,279,696 B2 | 3/2016 | Annapureddy et al. |
| 9,280,708 B2 | 3/2016 | Grassel et al. |
| 9,281,865 B2 | 3/2016 | Hui et al. |
| 9,282,059 B2 | 3/2016 | Vasseur |
| 9,282,096 B2 | 3/2016 | Goldstein |
| 9,286,473 B2 | 3/2016 | Cruz Mota et al. |
| 9,288,337 B2 | 3/2016 | Mohammed et al. |
| 9,288,630 B2 | 3/2016 | Raman |
| 9,288,660 B2 | 3/2016 | Puusaari et al. |
| 9,288,760 B2 | 3/2016 | Kang et al. |
| 9,290,153 B2 | 3/2016 | Ricci et al. |
| 9,294,141 B2 | 3/2016 | Challa et al. |
| 9,294,364 B2 | 3/2016 | Biswas |
| 9,294,488 B2 | 3/2016 | Vasseur et al. |
| 9,294,878 B2 | 3/2016 | Tian et al. |
| 9,298,362 B2 | 3/2016 | Lucero et al. |
| 9,299,257 B2 | 3/2016 | Beaurepaire et al. |
| 9,300,569 B2 | 3/2016 | Hui et al. |
| 9,301,114 B2 | 3/2016 | Cao et al. |
| 9,304,009 B2 | 4/2016 | Beaurepaire et al. |
| 9,305,002 B2 | 4/2016 | Rambacher et al. |
| 9,306,620 B2 | 4/2016 | Shaffer et al. |
| 9,306,833 B2 | 4/2016 | Shaffer et al. |
| 9,306,841 B2 | 4/2016 | Vasseur et al. |
| 9,307,575 B2 | 4/2016 | Lee |
| 9,311,505 B2 | 4/2016 | Sathish et al. |
| 9,311,670 B2 | 4/2016 | Hoffberg |
| 9,312,918 B2 | 4/2016 | Hui et al. |
| 9,313,106 B2 | 4/2016 | Oddo et al. |
| 9,313,275 B2 | 4/2016 | Addepalli et al. |
| 9,313,322 B2 | 4/2016 | Ma et al. |
| 9,313,539 B2 | 4/2016 | Kirkeby |
| 9,313,800 B2 | 4/2016 | Luoma et al. |
| 9,314,696 B2 | 4/2016 | Lucero et al. |
| 9,317,133 B2 | 4/2016 | Korah et al. |
| 9,317,378 B2 | 4/2016 | Vasseur et al. |
| 9,317,598 B2 | 4/2016 | Mate et al. |
| 9,319,332 B2 | 4/2016 | Thubert et al. |
| 9,319,390 B2 | 4/2016 | Yu et al. |
| 9,321,529 B1 | 4/2016 | Jones et al. |
| 9,323,250 B2 | 4/2016 | Wang et al. |
| 9,324,033 B2 | 4/2016 | Boldyrev et al. |
| 9,325,626 B2 | 4/2016 | Vasseur |
| 9,325,693 B2 | 4/2016 | Otranen et al. |
| 9,325,827 B2 | 4/2016 | Mirza et al. |
| 9,326,222 B2 | 4/2016 | Hillan |
| 9,330,396 B2 | 5/2016 | Sarmenta et al. |
| 9,331,744 B2 | 5/2016 | Hillan et al. |
| 9,331,931 B2 | 5/2016 | Hui et al. |
| 9,332,072 B2 | 5/2016 | Hui et al. |
| 9,335,893 B2 | 5/2016 | Kennedy et al. |
| 9,336,320 B2 | 5/2016 | Larson et al. |
| 9,337,899 B2 | 5/2016 | Bhatia et al. |
| 9,338,065 B2 | 5/2016 | Vasseur et al. |
| 9,338,171 B2 | 5/2016 | Kiukkonen et al. |
| 9,338,725 B2 | 5/2016 | Corinella |
| 9,342,886 B2 | 5/2016 | Grzechnik |
| 9,344,355 B2 | 5/2016 | Vasseur et al. |
| 9,344,868 B2 | 5/2016 | Beaurepaire et al. |
| 9,344,894 B2 | 5/2016 | Sahu et al. |
| 9,345,012 B2 | 5/2016 | Wang et al. |
| 9,347,779 B1 | 5/2016 | Lynch |
| 9,349,293 B2 | 5/2016 | Beaurepaire et al. |
| 9,350,533 B2 | 5/2016 | Oliver |
| 9,350,635 B2 | 5/2016 | Vasseur et al. |
| 9,350,645 B2 | 5/2016 | Hui et al. |
| 9,350,683 B2 | 5/2016 | Hui et al. |
| 9,350,809 B2 | 5/2016 | Leppanen et al. |
| 9,351,144 B2 | 5/2016 | Hillan et al. |
| 9,351,193 B2 | 5/2016 | Raleigh et al. |
| 9,354,806 B2 | 5/2016 | Arrasvuori et al. |
| 9,355,144 B2 | 5/2016 | Boldyrev et al. |
| 9,356,858 B2 | 5/2016 | Vasseur et al. |
| 9,356,875 B2 | 5/2016 | Dasgupta et al. |
| 9,357,331 B2 | 5/2016 | Huang |
| 9,359,018 B2 | 6/2016 | Lagassey |
| 9,360,333 B2 | 6/2016 | Tuukkanen et al. |
| 9,361,794 B1 | 6/2016 | Lynch |
| 9,361,802 B2 | 6/2016 | Milne et al. |
| 9,363,166 B2 | 6/2016 | Vasseur et al. |
| 9,363,651 B1 | 6/2016 | daCosta |
| 9,369,177 B2 | 6/2016 | Hui et al. |
| 9,369,295 B2 | 6/2016 | Hall |
| 9,369,351 B2 | 6/2016 | Di Pietro et al. |
| 9,369,943 B2 | 6/2016 | Li et al. |
| 9,370,040 B2 | 6/2016 | Gillespie et al. |
| 9,371,099 B2 | 6/2016 | Lagassey |
| 9,372,092 B2 | 6/2016 | Skillman et al. |
| 9,372,094 B2 | 6/2016 | Kankainen |
| 9,374,134 B2 | 6/2016 | Hillan et al. |
| 9,374,136 B2 | 6/2016 | Boldyrev et al. |
| 9,374,281 B2 | 6/2016 | Dasgupta et al. |
| 9,377,924 B2 | 6/2016 | Sailor et al. |
| 9,378,390 B2 | 6/2016 | Nefedov et al. |
| 9,378,528 B2 | 6/2016 | Boldyrev et al. |
| 9,380,586 B2 | 6/2016 | Wang |
| 9,384,054 B2 | 7/2016 | Uola et al. |
| 9,384,500 B2 | 7/2016 | Ramer et al. |
| 9,385,933 B2 | 7/2016 | Vasseur et al. |
| 9,386,139 B2 | 7/2016 | Knight |
| 9,386,150 B2 | 7/2016 | Ramer et al. |
| 9,386,443 B2 | 7/2016 | Kies et al. |
| 9,389,594 B2 | 7/2016 | Arrasvuori et al. |
| 9,390,091 B2 | 7/2016 | Eronen et al. |
| 9,390,137 B2 | 7/2016 | Setlur et al. |
| 9,390,436 B2 | 7/2016 | Ramer et al. |
| 9,391,784 B2 | 7/2016 | Hui et al. |
| 9,391,878 B2 | 7/2016 | Bade et al. |
| 9,392,416 B2 | 7/2016 | Sridhar et al. |
| 9,392,445 B2 | 7/2016 | Krishnaswamy |
| 9,396,040 B2 | 7/2016 | Boldyrev et al. |
| 9,396,603 B2 | 7/2016 | Bam et al. |
| 9,398,035 B2 | 7/2016 | Vasseur et al. |
| 9,398,110 B2 | 7/2016 | Boldyrev et al. |
| 9,398,169 B2 | 7/2016 | Mohammed et al. |
| 9,398,453 B2 | 7/2016 | Krishnaswamy et al. |
| 9,398,467 B2 | 7/2016 | Schultz et al. |
| 9,401,810 B2 | 7/2016 | Sovio et al. |
| 9,401,863 B2 | 7/2016 | Hui et al. |
| 9,402,189 B2 | 7/2016 | Hohs et al. |
| 9,407,542 B2 | 8/2016 | Vasseur |
| 9,407,646 B2 | 8/2016 | Cruz Mota et al. |
| 9,407,702 B2 | 8/2016 | Yang et al. |
| 9,407,706 B2 | 8/2016 | Grokop et al. |
| 9,411,916 B2 | 8/2016 | Cruz Mota et al. |
| 9,412,021 B2 | 8/2016 | Biswas et al. |
| 9,413,479 B2 | 8/2016 | Wetterwald et al. |
| 9,413,643 B2 | 8/2016 | Hui et al. |
| 9,413,689 B1 | 8/2016 | Shikowitz et al. |
| 9,413,779 B2 | 8/2016 | Vasseur et al. |
| 9,414,183 B2 | 8/2016 | Wang et al. |
| 9,414,348 B2 | 8/2016 | Saari et al. |
| 9,417,331 B2 | 8/2016 | Valentino et al. |
| 9,417,691 B2 | 8/2016 | Belimpasakis et al. |
| 9,418,340 B2 | 8/2016 | Vasseur et al. |
| 9,418,346 B2 | 8/2016 | Lehtiniemi et al. |
| 9,419,981 B2 | 8/2016 | Stolfo et al. |
| 9,421,460 B2 * | 8/2016 | Zhu .................. A63F 13/92 |
| 9,423,263 B2 | 8/2016 | Tuukkanen |
| 9,424,556 B2 | 8/2016 | Ollila et al. |
| 9,424,672 B2 | 8/2016 | Zavodny et al. |
| 9,426,020 B2 | 8/2016 | Vasseur et al. |
| 9,426,035 B2 | 8/2016 | Shetty et al. |

(56) References Cited

U.S. PATENT DOCUMENTS

| | | |
|---|---|---|
| 9,426,040 B2 | 8/2016 | Vasseur et al. |
| 9,426,228 B2 | 8/2016 | Kneckt et al. |
| 9,426,610 B2 | 8/2016 | Milne et al. |
| 9,426,716 B2 | 8/2016 | Thubert et al. |
| 9,426,769 B2 | 8/2016 | Haro |
| 9,428,054 B2 | 8/2016 | Tuukkanen |
| 9,429,661 B2 | 8/2016 | Valentino et al. |
| 9,432,172 B2 | 8/2016 | Bremer et al. |
| 9,432,248 B2 | 8/2016 | Vasseur et al. |
| 9,432,312 B2 | 8/2016 | Dasgupta et al. |
| 9,432,359 B2 | 8/2016 | Menezes et al. |
| 9,432,564 B2 | 8/2016 | Nurmenniemi |
| 9,436,231 B2 | 9/2016 | Bevilacqua et al. |
| 9,436,300 B2 | 9/2016 | Sathish et al. |
| 9,436,917 B2 | 9/2016 | Mermoud et al. |
| 9,439,218 B2 | 9/2016 | Kats et al. |
| 9,442,935 B2 | 9/2016 | Lehtiniemi et al. |
| 9,443,204 B2 | 9/2016 | Vasseur et al. |
| 9,443,430 B2 | 9/2016 | Beaurepaire |
| 9,444,598 B2 | 9/2016 | Addepalli et al. |
| 9,444,727 B2 | 9/2016 | Vasseur et al. |
| 9,445,639 B1 | 9/2016 | Aloumanis et al. |
| 9,448,079 B2 | 9/2016 | Beaurepaire |
| 9,448,761 B2 | 9/2016 | Pitkanen et al. |
| 9,449,154 B2 | 9/2016 | Grassel et al. |
| 9,450,642 B2 | 9/2016 | Hui et al. |
| 9,450,972 B2 | 9/2016 | Cruz Mota et al. |
| 9,450,978 B2 | 9/2016 | Vasseur et al. |
| 9,451,383 B2 | 9/2016 | Bulut et al. |
| 9,451,472 B2 | 9/2016 | Bajko |
| 9,451,627 B1 | 9/2016 | Zhu et al. |
| 9,454,772 B2 | 9/2016 | Ramer et al. |
| 9,455,903 B2 | 9/2016 | Hui et al. |
| 9,455,991 B2 | 9/2016 | Grigoriev et al. |
| 9,460,213 B2 | 10/2016 | Boldyrev et al. |
| 9,460,617 B2 | 10/2016 | Beaurepaire et al. |
| 9,461,970 B2 | 10/2016 | Biswas et al. |
| 9,462,040 B2 | 10/2016 | Addepalli et al. |
| 9,462,437 B2 | 10/2016 | Uusitalo et al. |
| 9,465,711 B2 | 10/2016 | Kukoyi |
| 9,467,440 B2 | 10/2016 | Otranen et al. |
| 9,467,925 B1 | 10/2016 | Baroudi et al. |
| 9,469,030 B2 | 10/2016 | Wang et al. |
| 9,471,925 B2 | 10/2016 | Ramer et al. |
| 9,471,934 B2 | 10/2016 | Belimpasakis et al. |
| 9,472,159 B2 | 10/2016 | Uusitalo et al. |
| 9,473,364 B2 | 10/2016 | Vasseur et al. |
| 9,473,412 B2 | 10/2016 | Hui et al. |
| 9,473,893 B2 | 10/2016 | Kuramura et al. |
| 9,477,664 B2 | 10/2016 | Sathish et al. |
| 9,477,690 B2 | 10/2016 | Lucero et al. |
| 9,477,787 B2 | 10/2016 | Boldyrev et al. |
| 9,479,441 B2 | 10/2016 | Hui et al. |
| 9,479,963 B2 | 10/2016 | Shaffer et al. |
| 9,483,939 B2 | 11/2016 | Modica et al. |
| 9,485,153 B2 | 11/2016 | Vasseur et al. |
| 9,485,157 B2 | 11/2016 | Thubert et al. |
| 9,485,174 B2 | 11/2016 | Hui et al. |
| 9,485,673 B2 | 11/2016 | Turunen et al. |
| 9,488,485 B2 | 11/2016 | Letz |
| 9,489,403 B2 | 11/2016 | Eskolin et al. |
| 9,490,419 B2 | 11/2016 | Hui et al. |
| 9,491,051 B2 | 11/2016 | Hui et al. |
| 9,491,076 B2 | 11/2016 | Mermoud et al. |
| 9,491,564 B1 | 11/2016 | Raleigh |
| 9,497,215 B2 | 11/2016 | Vasseur et al. |
| 9,499,175 B2 | 11/2016 | Tuukkanen |
| 9,500,486 B2 | 11/2016 | Gale et al. |
| 9,501,856 B2 | 11/2016 | Mattila |
| 9,503,359 B2 | 11/2016 | Dasgupta et al. |
| 9,503,466 B2 | 11/2016 | Vasseur et al. |
| 9,503,540 B2 | 11/2016 | Athas et al. |
| 9,504,051 B2 | 11/2016 | Ji |
| 9,506,763 B2 | 11/2016 | Averbuch et al. |
| 9,507,498 B2 | 11/2016 | Bickel et al. |
| 9,507,630 B2 | 11/2016 | Addepalli et al. |
| 9,509,792 B2 | 11/2016 | Liu et al. |
| 9,510,132 B2 | 11/2016 | Xu et al. |
| 9,510,264 B2 | 11/2016 | Hui et al. |
| 9,510,347 B2 | 11/2016 | Thubert et al. |
| 9,510,362 B2 | 11/2016 | Hui et al. |
| 9,514,472 B2 | 12/2016 | Aarni et al. |
| 9,514,717 B2 | 12/2016 | Purayil et al. |
| 9,515,874 B2 | 12/2016 | Hui et al. |
| 9,515,914 B2 | 12/2016 | Vasseur et al. |
| 9,516,025 B2 | 12/2016 | Dasgupta et al. |
| 9,516,461 B2 | 12/2016 | Carlsson et al. |
| 9,518,831 B2 | 12/2016 | Tuukkanen |
| 9,521,158 B2 | 12/2016 | Di Pietro et al. |
| 9,521,621 B2 | 12/2016 | Krishnaswamy |
| 9,525,617 B2 | 12/2016 | Vasseur et al. |
| 9,525,986 B2 | 12/2016 | Melin |
| 9,528,839 B2 | 12/2016 | Tuukkanen |
| 9,529,603 B2 | 12/2016 | Uola et al. |
| 9,531,635 B2 | 12/2016 | Vasseur et al. |
| 9,532,161 B2 | 12/2016 | Raleigh |
| 9,534,911 B2 | 1/2017 | Beaurepaire et al. |
| 9,536,074 B2 | 1/2017 | Boldyrev et al. |
| 9,536,105 B2 | 1/2017 | Boldyrev et al. |
| 9,536,391 B2 | 1/2017 | Pececnik |
| 9,537,457 B2 | 1/2017 | Issakov et al. |
| 9,537,593 B2 | 1/2017 | Hui et al. |
| 9,541,393 B2 | 1/2017 | Brunner et al. |
| 9,544,018 B2 | 1/2017 | Hui et al. |
| 9,544,162 B2 | 1/2017 | Vasseur et al. |
| 9,544,220 B2 | 1/2017 | Dasgupta et al. |
| 9,547,828 B2 | 1/2017 | Mermoud et al. |
| 9,547,985 B2 | 1/2017 | Tuukkanen |
| 9,549,363 B2 | 1/2017 | Hui et al. |
| 9,549,364 B2 | 1/2017 | Boldyrev et al. |
| 9,551,580 B2 | 1/2017 | Konig |
| 9,552,234 B2 | 1/2017 | Boldyrev et al. |
| 9,553,728 B2 | 1/2017 | Boldyrev et al. |
| 9,553,772 B2 | 1/2017 | Dasgupta et al. |
| 9,553,773 B2 | 1/2017 | Vasseur et al. |
| 9,553,796 B2 | 1/2017 | Hui et al. |
| 9,553,933 B2 | 1/2017 | Meskauskas et al. |
| 9,553,945 B2 | 1/2017 | Salam et al. |
| 9,557,188 B2 | 1/2017 | Svendsen et al. |
| 9,557,401 B2 | 1/2017 | Sathish et al. |
| 9,558,559 B2 | 1/2017 | Fan et al. |
| 9,558,660 B1 | 1/2017 | Fowe et al. |
| 9,558,664 B1 | 1/2017 | Gaebler et al. |
| 9,558,716 B2 | 1/2017 | Beaurepaire et al. |
| 9,559,750 B2 | 1/2017 | Hui et al. |
| 9,559,918 B2 | 1/2017 | Di Pietro et al. |
| 9,562,779 B2 | 2/2017 | Lynch |
| 9,563,440 B2 | 2/2017 | Vasseur et al. |
| 9,563,854 B2 | 2/2017 | Cruz Mota et al. |
| 9,565,108 B2 | 2/2017 | Hui et al. |
| 9,565,111 B2 | 2/2017 | Vasseur et al. |
| 9,565,292 B2 | 2/2017 | Tuukkanen |
| 9,565,543 B2 | 2/2017 | Raleigh |
| 9,565,549 B2 | 2/2017 | Puusaari et al. |
| 9,569,587 B2 | 2/2017 | Ansari et al. |
| 9,569,960 B2 | 2/2017 | Xu et al. |
| 9,570,046 B2 | 2/2017 | Rosenthal et al. |
| 9,571,604 B2 | 2/2017 | Leppanen et al. |
| 9,574,898 B2 | 2/2017 | Tuukkanen |
| 9,577,914 B2 | 2/2017 | Hui et al. |
| 9,577,915 B2 | 2/2017 | Hui et al. |
| 9,582,166 B2 | 2/2017 | Vaittinen et al. |
| 9,582,242 B2 | 2/2017 | Jantunen et al. |
| 9,582,259 B2 | 2/2017 | Chee et al. |
| 9,584,164 B1 | 2/2017 | Sheikh et al. |
| 9,588,498 B2 | 3/2017 | Vilermo et al. |
| 9,588,968 B2 | 3/2017 | Eronen et al. |
| 9,589,006 B2 | 3/2017 | Boldyrev et al. |
| 9,589,108 B2 | 3/2017 | Blom et al. |
| 9,590,692 B2 | 3/2017 | Thubert et al. |
| 9,590,790 B2 | 3/2017 | Hui et al. |
| 9,590,896 B2 | 3/2017 | Hui et al. |
| 9,591,035 B2 | 3/2017 | Kuo et al. |
| 9,591,429 B2 | 3/2017 | Xu et al. |

(56) References Cited

U.S. PATENT DOCUMENTS

| | | |
|---|---|---|
| 9,594,499 B2 | 3/2017 | Britton |
| 9,596,404 B2 | 3/2017 | Fu et al. |
| 9,600,261 B2 | 3/2017 | Mandyam et al. |
| 9,600,494 B2 | 3/2017 | Maluf et al. |
| 9,600,780 B2 | 3/2017 | Hoh et al. |
| 9,602,159 B2 | 3/2017 | Hui et al. |
| 9,602,379 B2 | 3/2017 | Hui et al. |
| 9,602,420 B2 | 3/2017 | Thubert et al. |
| 9,602,623 B2 | 3/2017 | Kuusilinna et al. |
| 9,602,729 B2 | 3/2017 | King et al. |
| 9,603,024 B2 | 3/2017 | Wang et al. |
| 9,603,097 B2 | 3/2017 | Bhattacharjee et al. |
| 9,606,619 B2 | 3/2017 | Palin et al. |
| 9,608,478 B2 | 3/2017 | Maguire et al. |
| 9,608,912 B2 | 3/2017 | Thubert et al. |
| 9,609,459 B2 | 3/2017 | Raleigh |
| 9,609,471 B2 | 3/2017 | Joshi et al. |
| 9,609,521 B2 | 3/2017 | Wang |
| 9,609,552 B2 | 3/2017 | Ramachandran et al. |
| 9,610,944 B2 | 4/2017 | Beaurepaire et al. |
| 9,612,311 B2 | 4/2017 | Jarske et al. |
| 9,612,741 B2 | 4/2017 | Brown et al. |
| 9,613,065 B2 | 4/2017 | Balandin et al. |
| 9,613,406 B2 | 4/2017 | Chen et al. |
| 9,613,527 B2 | 4/2017 | Pfeifle |
| 9,614,770 B2 | 4/2017 | Vasseur et al. |
| 9,615,192 B2 | 4/2017 | Raleigh |
| 9,615,264 B2 | 4/2017 | Hoffberg |
| 9,615,266 B1 | 4/2017 | Cheadle et al. |
| 9,615,284 B2 | 4/2017 | Ghanadan et al. |
| 9,616,993 B1 | 4/2017 | Shapiro et al. |
| 9,619,076 B2 | 4/2017 | Bernstein et al. |
| 9,619,138 B2 | 4/2017 | Piippo et al. |
| 9,622,063 B2 | 4/2017 | Inha et al. |
| 9,626,628 B2 | 4/2017 | Dasgupta et al. |
| 9,628,362 B2 | 4/2017 | Vasseur et al. |
| 9,628,371 B2 | 4/2017 | Hui et al. |
| 9,628,583 B2 | 4/2017 | Fu |
| 9,629,581 B2 | 4/2017 | Simon |
| 9,632,664 B2 | 4/2017 | Foss et al. |
| 9,633,364 B2 | 4/2017 | Martini et al. |
| 9,634,903 B2 | 4/2017 | Yan et al. |
| 9,634,928 B2 | 4/2017 | Choudhury et al. |
| 9,634,982 B2 | 4/2017 | Hui et al. |
| 9,635,050 B2 | 4/2017 | Di Pietro et al. |
| 9,635,159 B2 | 4/2017 | Baldini et al. |
| 9,639,184 B2 | 5/2017 | Alonso Ruiz et al. |
| 9,639,273 B2 | 5/2017 | Hirvonen et al. |
| 9,639,346 B2 | 5/2017 | Tuukkanen |
| 9,639,857 B2 | 5/2017 | Piippo et al. |
| 9,641,382 B2 | 5/2017 | Hui et al. |
| 9,641,542 B2 | 5/2017 | Vasseur et al. |
| 9,641,803 B1 | 5/2017 | Badr et al. |
| 9,641,957 B2 | 5/2017 | Raleigh |
| 9,641,994 B2 | 5/2017 | Balsan et al. |
| 9,642,027 B2 | 5/2017 | Schmidt et al. |
| 9,645,709 B2 | 5/2017 | Foss et al. |
| 9,645,732 B2 | 5/2017 | Butcher et al. |
| 9,646,315 B2 | 5/2017 | Blom |
| 9,647,494 B2 | 5/2017 | Hui et al. |
| 9,647,884 B2 | 5/2017 | Hillan |
| 9,648,463 B2 | 5/2017 | Seyde et al. |
| 9,651,343 B2 | 5/2017 | Miller |
| 9,652,720 B2 | 5/2017 | Vasseur et al. |
| 9,654,222 B1 | 5/2017 | Shatz et al. |
| 9,654,389 B2 | 5/2017 | Hui et al. |
| 9,654,478 B2 | 5/2017 | Stolfo et al. |
| 9,654,509 B2 | 5/2017 | Burghart |
| 9,654,911 B2 | 5/2017 | Letz et al. |
| 9,660,745 B2 | 5/2017 | Hall |
| 9,660,969 B2 | 5/2017 | Qian et al. |
| 9,660,975 B2 | 5/2017 | Otranen et al. |
| 9,661,451 B2 | 5/2017 | Arrasvuori et al. |
| 9,664,527 B2 | 5/2017 | Nurmi |
| 9,665,648 B2 | 5/2017 | Sathish et al. |
| 9,667,423 B2 | 5/2017 | Fu et al. |
| 9,667,501 B2 | 5/2017 | Dasgupta et al. |
| 9,667,536 B2 | 5/2017 | Hui et al. |
| 9,667,716 B2 | 5/2017 | Eggert |
| 9,668,087 B2 | 5/2017 | Cudalbu et al. |
| 9,668,193 B2 | 5/2017 | Fulknier et al. |
| 9,672,332 B2 | 6/2017 | Nurmi |
| 9,672,659 B2 | 6/2017 | Velkavrh et al. |
| 9,673,511 B2 | 6/2017 | Lee et al. |
| 9,673,858 B2 | 6/2017 | Hui et al. |
| 9,674,207 B2 | 6/2017 | Di Pietro et al. |
| 9,674,426 B2 | 6/2017 | Penha et al. |
| 9,674,698 B2 | 6/2017 | Rainisto |
| 9,674,700 B2 | 6/2017 | John Archibald et al. |
| 9,675,882 B2 | 6/2017 | Hall |
| 9,678,660 B2 | 6/2017 | Beaurepaire et al. |
| 9,679,064 B2 | 6/2017 | Xue et al. |
| 9,684,081 B2 | 6/2017 | Giurgiu et al. |
| 9,684,773 B2 | 6/2017 | Tuukkanen |
| 9,686,312 B2 | 6/2017 | Di Pietro et al. |
| 9,689,680 B2 | 6/2017 | Jamain et al. |
| 9,691,287 B1 | 6/2017 | Shapiro et al. |
| 9,692,644 B2 | 6/2017 | Hui et al. |
| 9,693,201 B2 | 6/2017 | Saunders |
| 9,693,375 B2 | 6/2017 | Bacon et al. |
| 9,696,884 B2 | 7/2017 | Lehtiniemi et al. |
| 9,697,051 B2 | 7/2017 | Wilbur et al. |
| 9,697,175 B2 | 7/2017 | Lynch |
| 9,698,864 B2 | 7/2017 | Shaffer et al. |
| 9,698,867 B2 | 7/2017 | Hui et al. |
| 9,698,872 B2 | 7/2017 | Haverinen et al. |
| 9,698,996 B2 | 7/2017 | Hall |
| 9,699,281 B2 | 7/2017 | Fisher et al. |
| 9,699,375 B2 | 7/2017 | Fan et al. |
| 9,699,712 B2 | 7/2017 | Singh et al. |
| 9,703,791 B2 | 7/2017 | Blom et al. |
| 9,703,892 B2 | 7/2017 | Ramer et al. |
| 9,705,737 B2 | 7/2017 | Wetterwald et al. |
| 9,705,766 B2 | 7/2017 | Vasseur et al. |
| 9,705,914 B2 | 7/2017 | Di Pietro et al. |
| 9,705,929 B2 | 7/2017 | Biswas |
| 9,706,000 B2 | 7/2017 | Bostrom et al. |
| 9,706,127 B2 | 7/2017 | Penha et al. |
| 9,706,349 B2 | 7/2017 | Beaurepaire |
| 9,710,222 B2 | 7/2017 | Kusano |
| 9,710,480 B2 | 7/2017 | Wang et al. |
| 9,710,484 B2 | 7/2017 | Marcon et al. |
| 9,710,961 B2 | 7/2017 | Setlur et al. |
| 9,712,433 B2 | 7/2017 | Hui et al. |
| 9,713,061 B2 | 7/2017 | Ruiz et al. |
| 9,715,365 B2 | 7/2017 | Kusano |
| 9,715,780 B2 | 7/2017 | Garrison |
| 9,716,528 B2 | 7/2017 | Hui et al. |
| 9,716,683 B2 | 7/2017 | Liao et al. |
| 9,719,789 B2 | 8/2017 | Beaurepaire |
| 9,721,003 B2 | 8/2017 | Caruntu |
| 9,721,105 B2 | 8/2017 | Biswas et al. |
| 9,721,612 B2 | 8/2017 | Lehtiniemi et al. |
| 9,722,325 B2 | 8/2017 | Svendsen et al. |
| 9,722,905 B2 | 8/2017 | Mermoud et al. |
| 9,722,909 B2 | 8/2017 | Hui et al. |
| 9,723,463 B2 | 8/2017 | Kaariainen et al. |
| 9,723,538 B2 | 8/2017 | Shaffer et al. |
| 9,723,653 B2 | 8/2017 | Shikowitz |
| 9,727,751 B2 | 8/2017 | Oliver et al. |
| 9,727,879 B2 | 8/2017 | Suomela et al. |
| 9,728,084 B2 | 8/2017 | Stenneth |
| 9,730,017 B2 | 8/2017 | Belimpasakis et al. |
| 9,734,321 B2 | 8/2017 | Ahmed et al. |
| 9,734,457 B2 | 8/2017 | Vasseur et al. |
| 9,734,480 B2 | 8/2017 | Kerai |
| 9,735,834 B2 | 8/2017 | Hillan et al. |
| 9,736,056 B2 | 8/2017 | Vasseur et al. |
| 9,736,286 B2 | 8/2017 | Kennedy et al. |
| 9,736,294 B2 | 8/2017 | Kiukkonen |
| 9,736,650 B2 | 8/2017 | Beaurepaire et al. |
| 9,736,651 B2 | 8/2017 | Chen et al. |
| 9,742,492 B2 | 8/2017 | Shatz et al. |
| 9,747,503 B2 | 8/2017 | Shatz et al. |

(56) References Cited

U.S. PATENT DOCUMENTS

| | | |
|---|---|---|
| 9,747,663 B2 | 8/2017 | Barnes |
| 9,749,410 B2 | 8/2017 | Thubert et al. |
| 9,749,600 B2 | 8/2017 | Shatz et al. |
| 9,749,771 B2 | 8/2017 | Xu et al. |
| 9,749,808 B2 | 8/2017 | Tuukkanen |
| 9,749,979 B2 | 8/2017 | Puusaari et al. |
| 9,753,639 B2 | 9/2017 | Cieplinski et al. |
| 9,754,287 B2 | 9/2017 | Ramer et al. |
| 9,755,711 B2 | 9/2017 | Lau et al. |
| 9,755,740 B2 | 9/2017 | Shatz et al. |
| 9,756,549 B2 | 9/2017 | Perdomo |
| 9,758,092 B2 | 9/2017 | Pal et al. |
| 9,759,800 B2 | 9/2017 | Potkonjak |
| 9,760,243 B2 | 9/2017 | De Vallois et al. |
| 9,761,132 B2 | 9/2017 | Watts-Fitzgerald et al. |
| 9,761,137 B2 | 9/2017 | Beaurepaire et al. |
| 9,762,387 B2 | 9/2017 | Leppanen et al. |
| 9,766,089 B2 | 9/2017 | Kankainen |
| 9,767,687 B2 | 9/2017 | Gupta et al. |
| 9,769,760 B2 | 9/2017 | Shen et al. |
| 9,769,821 B2 | 9/2017 | Hui et al. |
| 9,773,345 B2 | 9/2017 | Stirbu et al. |
| 9,774,410 B2 | 9/2017 | Daoura et al. |
| 9,774,522 B2 | 9/2017 | Vasseur et al. |
| 9,774,534 B2 | 9/2017 | Vasseur et al. |
| 9,776,587 B2 | 10/2017 | Tuukkanen |
| 9,778,050 B2 | 10/2017 | Gupta |
| 9,778,060 B2 | 10/2017 | Cheng |
| 9,778,771 B2 | 10/2017 | Bernstein et al. |
| 9,779,102 B2 | 10/2017 | Ozturk et al. |
| 9,779,112 B2 | 10/2017 | Gaebler et al. |
| 9,781,724 B2 | 10/2017 | Wang et al. |
| 9,785,149 B2 | 10/2017 | Wang et al. |
| 9,785,305 B2 | 10/2017 | Alonso Ruiz et al. |
| 9,785,509 B2 | 10/2017 | Hui et al. |
| 9,785,975 B2 | 10/2017 | Ramer et al. |
| 9,787,616 B2 | 10/2017 | Xu et al. |
| 9,787,759 B2 | 10/2017 | Slay, Jr. et al. |
| 9,788,234 B2 | 10/2017 | Baker |
| 9,792,381 B2 | 10/2017 | Grosse et al. |
| 9,792,432 B2 | 10/2017 | Bilogrevic et al. |
| 9,793,948 B2 | 10/2017 | Hui et al. |
| 9,793,989 B2 | 10/2017 | Shatz et al. |
| 9,794,113 B2 | 10/2017 | Ranjan et al. |
| 9,794,179 B2 | 10/2017 | Dasgupta et al. |
| 9,794,797 B2 | 10/2017 | Hoffberg |
| 9,794,860 B2 | 10/2017 | Hall |
| 9,794,977 B2 | 10/2017 | Vogedes et al. |
| 9,798,010 B2 | 10/2017 | Fischer et al. |
| 9,798,586 B2 | 10/2017 | Leppanen et al. |
| 9,800,493 B2 | 10/2017 | Hui et al. |
| 9,800,506 B2 | 10/2017 | Vasseur et al. |
| 9,800,791 B2 | 10/2017 | Shatz et al. |
| 9,803,986 B2 | 10/2017 | Prehofer |
| 9,806,774 B2 | 10/2017 | Lau et al. |
| 9,807,080 B2 | 10/2017 | Otranen et al. |
| 9,811,589 B2 | 11/2017 | Ramer et al. |
| 9,815,476 B2 | 11/2017 | Lynch |
| 9,818,136 B1 | 11/2017 | Hoffberg |
| 9,818,304 B2 | 11/2017 | Modica et al. |
| 9,823,839 B2 | 11/2017 | Brown et al. |
| 9,826,345 B2 | 11/2017 | Haro et al. |
| 9,826,368 B2 | 11/2017 | Milne et al. |
| 9,826,498 B2 | 11/2017 | Tuominen et al. |
| 9,830,048 B2 | 11/2017 | Dakin et al. |
| 9,832,242 B2 | 11/2017 | Hui et al. |
| 9,838,392 B2 | 12/2017 | Sainio et al. |
| 9,838,495 B2 | 12/2017 | Lection et al. |
| 9,838,496 B2 | 12/2017 | Lection et al. |
| 9,839,027 B2 | 12/2017 | Xu et al. |
| 9,841,494 B2 | 12/2017 | Meadow |
| 9,842,135 B2 | 12/2017 | Saadat et al. |
| 9,842,282 B2 | 12/2017 | Liu et al. |
| 9,843,534 B2 | 12/2017 | McFarlin et al. |
| 9,843,647 B2 | 12/2017 | Stenneth |
| 9,843,893 B2 | 12/2017 | Haro et al. |
| 9,846,735 B2 | 12/2017 | Kosuru et al. |
| 9,847,889 B2 | 12/2017 | Vasseur et al. |
| 9,847,982 B2 | 12/2017 | Kaariainen et al. |
| 9,848,422 B2 | 12/2017 | Woo et al. |
| 9,852,381 B2 | 12/2017 | Boldyrev et al. |
| 9,853,669 B2 | 12/2017 | Croyle |
| 9,853,883 B2 | 12/2017 | Thubert et al. |
| 9,854,055 B2 | 12/2017 | Sainio et al. |
| 9,857,185 B2 | 1/2018 | Beaurepaire |
| 9,857,897 B2 | 1/2018 | Westerman |
| 9,860,140 B2 | 1/2018 | Vasseur et al. |
| 9,860,352 B2 | 1/2018 | Fisher et al. |
| 9,860,725 B1 | 1/2018 | Shikowitz et al. |
| 9,864,572 B2 | 1/2018 | Kusano |
| 9,866,383 B2 | 1/2018 | Reddy et al. |
| 9,866,431 B2 | 1/2018 | Wetterwald et al. |
| 9,869,561 B2 | 1/2018 | Kroeller et al. |
| 9,870,429 B2 | 1/2018 | Stirbu et al. |
| 9,870,511 B2 | 1/2018 | Mittal et al. |
| 9,870,537 B2 | 1/2018 | Vasseur et al. |
| 9,870,642 B2 | 1/2018 | Fialho et al. |
| 9,871,588 B2 | 1/2018 | Shatz et al. |
| 9,876,747 B2 | 1/2018 | Hui et al. |
| 9,880,017 B2 | 1/2018 | Fowe et al. |
| 9,880,555 B2 | 1/2018 | Lynch |
| 9,880,735 B2 | 1/2018 | Dascola et al. |
| 9,880,945 B2 | 1/2018 | Pugsley et al. |
| 9,881,092 B2 | 1/2018 | Zeng et al. |
| 9,881,384 B2 | 1/2018 | Ponder et al. |
| 9,882,804 B2 | 1/2018 | Thubert et al. |
| 9,883,209 B2 | 1/2018 | Ricci |
| 9,883,323 B2 | 1/2018 | Baroudi et al. |
| 9,883,340 B2 | 1/2018 | Boldyrev et al. |
| 9,883,369 B2 | 1/2018 | Ulmansky et al. |
| 9,883,507 B2 | 1/2018 | Thubert et al. |
| 9,886,184 B2 | 2/2018 | Bernstein et al. |
| 9,886,509 B2 | 2/2018 | Du et al. |
| 9,886,795 B2 | 2/2018 | Fialho et al. |
| 9,887,743 B2 | 2/2018 | Hillan |
| 9,887,936 B2 | 2/2018 | Maino et al. |
| 9,888,021 B2 | 2/2018 | Horesh et al. |
| 9,891,058 B2 | 2/2018 | Beaurepaire |
| 9,891,072 B2 | 2/2018 | Lynch |
| 9,891,811 B2 | 2/2018 | Federighi et al. |
| 9,892,176 B2 | 2/2018 | Cortes |
| 9,893,985 B2 | 2/2018 | Hui et al. |
| 9,894,158 B2 | 2/2018 | Ranasinghe et al. |
| 9,894,516 B2 | 2/2018 | Choi et al. |
| 9,895,604 B2 | 2/2018 | Hall |
| 9,898,244 B2 | 2/2018 | Kusano |
| 9,900,079 B2 | 2/2018 | Thubert et al. |
| 9,900,119 B2 | 2/2018 | Daoura et al. |
| 9,900,169 B2 | 2/2018 | Thubert et al. |
| 9,900,342 B2 | 2/2018 | Cruz Mota et al. |
| 9,900,748 B2 | 2/2018 | Milne et al. |
| 2003/0079003 A1* | 4/2003 | Burr .............. H04W 40/24 709/221 |
| 2004/0266347 A1* | 12/2004 | Palin .............. H04L 63/062 455/41.1 |
| 2004/0267610 A1 | 12/2004 | Gossett et al. |
| 2005/0198036 A1 | 9/2005 | Nedkov et al. |
| 2006/0022048 A1 | 2/2006 | Johnson |
| 2006/0079178 A1* | 4/2006 | Palin .............. H04L 5/006 455/41.2 |
| 2006/0240790 A1* | 10/2006 | Timmis .............. H04B 1/034 455/127.4 |
| 2007/0060099 A1 | 3/2007 | Ramer et al. |
| 2007/0060109 A1 | 3/2007 | Ramer et al. |
| 2007/0060114 A1 | 3/2007 | Ramer et al. |
| 2007/0060129 A1 | 3/2007 | Ramer et al. |
| 2007/0060136 A1 | 3/2007 | Ramer et al. |
| 2007/0060173 A1 | 3/2007 | Ramer et al. |
| 2007/0061197 A1 | 3/2007 | Ramer et al. |
| 2007/0061198 A1 | 3/2007 | Ramer et al. |
| 2007/0061211 A1 | 3/2007 | Ramer et al. |
| 2007/0061229 A1 | 3/2007 | Ramer et al. |
| 2007/0061242 A1 | 3/2007 | Ramer et al. |
| 2007/0061243 A1 | 3/2007 | Ramer et al. |

(56) References Cited

U.S. PATENT DOCUMENTS

| | | |
|---|---|---|
| 2007/0061244 A1 | 3/2007 | Ramer et al. |
| 2007/0061245 A1 | 3/2007 | Ramer et al. |
| 2007/0061246 A1 | 3/2007 | Ramer et al. |
| 2007/0061247 A1 | 3/2007 | Ramer et al. |
| 2007/0061300 A1 | 3/2007 | Ramer et al. |
| 2007/0061301 A1 | 3/2007 | Ramer et al. |
| 2007/0061302 A1 | 3/2007 | Ramer et al. |
| 2007/0061303 A1 | 3/2007 | Ramer et al. |
| 2007/0061317 A1 | 3/2007 | Ramer et al. |
| 2007/0061328 A1 | 3/2007 | Ramer et al. |
| 2007/0061331 A1 | 3/2007 | Ramer et al. |
| 2007/0061332 A1 | 3/2007 | Ramer et al. |
| 2007/0061333 A1 | 3/2007 | Ramer et al. |
| 2007/0061334 A1 | 3/2007 | Ramer et al. |
| 2007/0061335 A1 | 3/2007 | Ramer et al. |
| 2007/0061336 A1 | 3/2007 | Ramer et al. |
| 2007/0061363 A1 | 3/2007 | Ramer et al. |
| 2007/0073717 A1 | 3/2007 | Ramer et al. |
| 2007/0073718 A1 | 3/2007 | Ramer et al. |
| 2007/0073719 A1 | 3/2007 | Ramer et al. |
| 2007/0073722 A1 | 3/2007 | Ramer et al. |
| 2007/0073723 A1 | 3/2007 | Ramer et al. |
| 2007/0094042 A1 | 4/2007 | Ramer et al. |
| 2007/0100650 A1 | 5/2007 | Ramer et al. |
| 2007/0100651 A1 | 5/2007 | Ramer et al. |
| 2007/0100652 A1 | 5/2007 | Ramer et al. |
| 2007/0100653 A1 | 5/2007 | Ramer et al. |
| 2007/0100805 A1 | 5/2007 | Ramer et al. |
| 2007/0100806 A1 | 5/2007 | Ramer et al. |
| 2007/0118533 A1 | 5/2007 | Ramer et al. |
| 2007/0168354 A1 | 7/2007 | Ramer et al. |
| 2007/0192294 A1 | 8/2007 | Ramer et al. |
| 2007/0192318 A1 | 8/2007 | Ramer et al. |
| 2007/0198485 A1 | 8/2007 | Ramer et al. |
| 2007/0239724 A1 | 10/2007 | Ramer et al. |
| 2007/0260635 A1 | 11/2007 | Ramer et al. |
| 2007/0288427 A1 | 12/2007 | Ramer et al. |
| 2008/0009268 A1 | 1/2008 | Ramer et al. |
| 2008/0040224 A1 | 2/2008 | Roker |
| 2008/0040225 A1 | 2/2008 | Roker |
| 2008/0040226 A1 | 2/2008 | Roker |
| 2008/0177994 A1 | 7/2008 | Mayer |
| 2008/0195428 A1 | 8/2008 | O'Sullivan |
| 2008/0214148 A1 | 9/2008 | Ramer et al. |
| 2008/0214149 A1 | 9/2008 | Ramer et al. |
| 2008/0214150 A1 | 9/2008 | Ramer et al. |
| 2008/0214151 A1 | 9/2008 | Ramer et al. |
| 2008/0214152 A1 | 9/2008 | Ramer et al. |
| 2008/0214153 A1 | 9/2008 | Ramer et al. |
| 2008/0214154 A1 | 9/2008 | Ramer et al. |
| 2008/0214155 A1 | 9/2008 | Ramer et al. |
| 2008/0214156 A1 | 9/2008 | Ramer et al. |
| 2008/0214157 A1 | 9/2008 | Ramer et al. |
| 2008/0214162 A1 | 9/2008 | Ramer et al. |
| 2008/0214166 A1 | 9/2008 | Ramer et al. |
| 2008/0214204 A1 | 9/2008 | Ramer et al. |
| 2008/0215428 A1 | 9/2008 | Ramer et al. |
| 2008/0215429 A1 | 9/2008 | Ramer et al. |
| 2008/0215475 A1 | 9/2008 | Ramer et al. |
| 2008/0215557 A1 | 9/2008 | Ramer et al. |
| 2008/0215623 A1 | 9/2008 | Ramer et al. |
| 2008/0242279 A1 | 10/2008 | Ramer et al. |
| 2008/0270220 A1 | 10/2008 | Ramer et al. |
| 2008/0270417 A1 | 10/2008 | Roker |
| 2009/0029687 A1 | 1/2009 | Ramer et al. |
| 2009/0031006 A1 | 1/2009 | Johnson |
| 2009/0222329 A1 | 9/2009 | Ramer et al. |
| 2009/0234711 A1 | 9/2009 | Ramer et al. |
| 2009/0234745 A1 | 9/2009 | Ramer et al. |
| 2009/0234861 A1 | 9/2009 | Ramer et al. |
| 2009/0240568 A1 | 9/2009 | Ramer et al. |
| 2009/0240569 A1 | 9/2009 | Ramer et al. |
| 2009/0240586 A1 | 9/2009 | Ramer et al. |
| 2009/0313318 A1 | 12/2009 | Dye et al. |
| 2010/0030578 A1 | 2/2010 | Siddique et al. |
| 2010/0057801 A1 | 3/2010 | Ramer et al. |
| 2010/0063877 A1 | 3/2010 | Soroca et al. |
| 2010/0076845 A1 | 3/2010 | Ramer et al. |
| 2010/0076994 A1 | 3/2010 | Soroca et al. |
| 2010/0082430 A1 | 4/2010 | Ramer et al. |
| 2010/0082431 A1 | 4/2010 | Ramer et al. |
| 2010/0094878 A1 | 4/2010 | Soroca et al. |
| 2010/0107225 A1 | 4/2010 | Spencer et al. |
| 2010/0121705 A1 | 5/2010 | Ramer et al. |
| 2010/0131584 A1 | 5/2010 | Johnson |
| 2010/0138293 A1 | 6/2010 | Ramer et al. |
| 2010/0138296 A1 | 6/2010 | Ramer et al. |
| 2010/0145804 A1 | 6/2010 | Ramer et al. |
| 2010/0153208 A1 | 6/2010 | Ramer et al. |
| 2010/0153211 A1 | 6/2010 | Ramer et al. |
| 2010/0169179 A1 | 7/2010 | Ramer et al. |
| 2010/0188975 A1 | 7/2010 | Raleigh |
| 2010/0188990 A1 | 7/2010 | Raleigh |
| 2010/0188991 A1 | 7/2010 | Raleigh |
| 2010/0188992 A1 | 7/2010 | Raleigh |
| 2010/0188993 A1 | 7/2010 | Raleigh |
| 2010/0188994 A1 | 7/2010 | Raleigh |
| 2010/0188995 A1 | 7/2010 | Raleigh |
| 2010/0190470 A1 | 7/2010 | Raleigh |
| 2010/0191575 A1 | 7/2010 | Raleigh |
| 2010/0191576 A1 | 7/2010 | Raleigh |
| 2010/0191604 A1 | 7/2010 | Raleigh |
| 2010/0191612 A1 | 7/2010 | Raleigh |
| 2010/0191613 A1 | 7/2010 | Raleigh |
| 2010/0191846 A1 | 7/2010 | Raleigh |
| 2010/0191847 A1 | 7/2010 | Raleigh |
| 2010/0192120 A1 | 7/2010 | Raleigh |
| 2010/0192170 A1 | 7/2010 | Raleigh |
| 2010/0192207 A1 | 7/2010 | Raleigh |
| 2010/0192212 A1 | 7/2010 | Raleigh |
| 2010/0198681 A1 | 8/2010 | Ramer et al. |
| 2010/0211458 A1 | 8/2010 | Ramer et al. |
| 2010/0217662 A1 | 8/2010 | Ramer et al. |
| 2010/0217663 A1 | 8/2010 | Ramer et al. |
| 2010/0217837 A1 | 8/2010 | Ansari et al. |
| 2010/0271934 A1* | 10/2010 | Holliday ............... H04W 40/24 370/221 |
| 2010/0287048 A1 | 11/2010 | Ramer et al. |
| 2010/0293051 A1 | 11/2010 | Ramer et al. |
| 2010/0312572 A1 | 12/2010 | Ramer et al. |
| 2011/0015993 A1 | 1/2011 | Ramer et al. |
| 2011/0015994 A1 | 1/2011 | Ramer et al. |
| 2011/0029378 A1 | 2/2011 | Ramer et al. |
| 2011/0029387 A1 | 2/2011 | Ramer et al. |
| 2011/0059693 A1 | 3/2011 | O'Sullivan |
| 2011/0106614 A1 | 5/2011 | Ramer et al. |
| 2011/0143731 A1 | 6/2011 | Ramer et al. |
| 2011/0143733 A1 | 6/2011 | Ramer et al. |
| 2011/0145076 A1 | 6/2011 | Ramer et al. |
| 2011/0153428 A1 | 6/2011 | Ramer et al. |
| 2011/0159902 A1 | 6/2011 | Ramer et al. |
| 2011/0177799 A1 | 7/2011 | Ramer et al. |
| 2011/0202874 A1 | 8/2011 | Ramer et al. |
| 2011/0258046 A1 | 10/2011 | Ramer et al. |
| 2011/0258049 A1 | 10/2011 | Spencer et al. |
| 2011/0275393 A1 | 11/2011 | Ramer et al. |
| 2011/0312310 A1 | 12/2011 | Ramer et al. |
| 2011/0313853 A1 | 12/2011 | Ramer et al. |
| 2011/0313862 A1 | 12/2011 | Ramer et al. |
| 2011/0320264 A1 | 12/2011 | Ramer et al. |
| 2011/0320265 A1 | 12/2011 | Ramer et al. |
| 2011/0320266 A1 | 12/2011 | Ramer et al. |
| 2011/0320267 A1 | 12/2011 | Ramer et al. |
| 2011/0320268 A1 | 12/2011 | Ramer et al. |
| 2011/0320269 A1 | 12/2011 | Ramer et al. |
| 2011/0320270 A1 | 12/2011 | Ramer et al. |
| 2011/0320271 A1 | 12/2011 | Ramer et al. |
| 2011/0320279 A1 | 12/2011 | Ramer et al. |
| 2011/0320280 A1 | 12/2011 | Ramer et al. |
| 2011/0320281 A1 | 12/2011 | Ramer et al. |
| 2011/0320282 A1 | 12/2011 | Ramer et al. |
| 2012/0004984 A1 | 1/2012 | Ramer et al. |
| 2012/0004985 A1 | 1/2012 | Ramer et al. |
| 2012/0004986 A1 | 1/2012 | Ramer et al. |

(56) References Cited

U.S. PATENT DOCUMENTS

| | | |
|---|---|---|
| 2012/0004987 A1 | 1/2012 | Ramer et al. |
| 2012/0004988 A1 | 1/2012 | Ramer et al. |
| 2012/0004989 A1 | 1/2012 | Ramer et al. |
| 2012/0004990 A1 | 1/2012 | Ramer et al. |
| 2012/0004991 A1 | 1/2012 | Ramer et al. |
| 2012/0004992 A1 | 1/2012 | Ramer et al. |
| 2012/0004993 A1 | 1/2012 | Ramer et al. |
| 2012/0004994 A1 | 1/2012 | Ramer et al. |
| 2012/0004995 A1 | 1/2012 | Ramer et al. |
| 2012/0004996 A1 | 1/2012 | Ramer et al. |
| 2012/0004997 A1 | 1/2012 | Ramer et al. |
| 2012/0004998 A1 | 1/2012 | Ramer et al. |
| 2012/0004999 A1 | 1/2012 | Ramer et al. |
| 2012/0005000 A1 | 1/2012 | Ramer et al. |
| 2012/0005001 A1 | 1/2012 | Ramer et al. |
| 2012/0005002 A1 | 1/2012 | Ramer et al. |
| 2012/0005003 A1 | 1/2012 | Ramer et al. |
| 2012/0005004 A1 | 1/2012 | Ramer et al. |
| 2012/0005005 A1 | 1/2012 | Ramer et al. |
| 2012/0005006 A1 | 1/2012 | Ramer et al. |
| 2012/0005007 A1 | 1/2012 | Ramer et al. |
| 2012/0005008 A1 | 1/2012 | Ramer et al. |
| 2012/0005009 A1 | 1/2012 | Ramer et al. |
| 2012/0005010 A1 | 1/2012 | Ramer et al. |
| 2012/0005011 A1 | 1/2012 | Ramer et al. |
| 2012/0005012 A1 | 1/2012 | Ramer et al. |
| 2012/0005013 A1 | 1/2012 | Ramer et al. |
| 2012/0005014 A1 | 1/2012 | Ramer et al. |
| 2012/0005020 A1 | 1/2012 | Ramer et al. |
| 2012/0010945 A1 | 1/2012 | Ramer et al. |
| 2012/0010946 A1 | 1/2012 | Ramer et al. |
| 2012/0010947 A1 | 1/2012 | Ramer et al. |
| 2012/0010948 A1 | 1/2012 | Ramer et al. |
| 2012/0010949 A1 | 1/2012 | Ramer et al. |
| 2012/0010950 A1 | 1/2012 | Ramer et al. |
| 2012/0010951 A1 | 1/2012 | Ramer et al. |
| 2012/0010952 A1 | 1/2012 | Ramer et al. |
| 2012/0010953 A1 | 1/2012 | Ramer et al. |
| 2012/0010954 A1 | 1/2012 | Ramer et al. |
| 2012/0010955 A1 | 1/2012 | Ramer et al. |
| 2012/0010956 A1 | 1/2012 | Ramer et al. |
| 2012/0010957 A1 | 1/2012 | Ramer et al. |
| 2012/0010958 A1 | 1/2012 | Ramer et al. |
| 2012/0010959 A1 | 1/2012 | Ramer et al. |
| 2012/0010960 A1 | 1/2012 | Ramer et al. |
| 2012/0010961 A1 | 1/2012 | Ramer et al. |
| 2012/0010962 A1 | 1/2012 | Ramer et al. |
| 2012/0010963 A1 | 1/2012 | Ramer et al. |
| 2012/0010964 A1 | 1/2012 | Ramer et al. |
| 2012/0010965 A1 | 1/2012 | Ramer et al. |
| 2012/0010966 A1 | 1/2012 | Ramer et al. |
| 2012/0010967 A1 | 1/2012 | Ramer et al. |
| 2012/0010968 A1 | 1/2012 | Ramer et al. |
| 2012/0010969 A1 | 1/2012 | Ramer et al. |
| 2012/0010970 A1 | 1/2012 | Ramer et al. |
| 2012/0010971 A1 | 1/2012 | Ramer et al. |
| 2012/0010972 A1 | 1/2012 | Ramer et al. |
| 2012/0010973 A1 | 1/2012 | Ramer et al. |
| 2012/0010974 A1 | 1/2012 | Ramer et al. |
| 2012/0010975 A1 | 1/2012 | Ramer et al. |
| 2012/0010976 A1 | 1/2012 | Ramer et al. |
| 2012/0010977 A1 | 1/2012 | Ramer et al. |
| 2012/0010978 A1 | 1/2012 | Ramer et al. |
| 2012/0010979 A1 | 1/2012 | Ramer et al. |
| 2012/0010980 A1 | 1/2012 | Ramer et al. |
| 2012/0010981 A1 | 1/2012 | Ramer et al. |
| 2012/0010982 A1 | 1/2012 | Ramer et al. |
| 2012/0010983 A1 | 1/2012 | Ramer et al. |
| 2012/0010984 A1 | 1/2012 | Ramer et al. |
| 2012/0010985 A1 | 1/2012 | Ramer et al. |
| 2012/0010986 A1 | 1/2012 | Ramer et al. |
| 2012/0010987 A1 | 1/2012 | Ramer et al. |
| 2012/0010988 A1 | 1/2012 | Ramer et al. |
| 2012/0010989 A1 | 1/2012 | Ramer et al. |
| 2012/0010990 A1 | 1/2012 | Ramer et al. |
| 2012/0010991 A1 | 1/2012 | Ramer et al. |
| 2012/0016739 A1 | 1/2012 | Ramer et al. |
| 2012/0016740 A1 | 1/2012 | Ramer et al. |
| 2012/0016750 A1 | 1/2012 | Ramer et al. |
| 2012/0016751 A1 | 1/2012 | Ramer et al. |
| 2012/0036010 A1 | 2/2012 | Ramer et al. |
| 2012/0041819 A1 | 2/2012 | Ramer et al. |
| 2012/0059711 A1 | 3/2012 | Ramer et al. |
| 2012/0059718 A1 | 3/2012 | Ramer et al. |
| 2012/0066057 A1 | 3/2012 | Ramer et al. |
| 2012/0066198 A1 | 3/2012 | Ramer et al. |
| 2012/0066199 A1 | 3/2012 | Ramer et al. |
| 2012/0069131 A1 | 3/2012 | Abelow |
| 2012/0088470 A1 | 4/2012 | Raleigh |
| 2012/0089845 A1 | 4/2012 | Raleigh |
| 2012/0089996 A1 | 4/2012 | Ramer et al. |
| 2012/0130811 A1 | 5/2012 | Ramer et al. |
| 2012/0130812 A1 | 5/2012 | Ramer et al. |
| 2012/0134291 A1 | 5/2012 | Raleigh |
| 2012/0150629 A1 | 6/2012 | Ramer et al. |
| 2012/0167185 A1 | 6/2012 | Menezes et al. |
| 2012/0170521 A1 | 7/2012 | Vogedes et al. |
| 2012/0173358 A1 | 7/2012 | Soroca et al. |
| 2012/0173359 A1 | 7/2012 | Soroca et al. |
| 2012/0173360 A1 | 7/2012 | Soroca et al. |
| 2012/0173361 A1 | 7/2012 | Soroca et al. |
| 2012/0173362 A1 | 7/2012 | Soroca et al. |
| 2012/0173363 A1 | 7/2012 | Soroca et al. |
| 2012/0173364 A1 | 7/2012 | Soroca et al. |
| 2012/0173365 A1 | 7/2012 | Soroca et al. |
| 2012/0173366 A1 | 7/2012 | Soroca et al. |
| 2012/0173367 A1 | 7/2012 | Soroca et al. |
| 2012/0173368 A1 | 7/2012 | Soroca et al. |
| 2012/0173369 A1 | 7/2012 | Soroca et al. |
| 2012/0173370 A1 | 7/2012 | Soroca et al. |
| 2012/0173371 A1 | 7/2012 | Soroca et al. |
| 2012/0173372 A1 | 7/2012 | Soroca et al. |
| 2012/0173373 A1 | 7/2012 | Soroca et al. |
| 2012/0173374 A1 | 7/2012 | Soroca et al. |
| 2012/0173375 A1 | 7/2012 | Soroca et al. |
| 2012/0173376 A1 | 7/2012 | Soroca et al. |
| 2012/0173377 A1 | 7/2012 | Soroca et al. |
| 2012/0173378 A1 | 7/2012 | Soroca et al. |
| 2012/0173379 A1 | 7/2012 | Soroca et al. |
| 2012/0179562 A1 | 7/2012 | Soroca et al. |
| 2012/0179563 A1 | 7/2012 | Soroca et al. |
| 2012/0179564 A1 | 7/2012 | Soroca et al. |
| 2012/0179565 A1 | 7/2012 | Soroca et al. |
| 2012/0179566 A1 | 7/2012 | Soroca et al. |
| 2012/0179567 A1 | 7/2012 | Soroca et al. |
| 2012/0179568 A1 | 7/2012 | Soroca et al. |
| 2012/0179785 A1 | 7/2012 | Wu et al. |
| 2012/0185349 A1 | 7/2012 | Soroca et al. |
| 2012/0192249 A1 | 7/2012 | Raleigh |
| 2012/0195206 A1 | 8/2012 | Raleigh |
| 2012/0195222 A1 | 8/2012 | Raleigh |
| 2012/0195223 A1 | 8/2012 | Raleigh |
| 2012/0196565 A1 | 8/2012 | Raleigh |
| 2012/0197792 A1 | 8/2012 | Raleigh |
| 2012/0201133 A1 | 8/2012 | Raleigh |
| 2012/0203677 A1 | 8/2012 | Raleigh |
| 2012/0208496 A1 | 8/2012 | Raleigh |
| 2012/0209705 A1 | 8/2012 | Ramer et al. |
| 2012/0209706 A1 | 8/2012 | Ramer et al. |
| 2012/0209707 A1 | 8/2012 | Ramer et al. |
| 2012/0209708 A1 | 8/2012 | Ramer et al. |
| 2012/0209709 A1 | 8/2012 | Ramer et al. |
| 2012/0209710 A1 | 8/2012 | Ramer et al. |
| 2012/0209750 A1 | 8/2012 | Raleigh |
| 2012/0210391 A1 | 8/2012 | Raleigh |
| 2012/0214441 A1 | 8/2012 | Raleigh |
| 2012/0214443 A1 | 8/2012 | Daigle |
| 2012/0215602 A1 | 8/2012 | Ramer et al. |
| 2012/0215612 A1 | 8/2012 | Ramer et al. |
| 2012/0215622 A1 | 8/2012 | Ramer et al. |
| 2012/0215623 A1 | 8/2012 | Ramer et al. |
| 2012/0215624 A1 | 8/2012 | Ramer et al. |
| 2012/0215625 A1 | 8/2012 | Ramer et al. |
| 2012/0215626 A1 | 8/2012 | Ramer et al. |

(56) References Cited

U.S. PATENT DOCUMENTS

| | | |
|---|---|---|
| 2012/0215635 A1 | 8/2012 | Ramer et al. |
| 2012/0215639 A1 | 8/2012 | Ramer et al. |
| 2012/0215640 A1 | 8/2012 | Ramer et al. |
| 2012/0221685 A1 | 8/2012 | Wu et al. |
| 2012/0238255 A1 | 9/2012 | Ramer et al. |
| 2012/0239498 A1 | 9/2012 | Ramer et al. |
| 2012/0265613 A1 | 10/2012 | Ramer et al. |
| 2012/0270567 A1 | 10/2012 | Johnson |
| 2012/0294195 A1 | 11/2012 | Raleigh |
| 2012/0330750 A1 | 12/2012 | Ramer et al. |
| 2013/0003613 A1 | 1/2013 | Raleigh |
| 2013/0005299 A1 | 1/2013 | Raleigh |
| 2013/0005322 A1 | 1/2013 | Raleigh |
| 2013/0006729 A1 | 1/2013 | Raleigh |
| 2013/0006780 A1 | 1/2013 | Raleigh |
| 2013/0012178 A1 | 1/2013 | Ramer et al. |
| 2013/0040703 A1 | 2/2013 | Raleigh |
| 2013/0045710 A1 | 2/2013 | Raleigh |
| 2013/0046582 A1 | 2/2013 | Ramer et al. |
| 2013/0053005 A1 | 2/2013 | Ramer et al. |
| 2013/0055097 A1 | 2/2013 | Soroca et al. |
| 2013/0066723 A1 | 3/2013 | Ramer et al. |
| 2013/0066750 A1 | 3/2013 | Siddique et al. |
| 2013/0072149 A1 | 3/2013 | Raleigh |
| 2013/0080447 A1 | 3/2013 | Ramer et al. |
| 2013/0080607 A1 | 3/2013 | Raleigh |
| 2013/0096998 A1 | 4/2013 | Raleigh |
| 2013/0097015 A1 | 4/2013 | Ramer et al. |
| 2013/0122874 A1 | 5/2013 | Ramer et al. |
| 2013/0124317 A1 | 5/2013 | Ramer et al. |
| 2013/0125219 A1 | 5/2013 | Raleigh |
| 2013/0130672 A1 | 5/2013 | Ramer et al. |
| 2013/0132578 A1 | 5/2013 | Raleigh |
| 2013/0133028 A1 | 5/2013 | Raleigh |
| 2013/0144722 A1 | 6/2013 | Ramer et al. |
| 2013/0144724 A1 | 6/2013 | Ramer et al. |
| 2013/0167196 A1 | 6/2013 | Spencer et al. |
| 2013/0215116 A1 | 8/2013 | Siddique et al. |
| 2013/0215795 A1 | 8/2013 | Raleigh |
| 2013/0227659 A1 | 8/2013 | Raleigh |
| 2013/0229951 A1 | 9/2013 | Raleigh |
| 2013/0231084 A1 | 9/2013 | Raleigh |
| 2013/0235766 A1 | 9/2013 | Raleigh |
| 2013/0238424 A1 | 9/2013 | Ramer et al. |
| 2013/0238443 A1 | 9/2013 | Ramer et al. |
| 2013/0239194 A1 | 9/2013 | Raleigh |
| 2013/0246183 A1 | 9/2013 | Ramer et al. |
| 2013/0250768 A1 | 9/2013 | Raleigh |
| 2013/0254035 A1 | 9/2013 | Ramer et al. |
| 2013/0275209 A1 | 10/2013 | Ramer et al. |
| 2013/0275226 A1 | 10/2013 | Ramer et al. |
| 2013/0275227 A1 | 10/2013 | Ramer et al. |
| 2013/0282482 A1 | 10/2013 | Ramer et al. |
| 2013/0282491 A1 | 10/2013 | Ramer et al. |
| 2013/0297404 A1 | 11/2013 | Ramer et al. |
| 2013/0304581 A1 | 11/2013 | Soroca et al. |
| 2013/0311297 A1 | 11/2013 | Ramer et al. |
| 2013/0325610 A1 | 12/2013 | Ramer et al. |
| 2014/0012664 A1 | 1/2014 | Ramer et al. |
| 2014/0012665 A1 | 1/2014 | Ramer et al. |
| 2014/0024340 A1 | 1/2014 | Raleigh |
| 2014/0025494 A1 | 1/2014 | Ramer et al. |
| 2014/0025502 A1 | 1/2014 | Ramer et al. |
| 2014/0046761 A1 | 2/2014 | Ramer et al. |
| 2014/0066100 A1 | 3/2014 | Johnson |
| 2014/0073357 A1 | 3/2014 | Johnson |
| 2014/0089089 A1 | 3/2014 | Ramer et al. |
| 2014/0098671 A1 | 4/2014 | Raleigh et al. |
| 2014/0113583 A1 | 4/2014 | Raleigh |
| 2014/0113622 A1 | 4/2014 | Vogedes et al. |
| 2014/0122243 A1 | 5/2014 | Ramer et al. |
| 2014/0129332 A1 | 5/2014 | Ramer et al. |
| 2014/0154975 A1* | 6/2014 | Lambert ............ H04L 63/0492 455/41.1 |
| 2014/0164113 A1 | 6/2014 | Ramer et al. |
| 2014/0164630 A1 | 6/2014 | Wu et al. |
| 2014/0180825 A1 | 6/2014 | Ramer et al. |
| 2014/0181100 A1 | 6/2014 | Ramer et al. |
| 2014/0198687 A1 | 7/2014 | Raleigh |
| 2014/0199962 A1 | 7/2014 | Mohammed et al. |
| 2014/0214239 A1* | 7/2014 | Bruck ............... G05D 1/0016 701/2 |
| 2014/0214526 A1 | 7/2014 | Ramer et al. |
| 2014/0214527 A1 | 7/2014 | Ramer et al. |
| 2014/0215513 A1 | 7/2014 | Ramer et al. |
| 2014/0235230 A1 | 8/2014 | Raleigh |
| 2014/0236718 A1 | 8/2014 | Ramer et al. |
| 2014/0237250 A1 | 8/2014 | Menezes et al. |
| 2014/0273998 A1 | 9/2014 | Ramer et al. |
| 2014/0309806 A1 | 10/2014 | Ricci |
| 2014/0309870 A1 | 10/2014 | Ricci et al. |
| 2014/0309880 A1 | 10/2014 | Ricci |
| 2014/0309886 A1 | 10/2014 | Ricci |
| 2014/0309891 A1 | 10/2014 | Ricci |
| 2014/0310594 A1 | 10/2014 | Ricci et al. |
| 2014/0310610 A1 | 10/2014 | Ricci |
| 2014/0310739 A1 | 10/2014 | Ricci et al. |
| 2014/0315527 A1 | 10/2014 | Ramer et al. |
| 2014/0324572 A1 | 10/2014 | Ramer et al. |
| 2014/0344065 A1 | 11/2014 | Ramer et al. |
| 2014/0357222 A1 | 12/2014 | Mohammed et al. |
| 2015/0019329 A1 | 1/2015 | Ramer et al. |
| 2015/0052192 A1 | 2/2015 | Chauhan |
| 2015/0074259 A1 | 3/2015 | Ansari et al. |
| 2015/0163366 A1 | 6/2015 | Mohammed et al. |
| 2015/0163694 A1 | 6/2015 | Raleigh |
| 2015/0170072 A1 | 6/2015 | Grant et al. |
| 2015/0195171 A1 | 7/2015 | Mermoud et al. |
| 2015/0195176 A1 | 7/2015 | Vasseur et al. |
| 2015/0195184 A1 | 7/2015 | Vasseur et al. |
| 2015/0195185 A1 | 7/2015 | Dasgupta et al. |
| 2015/0195192 A1 | 7/2015 | Vasseur et al. |
| 2015/0195212 A1 | 7/2015 | Vasseur et al. |
| 2015/0195216 A1 | 7/2015 | Di Pietro et al. |
| 2015/0195296 A1 | 7/2015 | Vasseur et al. |
| 2015/0195414 A1 | 7/2015 | Raleigh |
| 2015/0195692 A1 | 7/2015 | Chow et al. |
| 2015/0195698 A1 | 7/2015 | Inha et al. |
| 2015/0195714 A1 | 7/2015 | Raleigh |
| 2015/0200713 A1 | 7/2015 | Hui et al. |
| 2015/0200714 A1 | 7/2015 | Hui et al. |
| 2015/0200738 A1 | 7/2015 | Wetterwald et al. |
| 2015/0200810 A1 | 7/2015 | Vasseur et al. |
| 2015/0200846 A1 | 7/2015 | Hui et al. |
| 2015/0200870 A1 | 7/2015 | Hui et al. |
| 2015/0200882 A1 | 7/2015 | Raleigh |
| 2015/0201329 A1 | 7/2015 | Daigle |
| 2015/0201331 A1 | 7/2015 | Raleigh |
| 2015/0201333 A1 | 7/2015 | Raleigh |
| 2015/0206337 A1 | 7/2015 | Roimela |
| 2015/0206343 A1 | 7/2015 | Mattila et al. |
| 2015/0207725 A1 | 7/2015 | Hui et al. |
| 2015/0207916 A1 | 7/2015 | Xue et al. |
| 2015/0208203 A1 | 7/2015 | Cao et al. |
| 2015/0213056 A1 | 7/2015 | Maluf et al. |
| 2015/0213088 A1 | 7/2015 | Joshi et al. |
| 2015/0215243 A1 | 7/2015 | Xu et al. |
| 2015/0215323 A1 | 7/2015 | Grigoriev et al. |
| 2015/0215786 A1 | 7/2015 | Raleigh |
| 2015/0219464 A1 | 8/2015 | Beaurepaire et al. |
| 2015/0220127 A1 | 8/2015 | Kukoyi |
| 2015/0220555 A1 | 8/2015 | Wang et al. |
| 2015/0220988 A1 | 8/2015 | Joshi et al. |
| 2015/0222477 A1 | 8/2015 | Ranjan et al. |
| 2015/0222490 A1 | 8/2015 | Salam et al. |
| 2015/0223009 A1 | 8/2015 | Krishnaswamy et al. |
| 2015/0223201 A1 | 8/2015 | Joshi et al. |
| 2015/0226565 A1 | 8/2015 | Beaurepaire et al. |
| 2015/0227538 A1 | 8/2015 | Rambacher et al. |
| 2015/0228195 A1 | 8/2015 | Beaurepaire et al. |
| 2015/0230078 A1 | 8/2015 | Kandangath et al. |
| 2015/0230091 A1 | 8/2015 | Sahu et al. |
| 2015/0232065 A1 | 8/2015 | Ricci et al. |
| 2015/0237021 A1 | 8/2015 | Sovio et al. |

(56) References Cited

U.S. PATENT DOCUMENTS

| | | |
|---|---|---|
| 2015/0237130 A1 | 8/2015 | Hui et al. |
| 2015/0237659 A1 | 8/2015 | Schena et al. |
| 2015/0242868 A1 | 8/2015 | Perelmutov et al. |
| 2015/0244721 A1 | 8/2015 | Spencer et al. |
| 2015/0244826 A1 | 8/2015 | Stenneth |
| 2015/0245276 A1 | 8/2015 | Lee et al. |
| 2015/0245291 A1 | 8/2015 | Lee et al. |
| 2015/0248231 A1 | 9/2015 | Mandyam et al. |
| 2015/0249942 A9 | 9/2015 | Yoon et al. |
| 2015/0253946 A1 | 9/2015 | Chandrasekara |
| 2015/0254303 A1 | 9/2015 | Saadat et al. |
| 2015/0254465 A1 | 9/2015 | Ekberg et al. |
| 2015/0254557 A1 | 9/2015 | Athas et al. |
| 2015/0254692 A1 | 9/2015 | Xu et al. |
| 2015/0256354 A1 | 9/2015 | Zeger et al. |
| 2015/0256569 A1 | 9/2015 | Sathish et al. |
| 2015/0260536 A1 | 9/2015 | Tuukkanen |
| 2015/0264626 A1 | 9/2015 | Perdomo |
| 2015/0264627 A1 | 9/2015 | Perdomo |
| 2015/0268057 A1 | 9/2015 | Tuukkanen |
| 2015/0268355 A1 | 9/2015 | Valentino et al. |
| 2015/0269361 A1 | 9/2015 | Grassel et al. |
| 2015/0271258 A1 | 9/2015 | Eggert |
| 2015/0276421 A1 | 10/2015 | Beaurepaire et al. |
| 2015/0283902 A1 | 10/2015 | Tuukkanen |
| 2015/0287241 A1 | 10/2015 | Huston et al. |
| 2015/0287246 A1 | 10/2015 | Huston et al. |
| 2015/0288805 A1 | 10/2015 | Ma et al. |
| 2015/0291157 A1 | 10/2015 | Beaurepaire et al. |
| 2015/0293512 A1 | 10/2015 | Egge |
| 2015/0296335 A1 | 10/2015 | Joshi et al. |
| 2015/0298317 A1 | 10/2015 | Wang et al. |
| 2015/0300835 A1 | 10/2015 | Fowe et al. |
| 2015/0303740 A1 | 10/2015 | Maguire et al. |
| 2015/0304123 A1 | 10/2015 | Hall |
| 2015/0308838 A1 | 10/2015 | Mishra |
| 2015/0310739 A1 | 10/2015 | Beaurepaire et al. |
| 2015/0311948 A1 | 10/2015 | Hui et al. |
| 2015/0312394 A1 | 10/2015 | Mirza et al. |
| 2015/0312707 A1 | 10/2015 | Luong et al. |
| 2015/0312764 A1 | 10/2015 | Tuukkanen et al. |
| 2015/0312863 A1 | 10/2015 | Shen et al. |
| 2015/0314449 A1 | 11/2015 | Wang et al. |
| 2015/0316640 A1 | 11/2015 | Jarske et al. |
| 2015/0317144 A1 | 11/2015 | Khushraj |
| 2015/0317649 A1 | 11/2015 | Joshi et al. |
| 2015/0317836 A1 | 11/2015 | Beaurepaire et al. |
| 2015/0318891 A1 | 11/2015 | Hui et al. |
| 2015/0318892 A1 | 11/2015 | Hui et al. |
| 2015/0318911 A1 | 11/2015 | Samios |
| 2015/0319076 A1 | 11/2015 | Vasseur et al. |
| 2015/0319077 A1 | 11/2015 | Vasseur et al. |
| 2015/0319084 A1 | 11/2015 | Hui et al. |
| 2015/0319630 A1 | 11/2015 | Kerberg et al. |
| 2015/0324582 A1 | 11/2015 | Vasseur et al. |
| 2015/0326450 A1 | 11/2015 | Cruz Mota et al. |
| 2015/0326523 A1 | 11/2015 | Reilly et al. |
| 2015/0326560 A1 | 11/2015 | Menezes et al. |
| 2015/0326598 A1 | 11/2015 | Vasseur et al. |
| 2015/0326609 A1 | 11/2015 | Cruz Mota et al. |
| 2015/0326688 A1 | 11/2015 | Aarnio et al. |
| 2015/0326689 A1 | 11/2015 | Leppanen et al. |
| 2015/0327260 A1 | 11/2015 | Hui et al. |
| 2015/0327261 A1 | 11/2015 | Thubert et al. |
| 2015/0331652 A1 | 11/2015 | Jantunen et al. |
| 2015/0331930 A1 | 11/2015 | Xing et al. |
| 2015/0332165 A1 | 11/2015 | Mermoud et al. |
| 2015/0333997 A1 | 11/2015 | Mermoud et al. |
| 2015/0334031 A1 | 11/2015 | Vasseur et al. |
| 2015/0334123 A1 | 11/2015 | Di Pietro et al. |
| 2015/0334768 A1 | 11/2015 | Ranasinghe et al. |
| 2015/0338223 A1 | 11/2015 | Letz |
| 2015/0338525 A1 | 11/2015 | Valentino et al. |
| 2015/0339371 A1 | 11/2015 | Cao et al. |
| 2015/0341140 A1 | 11/2015 | Hui et al. |
| 2015/0341169 A1 | 11/2015 | Leppanen et al. |
| 2015/0341241 A1 | 11/2015 | Robertson |
| 2015/0341275 A1 | 11/2015 | Hui et al. |
| 2015/0346993 A1 | 12/2015 | Suryanarayana et al. |
| 2015/0347116 A1 | 12/2015 | Ugur et al. |
| 2015/0347683 A1 | 12/2015 | Ansari et al. |
| 2015/0350018 A1 | 12/2015 | Hui et al. |
| 2015/0350335 A1 | 12/2015 | Zhang et al. |
| 2015/0350409 A1 | 12/2015 | Tuukkanen |
| 2015/0350835 A1 | 12/2015 | Kuramura et al. |
| 2015/0356763 A1 | 12/2015 | Fulks et al. |
| 2015/0358830 A1 | 12/2015 | Bajko |
| 2015/0363748 A1 | 12/2015 | Beaurepaire et al. |
| 2015/0372819 A1 | 12/2015 | Luukkala et al. |
| 2015/0372903 A1 | 12/2015 | Hui et al. |
| 2015/0373206 A1 | 12/2015 | Mohammed et al. |
| 2015/0373556 A1 | 12/2015 | Oren-Pines et al. |
| 2015/0377635 A1 | 12/2015 | Beaurepaire et al. |
| 2015/0378583 A1 | 12/2015 | Tuukkanen |
| 2015/0379240 A1 | 12/2015 | Blom et al. |
| 2015/0380818 A1 | 12/2015 | Svendsen et al. |
| 2015/0382278 A1 | 12/2015 | Fallon et al. |
| 2016/0006773 A1 | 1/2016 | Joshi |
| 2016/0007209 A1 | 1/2016 | Hohs et al. |
| 2016/0012132 A1 | 1/2016 | Que et al. |
| 2016/0013950 A1 | 1/2016 | Hall |
| 2016/0019515 A1 | 1/2016 | Milne et al. |
| 2016/0019788 A1 | 1/2016 | Milne et al. |
| 2016/0020864 A1 | 1/2016 | Thubert et al. |
| 2016/0020967 A1 | 1/2016 | Thubert et al. |
| 2016/0020979 A1 | 1/2016 | Thubert et al. |
| 2016/0020987 A1 | 1/2016 | Wetterwald et al. |
| 2016/0020988 A1 | 1/2016 | Hui et al. |
| 2016/0020997 A1 | 1/2016 | Hui et al. |
| 2016/0021006 A1 | 1/2016 | Vasseur et al. |
| 2016/0021009 A1 | 1/2016 | Hui et al. |
| 2016/0021010 A1 | 1/2016 | Vasseur et al. |
| 2016/0021011 A1 | 1/2016 | Vasseur et al. |
| 2016/0021013 A1 | 1/2016 | Vasseur et al. |
| 2016/0021014 A1 | 1/2016 | Wetterwald et al. |
| 2016/0021017 A1 | 1/2016 | Thubert et al. |
| 2016/0021018 A1 | 1/2016 | Hui et al. |
| 2016/0021126 A1 | 1/2016 | Vasseur et al. |
| 2016/0021491 A1 | 1/2016 | Milne et al. |
| 2016/0021492 A1 | 1/2016 | Carlsson et al. |
| 2016/0021493 A1 | 1/2016 | Milne et al. |
| 2016/0021510 A1 | 1/2016 | Milne et al. |
| 2016/0021544 A1 | 1/2016 | Potkonjak |
| 2016/0021596 A1 | 1/2016 | Hui et al. |
| 2016/0021647 A1 | 1/2016 | Hui et al. |
| 2016/0026542 A1 | 1/2016 | Vasseur et al. |
| 2016/0027054 A1 | 1/2016 | Leppanen et al. |
| 2016/0028445 A1 | 1/2016 | Mofidi et al. |
| 2016/0028609 A1 | 1/2016 | Hui et al. |
| 2016/0028750 A1 | 1/2016 | Di Pietro et al. |
| 2016/0028751 A1 | 1/2016 | Cruz Mota et al. |
| 2016/0028752 A1 | 1/2016 | Di Pietro et al. |
| 2016/0028753 A1 | 1/2016 | Di Pietro et al. |
| 2016/0028754 A1 | 1/2016 | Cruz Mota et al. |
| 2016/0028755 A1 | 1/2016 | Vasseur et al. |
| 2016/0028762 A1 | 1/2016 | Di Pietro et al. |
| 2016/0028763 A1 | 1/2016 | Cruz Mota et al. |
| 2016/0029182 A1 | 1/2016 | Leppanen |
| 2016/0029210 A1 | 1/2016 | Rainisto |
| 2016/0033289 A1 | 2/2016 | Tuukkanen et al. |
| 2016/0037303 A1 | 2/2016 | Johnson |
| 2016/0040996 A1 | 2/2016 | Skillman et al. |
| 2016/0042350 A1 | 2/2016 | Puura et al. |
| 2016/0043775 A1 | 2/2016 | Ravani et al. |
| 2016/0044035 A1 | 2/2016 | Huang |
| 2016/0046021 A1 | 2/2016 | Wang et al. |
| 2016/0050183 A1 | 2/2016 | Biswas et al. |
| 2016/0050210 A1 | 2/2016 | Nguyen et al. |
| 2016/0054984 A1 | 2/2016 | Chee et al. |
| 2016/0063528 A1 | 3/2016 | Zhang |
| 2016/0064955 A1 | 3/2016 | Zuerner |
| 2016/0066132 A1 | 3/2016 | Hillan et al. |
| 2016/0071020 A1 | 3/2016 | Sathish et al. |
| 2016/0073229 A1 | 3/2016 | Haro et al. |

(56) References Cited

U.S. PATENT DOCUMENTS

| | | |
|---|---|---|
| 2016/0073252 A1 | 3/2016 | Spencer et al. |
| 2016/0073271 A1 | 3/2016 | Schultz et al. |
| 2016/0073373 A1 | 3/2016 | Lewis-Evans et al. |
| 2016/0077187 A1 | 3/2016 | Sathish et al. |
| 2016/0080030 A1 | 3/2016 | Hui et al. |
| 2016/0081102 A1 | 3/2016 | Ji |
| 2016/0086108 A1 | 3/2016 | Abelow |
| 2016/0087328 A1 | 3/2016 | Lee et al. |
| 2016/0093206 A1 | 3/2016 | Pfeifle |
| 2016/0094398 A1 | 3/2016 | Choudhury et al. |
| 2016/0105556 A1 | 4/2016 | Arrasvuori et al. |
| 2016/0105906 A1 | 4/2016 | Hui et al. |
| 2016/0106368 A1 | 4/2016 | Wu et al. |
| 2016/0110156 A1 | 4/2016 | Kusano |
| 2016/0112744 A1 | 4/2016 | Kusano |
| 2016/0112745 A1 | 4/2016 | Kusano |
| 2016/0112821 A1 | 4/2016 | Raleigh |
| 2016/0114247 A1 | 4/2016 | Biswas et al. |
| 2016/0125735 A1 | 5/2016 | Tuukkanen |
| 2016/0127857 A1 | 5/2016 | O'Donoghue et al. |
| 2016/0127900 A1 | 5/2016 | John Archibald et al. |
| 2016/0127942 A1 | 5/2016 | Ghanadan et al. |
| 2016/0132370 A1 | 5/2016 | Keskitalo et al. |
| 2016/0132397 A1 | 5/2016 | Hui et al. |
| 2016/0134161 A1 | 5/2016 | Hui et al. |
| 2016/0134468 A1 | 5/2016 | Hui et al. |
| 2016/0134514 A1 | 5/2016 | Hui et al. |
| 2016/0134516 A1 | 5/2016 | Hui et al. |
| 2016/0134539 A1 | 5/2016 | Hui et al. |
| 2016/0138492 A1 | 5/2016 | Levy et al. |
| 2016/0138926 A1 | 5/2016 | Annapureddy et al. |
| 2016/0140353 A1 | 5/2016 | Biswas et al. |
| 2016/0140625 A1 | 5/2016 | Suomela |
| 2016/0142109 A1 | 5/2016 | Kumar et al. |
| 2016/0142111 A1 | 5/2016 | Hillan |
| 2016/0142248 A1 | 5/2016 | Thubert et al. |
| 2016/0142901 A1 | 5/2016 | Leppanen et al. |
| 2016/0144853 A1 | 5/2016 | Stenneth et al. |
| 2016/0146617 A1 | 5/2016 | MacFarlane |
| 2016/0147416 A1 | 5/2016 | MacFarlane et al. |
| 2016/0147826 A1 | 5/2016 | Mishra |
| 2016/0148513 A1 | 5/2016 | Beaurepaire |
| 2016/0149805 A1 | 5/2016 | Hui et al. |
| 2016/0149856 A1 | 5/2016 | Hui et al. |
| 2016/0150501 A1 | 5/2016 | Hui et al. |
| 2016/0150575 A1 | 5/2016 | Andersen et al. |
| 2016/0151710 A1 | 6/2016 | Hall |
| 2016/0154113 A1 | 6/2016 | Leibner et al. |
| 2016/0156450 A1 | 6/2016 | Hui et al. |
| 2016/0156593 A1 | 6/2016 | Yan |
| 2016/0156670 A1 | 6/2016 | Biswas |
| 2016/0157067 A1 | 6/2016 | Capota et al. |
| 2016/0157088 A1 | 6/2016 | Puusaari et al. |
| 2016/0159368 A1 | 6/2016 | Tuukkanen |
| 2016/0161268 A1 | 6/2016 | Lynch |
| 2016/0162472 A1 | 6/2016 | Lynch |
| 2016/0163191 A1 | 6/2016 | Lynch |
| 2016/0169683 A1 | 6/2016 | Lynch |
| 2016/0169692 A1 | 6/2016 | Gupta |
| 2016/0169930 A1 | 6/2016 | Korhonen et al. |
| 2016/0171278 A1 | 6/2016 | Ponder et al. |
| 2016/0171885 A1 | 6/2016 | Lynch |
| 2016/0173327 A1 | 6/2016 | Boonie et al. |
| 2016/0174267 A1 | 6/2016 | Mofidi et al. |
| 2016/0176408 A1 | 6/2016 | Lynch |
| 2016/0178381 A1 | 6/2016 | Lynch |
| 2016/0179749 A1 | 6/2016 | Lynch |
| 2016/0179874 A1 | 6/2016 | Lynch |
| 2016/0180384 A1 | 6/2016 | Ramer et al. |
| 2016/0180500 A1 | 6/2016 | Barnes |
| 2016/0182121 A1 | 6/2016 | Shaffer et al. |
| 2016/0182170 A1 | 6/2016 | Daoura et al. |
| 2016/0182365 A1 | 6/2016 | Chang et al. |
| 2016/0182397 A1 | 6/2016 | Mcfarlin et al. |
| 2016/0183060 A1 | 6/2016 | Seyde et al. |
| 2016/0183120 A1 | 6/2016 | Baker |
| 2016/0187148 A1 | 6/2016 | Unger et al. |
| 2016/0187491 A1 | 6/2016 | Scott et al. |
| 2016/0187492 A1 | 6/2016 | Raghunathan et al. |
| 2016/0187493 A1 | 6/2016 | Salasky et al. |
| 2016/0187856 A1 | 6/2016 | Vilermo et al. |
| 2016/0189098 A1 | 6/2016 | Beaurepaire et al. |
| 2016/0189544 A1 | 6/2016 | Ricci |
| 2016/0195403 A1 | 7/2016 | Tuukkanen |
| 2016/0195602 A1 | 7/2016 | Meadow |
| 2016/0197800 A1 | 7/2016 | Hui et al. |
| 2016/0205419 A1 | 7/2016 | Ricci et al. |
| 2016/0210602 A1 | 7/2016 | Siddique et al. |
| 2016/0212178 A1 | 7/2016 | Zhang et al. |
| 2016/0212740 A1 | 7/2016 | Hui et al. |
| 2016/0217146 A1 | 7/2016 | Schmidt |
| 2016/0219012 A1 | 7/2016 | Liao et al. |
| 2016/0219038 A1 | 7/2016 | Stephenson et al. |
| 2016/0219042 A1 | 7/2016 | Otranen et al. |
| 2016/0223343 A1 | 8/2016 | Averbuch et al. |
| 2016/0224951 A1 | 8/2016 | Hoffberg |
| 2016/0225027 A1 | 8/2016 | Ramer et al. |
| 2016/0225301 A1 | 8/2016 | Scepanovic et al. |
| 2016/0227465 A1 | 8/2016 | Corinella |
| 2016/0231122 A1 | 8/2016 | Beaurepaire |
| 2016/0234272 A1 | 8/2016 | Hui et al. |
| 2016/0234637 A1 | 8/2016 | Lucero et al. |
| 2016/0234648 A1 | 8/2016 | Letz et al. |
| 2016/0239181 A1 | 8/2016 | You et al. |
| 2016/0239688 A1 | 8/2016 | Biswas et al. |
| 2016/0241721 A1 | 8/2016 | Soelberg et al. |
| 2016/0242217 A1 | 8/2016 | Yan |
| 2016/0247394 A1 | 8/2016 | Stenneth |
| 2016/0247397 A1 | 8/2016 | Xu et al. |
| 2016/0248390 A1 | 8/2016 | Issakov et al. |
| 2016/0248627 A1 | 8/2016 | Hillan |
| 2016/0248661 A1 | 8/2016 | Dasgupta et al. |
| 2016/0249293 A1 | 8/2016 | Lee |
| 2016/0253342 A1 | 9/2016 | Ramer et al. |
| 2016/0255478 A1 | 9/2016 | Milne et al. |
| 2016/0258754 A1 | 9/2016 | MacFarlane |
| 2016/0259951 A1 | 9/2016 | Pececnik |
| 2016/0260325 A1 | 9/2016 | Modica et al. |
| 2016/0261977 A1 | 9/2016 | Arrasvuori et al. |
| 2016/0265933 A1 | 9/2016 | Skillman et al. |
| 2016/0269981 A1 | 9/2016 | Hall |
| 2016/0275081 A1 | 9/2016 | Tian et al. |
| 2016/0275102 A1 | 9/2016 | Haro et al. |
| 2016/0277201 A1 | 9/2016 | Thubert et al. |
| 2016/0277261 A9 | 9/2016 | Ansari et al. |
| 2016/0277469 A1 | 9/2016 | Gilson et al. |
| 2016/0283516 A1 | 9/2016 | Barnes et al. |
| 2016/0285173 A1 | 9/2016 | Svendsen et al. |
| 2016/0285481 A1 | 9/2016 | Cohen |
| 2016/0285841 A1 | 9/2016 | Marcy et al. |
| 2016/0291820 A1 | 10/2016 | Mak et al. |
| 2016/0291834 A1 | 10/2016 | De Vallois et al. |
| 2016/0292434 A1 | 10/2016 | Nefedov et al. |
| 2016/0292830 A1 | 10/2016 | Chen et al. |
| 2016/0292999 A1 | 10/2016 | Watts-Fitzgerald et al. |
| 2016/0293001 A1 | 10/2016 | Xu et al. |
| 2016/0294493 A2 | 10/2016 | Daoura et al. |
| 2016/0294548 A1 | 10/2016 | Qian et al. |
| 2016/0294811 A1 | 10/2016 | Otranen et al. |
| 2016/0300150 A1 | 10/2016 | Watts-Fitzgerald et al. |
| 2016/0300302 A1 | 10/2016 | Singer |
| 2016/0308793 A1 | 10/2016 | Levy-Abegnoli et al. |
| 2016/0308975 A1 | 10/2016 | Yang et al. |
| 2016/0316036 A1 | 10/2016 | Lection et al. |
| 2016/0316037 A1 | 10/2016 | Lection et al. |
| 2016/0323279 A1 | 11/2016 | Raleigh |
| 2016/0323731 A1 | 11/2016 | Mohammed et al. |
| 2016/0328376 A1 | 11/2016 | Macfarlane et al. |
| 2016/0330107 A1 | 11/2016 | Thubert et al. |
| 2016/0330200 A1 | 11/2016 | Ansari et al. |
| 2016/0330567 A1 | 11/2016 | Raleigh |
| 2016/0330589 A1 | 11/2016 | Tuukkanen |
| 2016/0335796 A1 | 11/2016 | Roimela |
| 2016/0341564 A1 | 11/2016 | Cheng |

(56) References Cited

U.S. PATENT DOCUMENTS

| | | |
|---|---|---|
| 2016/0342584 A1 | 11/2016 | Han et al. |
| 2016/0342862 A1 | 11/2016 | Liu et al. |
| 2016/0356612 A1 | 12/2016 | Beaurepaire |
| 2016/0357367 A1 | 12/2016 | Foster et al. |
| 2016/0358479 A1 | 12/2016 | Rtedelsheimer et al. |
| 2016/0359665 A1 | 12/2016 | Raleigh |
| 2016/0360303 A1 | 12/2016 | Armstrong |
| 2016/0364224 A1 | 12/2016 | Tuukkanen |
| 2016/0366044 A1 | 12/2016 | Cheng |
| 2016/0366553 A1 | 12/2016 | Belimpasakis et al. |
| 2016/0370462 A1 | 12/2016 | Yang et al. |
| 2016/0373891 A1 | 12/2016 | Ramer et al. |
| 2016/0379094 A1 | 12/2016 | Mittal et al. |
| 2016/0379485 A1 | 12/2016 | Anastassov et al. |
| 2016/0379488 A1 | 12/2016 | Fowe et al. |
| 2016/0380776 A1 | 12/2016 | Thubert et al. |
| 2016/0380914 A1 | 12/2016 | Tuukkanen |
| 2016/0381087 A1 | 12/2016 | Addepalli et al. |
| 2017/0004303 A1 | 1/2017 | Yan |
| 2017/0011338 A1 | 1/2017 | Stenneth et al. |
| 2017/0011343 A1 | 1/2017 | Stenneth et al. |
| 2017/0011465 A1 | 1/2017 | Anastassov et al. |
| 2017/0023944 A1 | 1/2017 | Wang et al. |
| 2017/0025000 A1 | 1/2017 | Lagassey |
| 2017/0026893 A1 | 1/2017 | Lagassey |
| 2017/0032129 A1 | 2/2017 | Linde et al. |
| 2017/0032667 A1 | 2/2017 | Fowe et al. |
| 2017/0034041 A1 | 2/2017 | Carofiglio et al. |
| 2017/0034692 A1 | 2/2017 | Spencer et al. |
| 2017/0039695 A1 | 2/2017 | Castro et al. |
| 2017/0041246 A1 | 2/2017 | Maino et al. |
| 2017/0041472 A1 | 2/2017 | Steadman |
| 2017/0041868 A1 | 2/2017 | Palin et al. |
| 2017/0046956 A1 | 2/2017 | Gaebler et al. |
| 2017/0048079 A1 | 2/2017 | Nethi et al. |
| 2017/0048853 A1 | 2/2017 | Thubert et al. |
| 2017/0052675 A1 | 2/2017 | Paila et al. |
| 2017/0053623 A1 | 2/2017 | Purayil et al. |
| 2017/0054644 A1 | 2/2017 | Dasgupta et al. |
| 2017/0054732 A1 | 2/2017 | Stolfo et al. |
| 2017/0056724 A1 | 3/2017 | Baker |
| 2017/0059353 A1 | 3/2017 | Madine et al. |
| 2017/0060397 A1 | 3/2017 | Junge et al. |
| 2017/0069208 A1 | 3/2017 | Nair et al. |
| 2017/0069209 A1 | 3/2017 | Beaurepaire et al. |
| 2017/0072851 A1 | 3/2017 | Shenoy et al. |
| 2017/0074659 A1 | 3/2017 | Giurgiu et al. |
| 2017/0074663 A1 | 3/2017 | Giurgiu et al. |
| 2017/0075701 A1 | 3/2017 | Ricci et al. |
| 2017/0076599 A1 | 3/2017 | Gupta et al. |
| 2017/0076606 A1 | 3/2017 | Gupta et al. |
| 2017/0078170 A1 | 3/2017 | Vasseur et al. |
| 2017/0078922 A1 | 3/2017 | Raleigh et al. |
| 2017/0080952 A1 | 3/2017 | Gupta et al. |
| 2017/0084077 A1 | 3/2017 | Liu et al. |
| 2017/0093687 A1 | 3/2017 | Wu et al. |
| 2017/0093899 A1 | 3/2017 | Horesh et al. |
| 2017/0094455 A1 | 3/2017 | Beaurepaire |
| 2017/0099184 A1 | 4/2017 | Oommen et al. |
| 2017/0099226 A1 | 4/2017 | Vasseur et al. |
| 2017/0099592 A1 | 4/2017 | Loeb et al. |
| 2017/0099684 A1 | 4/2017 | Hui et al. |
| 2017/0102700 A1 | 4/2017 | Kozak |
| 2017/0102703 A1 | 4/2017 | Lynch |
| 2017/0103088 A1 | 4/2017 | Tuukkanen |
| 2017/0103213 A1 | 4/2017 | Di Pietro et al. |
| 2017/0103654 A1 | 4/2017 | Gaebler et al. |
| 2017/0105104 A1 | 4/2017 | Ulmansky et al. |
| 2017/0109612 A1 | 4/2017 | Mittal et al. |
| 2017/0111271 A1 | 4/2017 | Thubert et al. |
| 2017/0118307 A1 | 4/2017 | Beaurepaire et al. |
| 2017/0118518 A1 | 4/2017 | Kannan et al. |
| 2017/0120846 A1 | 5/2017 | Gupta et al. |
| 2017/0124883 A1 | 5/2017 | Modica et al. |
| 2017/0126406 A1 | 5/2017 | Reddy et al. |
| 2017/0126647 A1 | 5/2017 | Zhang et al. |
| 2017/0132922 A1 | 5/2017 | Gupta et al. |
| 2017/0134646 A1 | 5/2017 | Lucero et al. |
| 2017/0134921 A1 | 5/2017 | Meskauskas et al. |
| 2017/0134938 A1 | 5/2017 | Blom |
| 2017/0146350 A1 | 5/2017 | Beaurepaire |
| 2017/0146353 A1 | 5/2017 | Kroeller et al. |
| 2017/0149639 A1 | 5/2017 | Vasseur et al. |
| 2017/0149882 A1 | 5/2017 | Roy |
| 2017/0149952 A1 | 5/2017 | Sarkaria |
| 2017/0150369 A1 | 5/2017 | Wang et al. |
| 2017/0150469 A1 | 5/2017 | Puusaari et al. |
| 2017/0161639 A1 | 6/2017 | Zeng et al. |
| 2017/0163527 A1 | 6/2017 | Vasseur et al. |
| 2017/0164264 A1 | 6/2017 | Kato et al. |
| 2017/0164340 A1 | 6/2017 | Xu et al. |
| 2017/0166115 A1 | 6/2017 | Pal et al. |
| 2017/0177710 A1 | 6/2017 | Burlik |
| 2017/0180262 A1 | 6/2017 | Thubert et al. |
| 2017/0180914 A1 | 6/2017 | Xu et al. |
| 2017/0181629 A1 | 6/2017 | Mahalingam et al. |
| 2017/0181630 A1 | 6/2017 | Mahalingam et al. |
| 2017/0181645 A1 | 6/2017 | Mahalingam et al. |
| 2017/0187661 A1 | 6/2017 | Hui et al. |
| 2017/0193300 A1 | 7/2017 | Shatz et al. |
| 2017/0195044 A1 | 7/2017 | Shatz et al. |
| 2017/0195045 A1 | 7/2017 | Shatz et al. |
| 2017/0195049 A1 | 7/2017 | Shatz et al. |
| 2017/0195050 A1 | 7/2017 | Shatz et al. |
| 2017/0195166 A1 | 7/2017 | Keerthi et al. |
| 2017/0195554 A1 | 7/2017 | Shatz et al. |
| 2017/0195644 A1 | 7/2017 | Shatz et al. |
| 2017/0206215 A1 | 7/2017 | Blom et al. |
| 2017/0206512 A1 | 7/2017 | Hoffberg |
| 2017/0206529 A1 | 7/2017 | Raleigh |
| 2017/0209789 A1 | 7/2017 | Ferrazzino et al. |
| 2017/0215073 A1 | 7/2017 | Raleigh |
| 2017/0221463 A1 | 8/2017 | Lenhert |
| 2017/0223516 A1 | 8/2017 | Raleigh |
| 2017/0223628 A1 | 8/2017 | Snyder et al. |
| 2017/0228937 A1 | 8/2017 | Murphy et al. |
| 2017/0230118 A1 | 8/2017 | Shatz et al. |
| 2017/0230888 A1 | 8/2017 | Fulknier et al. |
| 2017/0235744 A1 | 8/2017 | Pfaff |
| 2017/0237669 A1 | 8/2017 | Hui et al. |
| 2017/0242428 A1 | 8/2017 | Pal et al. |
| 2017/0243026 A1 | 8/2017 | Vaha-Sipila et al. |
| 2017/0243392 A1 | 8/2017 | Velkavrh et al. |
| 2017/0244484 A1 | 8/2017 | Shatz et al. |
| 2017/0245096 A1 | 8/2017 | Baroudi et al. |
| 2017/0255705 A1 | 9/2017 | Yang |
| 2017/0257178 A1 | 9/2017 | Hall |
| 2017/0264437 A1 | 9/2017 | Fu et al. |
| 2017/0270195 A1 | 9/2017 | Zhang et al. |
| 2017/0270556 A1 | 9/2017 | Eklund |
| 2017/0272144 A1 | 9/2017 | Thubert et al. |
| 2017/0272315 A1 | 9/2017 | Wetterwald et al. |
| 2017/0277911 A1 | 9/2017 | Boldyrev et al. |
| 2017/0279878 A1 | 9/2017 | Charters et al. |
| 2017/0280113 A1 | 9/2017 | Shatz et al. |
| 2017/0280273 A1 | 9/2017 | Xu et al. |
| 2017/0280308 A1 | 9/2017 | Charters et al. |
| 2017/0280333 A1 | 9/2017 | May et al. |
| 2017/0284839 A1 | 10/2017 | Ojala |
| 2017/0286852 A1 | 10/2017 | Rezaie et al. |
| 2017/0287003 A1 | 10/2017 | Piippo et al. |
| 2017/0288988 A1 | 10/2017 | Pignataro et al. |
| 2017/0289762 A1 | 10/2017 | Cudalbu et al. |
| 2017/0289892 A1* | 10/2017 | Charters ............... H04W 4/029 |
| 2017/0295081 A1 | 10/2017 | Mermoud et al. |
| 2017/0295604 A1 | 10/2017 | Andersen et al. |
| 2017/0300693 A1 | 10/2017 | Zhang et al. |
| 2017/0302374 A1 | 10/2017 | Shatz et al. |
| 2017/0302663 A1 | 10/2017 | Nainar et al. |
| 2017/0303068 A1 | 10/2017 | Hall |
| 2017/0318117 A1 | 11/2017 | Stenneth |
| 2017/0322312 A1 | 11/2017 | Fischer et al. |
| 2017/0323478 A1 | 11/2017 | Mattila et al. |
| 2017/0324730 A1 | 11/2017 | Otranen et al. |

(56) References Cited

U.S. PATENT DOCUMENTS

| | | |
|---|---|---|
| 2017/0324791 A1 | 11/2017 | Kuulusa |
| 2017/0324849 A1 | 11/2017 | Pfister et al. |
| 2017/0332240 A1 | 11/2017 | Raleigh |
| 2017/0334069 A1 | 11/2017 | Wang et al. |
| 2017/0339099 A1 | 11/2017 | Levy-Abegnoli et al. |
| 2017/0344703 A1 | 11/2017 | Ansari et al. |
| 2017/0345299 A1 | 11/2017 | Gupta et al. |
| 2017/0350717 A1 | 12/2017 | Cheng |
| 2017/0352262 A1 | 12/2017 | Xu et al. |
| 2017/0353884 A1 | 12/2017 | Baker |
| 2017/0353978 A1 | 12/2017 | Ulinskas |
| 2017/0355301 A1 | 12/2017 | Pal et al. |
| 2017/0364409 A1 | 12/2017 | Hui et al. |
| 2017/0365102 A1 | 12/2017 | Huston et al. |
| 2017/0366342 A1 | 12/2017 | Gehrmann |
| 2017/0366456 A1 | 12/2017 | Dara et al. |
| 2017/0367086 A1 | 12/2017 | Pistoia et al. |
| 2017/0372054 A1 | 12/2017 | Palin et al. |
| 2017/0372576 A1 | 12/2017 | Choe et al. |
| 2017/0373393 A1 | 12/2017 | Tatomirescu et al. |
| 2017/0373775 A1 | 12/2017 | Daoura et al. |
| 2017/0374073 A1 | 12/2017 | Schoppmeier |
| 2017/0374490 A1 | 12/2017 | Schoppmeier |
| 2018/0007518 A1 | 1/2018 | O'Berry et al. |
| 2018/0012461 A1 | 1/2018 | Hill et al. |
| 2018/0014241 A1 | 1/2018 | Perdomo |
| 2018/0025010 A1 | 1/2018 | Ramer et al. |
| 2018/0026891 A1 | 1/2018 | Vasseur et al. |
| 2018/0032535 A1 | 2/2018 | Johnson |
| 2018/0033060 A1 | 2/2018 | Eronen et al. |
| 2018/0036545 A1* | 2/2018 | Schwibner .............. G06F 21/31 |
| 2018/0037336 A1 | 2/2018 | Rammos |
| 2018/0049043 A1 | 2/2018 | Hoffberg |

* cited by examiner

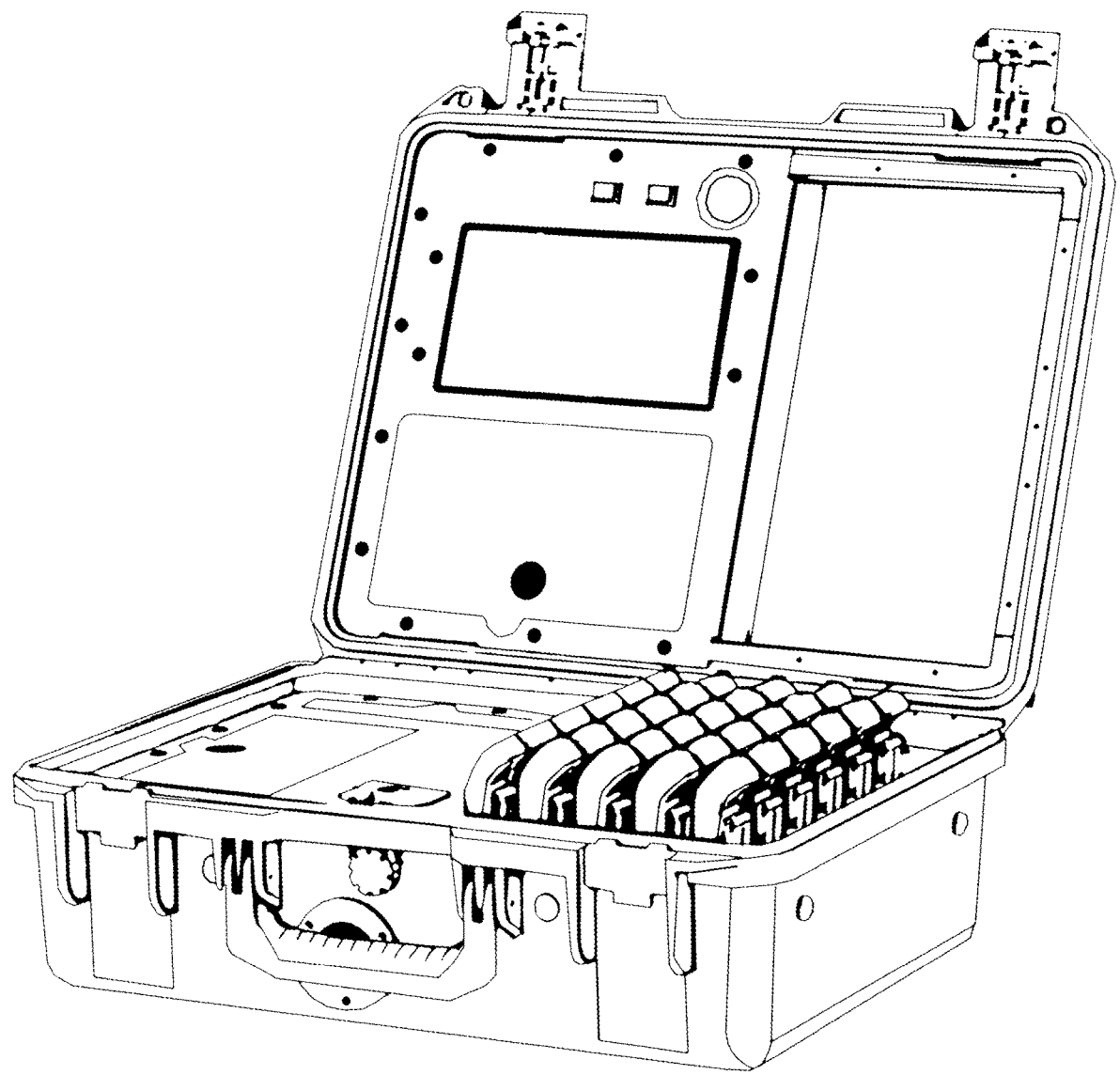

MESH NETWORK DEPLOYMENT KIT

CROSS REFERENCE TO RELATED APPLICATIONS

The present application is a Division of U.S. patent application Ser. No. 16/360,874, filed Mar. 21, 2019, now U.S. Pat. No. 10,813,169, issued Oct. 20, 2020, which is a non-provisional of, and claims benefit of priority under 35 U.S.C. § 119(e) from, U.S. Provisional Patent Application No. 62/646,684, filed Mar. 22, 2019, the entirety of which are expressly incorporated herein by reference.

FIELD OF THE INVENTION

The present invention relates to the field of venue or location-specific software deployment systems.

BACKGROUND OF THE INVENTION

Smartphone applications are increasingly a critical part of emergency response, military, and even regular civilian operations when disasters and other sensitive activities occur. Having up-to-date and broadly distributed applications can often be the difference between being able to operate effectively or not. However, absent a locked-down infrastructure, which can mandate software application synchronization, which mediates against a "bring your own device" (BYOD) paradigm, assuring that each device involved in a network, i.e., a smartphone, is executing the same application. Further, in some environments, the hardware is subject to differences, and may require programming for the location or venue in which it is intended to operate.

Due to the centralized network-based distribution models for modern smartphone applications (e.g., iOS App Store & Google Play Stores), having up-to-date and broadly accessible smartphone applications is a challenge when network connectivity cannot be assured, because regular users either do not know specialty procedures for off-network app distribution, or are simply unprepared with the proper permissions and files to do so when needed. This challenge is compounded by the fact that usually when emergency apps are needed most, like during natural disasters, is precisely when network connectivity is most likely to be unavailable leading to compromised ability to respond as many users may not have up-to-date apps or may have not installed the appropriate apps at all beforehand. This reliance on individual users always being prepared with proper applications before an emergency is a critical vulnerability for effective off-grid smartphone-based emergency operations.

An "app" is a program that executes under an operating system, typically of a mobile device, and typically which provides a limited set of functionality, and typically only though services provided by the operating system.

As mobile phone applications are usually quite large, often averaging over 50 MB, and perhaps more if mapping data is included, even if some resilient connectivity might be available, such as a satellite communications (sitcom) link, it is completely unreasonable from a bandwidth and cost perspective to download an app from the regular network. Thus, the common availability of downloadable applications for smartphones when Internet or other wide area networking communications are presumed to be impaired, is an unsolved problem.

After core applications are installed/updated, they are often in a vanilla "fresh install" mode, which may not allow full operation. This is to be expected, as most applications are designed to be installed and initialized while on a regular network connection, as such many applications often depend on additional data being delivered from a regular network connection before their application can be operated.

Although storing app files for installing on smartphones offline is a process that exists already, it has historically been a convoluted technical process requiring a high degree of technical expertise and advanced preparation to download the appropriate files on to a phone so they can be provisioned successfully offline.

A common example of critical data that is often missing when an application (or "app") is freshly installed is map data for applications that deal with geospatial information. Map data is often very large even for small local areas, so mapping apps almost never carry any detailed map data within their native app packages, instead they are more of a rendering engine and the map data must be downloaded post-installation from a server, dependent on the location or venue of interest.

It is also notoriously difficult to upgrade the firmware on electronic hardware. Outside of fully networked devices like smartphones and other general computing devices, the challenge in upgrading standalone electronics that are not fully networked, like off-grid radios or laser range-finders for example, primarily lie in the difficulty in delivering firmware upgrade files to a hardware device safely and reliably. Then depending on the capabilities built into that particular electronic device, the next challenge is executing a bootloading sequence that is either executed by the device itself, or must be run by an external updating software system.

Due to these challenges, as well as the general lack of knowledge by the public on the general topic of firmware in general, it is very common for electronic hardware devices to never have their critical software upgraded from whatever stock files were installed during manufacturing. This is very problematic as critical bug fixes and performance enhancements can be missed, or in more serious cases, can lead to compatibility breaking fragmentation of electronics that might be expected to work together in some way.

Further, many modern firmware updates are distributed via the cloud for networked and semi-networked devices, and if that cloud is gone (temporarily unavailable, or server disabled), there is usually no way to upgrade the firmware on a device off-grid unless there is some method/process to deliver new firmware files locally.

It is well known to provide page redirects for forcing a user to a local home page, rather than the universal resource locator (URL) sought by the client. The home page, in turn, permits login and/or authentication of the user to the network. In some cases, the redirected page can provide some information to the user before logging in, and without general network access. See, U.S. Pat. Nos. 6,754,192; 6,763,013; 6,763,014; 6,850,511; 6,879,574; 6,894,985; 6,940,832; 6,954,435; 6,961,310; 6,975,614; 6,985,476; 7,007,102; 7,027,426; 7,058,021; 7,068,600; 7,068,605; 7,079,552; 7,085,290; 7,110,779; 7,116,661; 7,129,890; 7,142,524; 7,142,866; 7,177,295; 7,177,594; 7,190,961; 7,271,736; 7,299,038; 7,321,777; 7,339,897; 7,342,876; 7,342,907; 7,343,244; 7,356,329; 7,373,108; 7,382,765; 7,391,730; 7,394,826; 7,417,962; 7,447,174; 7,450,517; 7,453,864; 7,463,612; 7,468,954; 7,471,626; 7,480,248; 7,486,627; 7,495,687; 7,512,079; 7,512,783; 7,519,045; 7,522,547; 7,535,881; 7,542,437; 7,548,915; 7,551,892; 7,554,982; 7,570,927; 7,573,835; 7,577,107; 7,577,108; 7,577,665; 7,590,589; 7,599,665; 7,603,360; 7,606,176; 7,616,961; 7,634,230; 7,639,681; 7,643,509; 7,644,105; 7,646,754; 7,649,872; 7,653,355; 7,656,857; 7,656,879;

7,660,319; 7,660,581; 7,668,958; 7,676,394; 7,693,093;
7,693,119; 7,693,167; 7,697,456; 7,702,318; 7,710,870;
7,715,885; 7,719,987; 7,719,988; 7,719,989; 7,733,818;
7,734,278; 7,752,209; 7,756,041; 7,764,617; 7,764,635;
7,769,764; 7,778,230; 7,787,865; 7,788,387; 7,801,058;
7,813,314; 7,813,326; 7,822,023; 7,822,384; 7,822,852;
7,840,427; 7,843,822; 7,849,139; 7,852,763; 7,852,816;
7,860,871; 7,860,968; 7,865,187; 7,876,706; 7,877,176;
7,881,340; 7,881,667; 7,890,568; 7,898,979; 7,899,455;
7,902,973; 7,907,940; 7,912,458; 7,924,745; 7,936,697;
7,944,899; 7,948,966; 7,957,355; 7,961,626; 7,965,671;
7,965,845; 7,969,914; 7,970,389; 7,974,302; 7,983,619;
7,983,662; 7,983,835; 8,005,100; 8,005,879; 8,009,648;
8,014,404; 8,018,840; 8,023,425; 8,027,273; 8,027,879;
8,041,717; 8,050,675; 8,054,762; 8,054,819; 8,060,013;
8,060,017; 8,060,389; 8,060,590; 8,064,879; 8,065,411;
8,065,419; 8,072,906; 8,072,928; 8,073,565; 8,078,139;
8,085,686; 8,090,395; 8,099,434; 8,099,505; 8,103,545;
8,115,617; 8,121,066; 8,127,039; 8,131,271; 8,131,737;
8,131,838; 8,135,021; 8,139,504; 8,144,619; 8,149,716;
8,149,733; 8,150,372; 8,150,835; 8,155,045; 8,155,711;
8,156,128; 8,156,208; 8,165,143; 8,175,585; 8,180,332;
8,180,352; 8,185,101; 8,190,938; 8,191,128; 8,194,541;
8,195,133; 8,195,513; 8,199,664; 8,200,205; 8,201,094;
8,204,800; 8,204,886; 8,209,344; 8,213,409; 8,218,511;
8,218,514; 8,219,309; 8,228,954; 8,229,440; 8,229,812;
8,229,914; 8,238,288; 8,238,888; 8,243,639; 8,244,246;
8,245,315; 8,250,207; 8,255,469; 8,255,716; 8,266,551;
8,270,310; 8,270,952; 8,270,955; 8,271,433; 8,280,308;
8,280,345; 8,285,859; 8,290,516; 8,290,810; 8,290,952;
8,296,184; 8,296,408; 8,296,413; 8,300,615; 8,301,125;
8,301,838; 8,302,030; 8,311,888; 8,315,791; 8,316,031;
8,320,879; 8,321,228; 8,321,526; 8,321,587; 8,325,612;
8,326,958; 8,331,901; 8,332,397; 8,332,624; 8,335,522;
8,335,819; 8,335,989; 8,335,990; 8,340,666; 8,341,185;
8,341,196; 8,341,279; 8,341,289; 8,346,210; 8,346,915;
8,351,861; 8,351,884; 8,351,898; 8,351,933; 8,355,337;
8,355,410; 8,359,019; 8,363,662; 8,364,521; 8,364,540;
8,369,242; 8,370,863; 8,374,170; 8,385,240; 8,385,916;
8,386,715; 8,391,401; 8,392,541; 8,396,458; 8,396,788;
8,401,191; 8,401,560; 8,401,572; 8,401,934; 8,406,153;
8,406,733; 8,407,351; 8,411,567; 8,411,590; 8,412,185;
8,422,957; 8,423,508; 8,427,508; 8,429,398; 8,433,297;
8,437,271; 8,441,989; 8,442,549; 8,447,849; 8,447,974;
8,451,744; 8,452,572; 8,452,784; 8,452,858; 8,457,067;
8,457,607; 8,457,653; 8,458,799; 8,463,249; 8,467,312;
8,467,774; 8,472,348; 8,478,667; 8,478,812; 8,479,107;
8,483,671; 8,483,674; 8,484,234; 8,484,661; 8,488,589;
8,488,783; 8,489,077; 8,489,600; 8,489,669; 8,489,765;
8,490,075; 8,490,151; 8,493,407; 8,494,500; 8,498,224;
8,498,416; 8,503,309; 8,503,363; 8,503,995; 8,504,285;
8,508,471; 8,509,088; 8,509,180; 8,509,750; 8,510,025;
8,514,829; 8,515,400; 8,515,401; 8,515,409; 8,516,552;
8,520,606; 8,520,676; 8,521,887; 8,522,341; 8,527,584;
8,527,622; 8,531,986; 8,532,633; 8,532,634; 8,538,678;
8,538,812; 8,543,143; 8,543,532; 8,543,665; 8,543,917;
8,547,232; 8,547,872; 8,547,875; 8,549,010; 8,553,688;
8,553,728; 8,554,131; 8,554,192; 8,554,251; 8,555,349;
8,559,442; 8,560,537; 8,566,020; 8,570,892; 8,570,908;
8,571,004; 8,571,467; 8,571,519; 8,576,184; 8,576,846;
8,578,015; 8,578,054; 8,582,593; 8,583,089; 8,583,781;
8,583,978; 8,588,108; 8,588,110; 8,588,126; 8,593,253;
8,593,255; 8,593,331; 8,593,986; 8,594,625; 8,595,359;
8,599,014; 8,600,402; 8,600,619; 8,600,830; 8,601,137;
8,601,380; 8,606,329; 8,606,499; 8,612,583; 8,615,505;
8,615,551; 8,615,719; 8,619,576; 8,619,789; 8,620,285;
8,621,203; 8,621,563; 8,621,656; 8,625,544; 8,626,736;
8,627,092; 8,630,177; 8,630,192; 8,630,275; 8,630,291;
8,630,611; 8,631,018; 8,631,102; 8,631,436; 8,634,348;
8,635,678; 8,639,811; 8,639,935; 8,640,198; 8,655,891;
8,660,891; 8,666,364; 8,666,376; 8,667,571; 8,675,507;
8,688,088; 8,688,099; 8,688,671; 8,695,073; 8,712,395;
8,713,589; 8,713,630; 8,718,617; 8,724,554; 8,725,126;
8,737,957; 8,737,972; 8,744,485; 8,745,121; 8,750,167;
8,750,845; 8,751,159; 8,751,644; 8,755,776; 8,756,002;
8,756,173; 8,756,449; 8,761,285; 8,762,276; 8,768,319;
8,768,865; 8,769,125; 8,769,320; 8,774,050; 8,774,147;
8,774,777; 8,777,752; 8,780,136; 8,780,953; 8,781,392;
8,782,309; 8,787,392; 8,788,369; 8,789,204; 8,792,860;
8,797,878; 8,797,908; 8,798,592; 8,798,594; 8,798,595;
8,798,634; 8,799,228; 8,799,451; 8,799,510; 8,800,010;
8,803,089; 8,803,661; 8,805,339; 8,805,598; 8,806,633;
8,810,368; 8,811,514; 8,811,942; 8,812,228; 8,812,232;
8,812,499; 8,812,526; 8,812,688; 8,812,990; 8,816,845;
8,817,665; 8,818,025; 8,818,331; 8,818,396; 8,818,397;
8,818,927; 8,819,191; 8,819,659; 8,821,293; 8,832,100;
8,839,387; 8,839,388; 8,843,395; 8,843,396; 8,849,246;
8,867,575; 8,886,162; 8,897,743; 8,897,744; 8,898,079;
8,903,452; 8,903,962; 8,924,549; 8,930,233; 8,958,773;
8,958,779; 8,984,059; 8,989,718; 8,995,968; 8,995,973;
8,995,998; 8,996,666; 8,996,688; 8,996,693; 9,000,917;
9,001,645; 9,001,669; 9,001,676; 9,001,806; 9,001,914;
9,002,006; 9,003,488; 9,008,092; 9,008,693; 9,008,709;
9,009,810; 9,013,983; 9,014,026; 9,014,640; 9,014,914;
9,014,977; 9,015,126; 9,015,228; 9,019,846; 9,020,008;
9,020,697; 9,025,607; 9,025,767; 9,026,609; 9,030,939;
9,031,986; 9,032,053; 9,037,127; 9,037,896; 9,038,197;
9,042,816; 9,043,260; 9,043,323; 9,043,478; 9,046,376;
9,047,766; 9,049,605; 9,049,628; 9,052,208; 9,054,750;
9,055,020; 9,055,105; 9,055,425; 9,055,435; 9,055,596;
9,058,406; 9,059,929; 9,059,942; 9,063,165; 9,066,221;
9,068,839; 9,069,575; 9,071,451; 9,071,533; 9,072,100;
9,075,146; 9,075,801; 9,076,009; 9,076,175; 9,077,772;
9,078,091; 9,078,121; 9,079,311; 9,081,567; 9,082,239;
9,083,627; 9,087,284; 9,087,412; 9,088,493; 9,088,624;
9,088,643; 9,088,983; 9,090,295; 9,093,021; 9,094,049;
9,094,324; 9,094,538; 9,094,781; 9,094,853; 9,097,551;
9,098,420; 9,100,305; 9,100,772; 9,100,793; 9,100,918;
9,100,989; 9,102,330; 9,103,694; 9,103,920; 9,105,053;
9,106,268; 9,106,555; 9,106,672; 9,106,768; 9,107,058;
9,109,915; 9,110,556; 9,110,685; 9,110,939; 9,110,996;
9,112,541; 9,112,649; 9,112,805; 9,112,861; 9,112,871;
9,113,284; 9,113,371; 9,113,373; 9,115,989; 9,117,203;
9,118,539; 9,118,699; 9,119,130; 9,122,532; 9,122,693;
9,122,702; 9,123,078; 9,123,186; 9,124,304; 9,124,403;
9,124,482; 9,125,066; 9,125,211; 9,128,689; 9,129,225;
9,129,333; 9,130,863; 9,131,441; 9,132,913; 9,135,664;
9,137,739; 9,141,618; 9,143,456; 9,143,897; 9,143,912;
9,143,975; 9,144,003; 9,148,280; 9,148,373; 9,154,370;
9,154,407; 9,154,964; 9,154,982; 9,155,068; 9,159,167;
9,160,760; 9,161,158; 9,161,257; 9,166,845; 9,166,908;
9,166,953; 9,167,012; 9,167,426; 9,168,656; 9,168,882;
9,171,110; 9,171,451; 9,172,613; 9,172,636; 9,173,104;
9,176,832; 9,176,924; 9,178,772; 9,179,232; 9,179,308;
9,179,315; 9,179,316; 9,179,353; 9,179,367; 9,182,965;
9,183,552; 9,183,560; 9,185,521; 9,188,451; 9,193,367;
9,195,864; 9,195,980; 9,195,993; 9,196,087; 9,197,380;
9,197,618; 9,198,117; 9,198,203; 9,201,701; 9,201,974;
9,201,979; 9,203,609; 9,203,840; 9,204,374; 9,207,327;
9,207,843; 9,210,045; 9,210,232; 9,210,589; 9,214,988;
9,215,638; 9,215,685; 9,218,216; 9,218,381; 9,218,605;
9,219,682; 9,220,062; 9,223,481; 9,223,859; 9,223,878;
9,225,589; 9,225,616; 9,225,688; 9,225,760; 9,226,218;
9,226,339; 9,228,843; 9,229,946; 9,229,955; 9,230,104;

9,231,850; 9,231,965; 9,231,977; 9,232,352; 9,232,378;
9,232,403; 9,232,458; 9,235,268; 9,235,941; 9,236,904;
9,237,220; 9,237,593; 9,240,018; 9,240,827; 9,240,913;
9,241,248; 9,241,265; 9,244,150; 9,245,051; 9,246,586;
9,246,845; 9,246,882; 9,246,914; 9,246,983; 9,247,396;
9,247,482; 9,247,779; 9,250,686; 9,253,021; 9,253,282;
9,253,816; 9,258,034; 9,258,408; 9,261,368; 9,262,120;
9,264,349; 9,264,435; 9,266,025; 9,269,000; 9,269,059;
9,270,584; 9,270,726; 9,271,023; 9,271,178; 9,274,898;
9,275,376; 9,276,845; 9,276,931; 9,277,400; 9,277,477;
9,277,482; 9,277,503; 9,279,696; 9,280,708; 9,281,865;
9,282,059; 9,282,096; 9,286,473; 9,288,337; 9,288,630;
9,288,660; 9,288,760; 9,290,153; 9,294,141; 9,294,364;
9,294,488; 9,294,878; 9,298,362; 9,299,257; 9,300,569;
9,301,114; 9,304,009; 9,305,002; 9,306,620; 9,306,833;
9,306,841; 9,307,575; 9,311,505; 9,311,670; 9,312,918;
9,313,106; 9,313,275; 9,313,322; 9,313,539; 9,313,800;
9,314,696; 9,317,133; 9,317,378; 9,317,598; 9,319,332;
9,319,390; 9,321,529; 9,323,250; 9,324,033; 9,325,626;
9,325,693; 9,325,827; 9,326,222; 9,330,396; 9,331,744;
9,331,931; 9,332,072; 9,335,893; 9,336,320; 9,337,899;
9,338,065; 9,338,171; 9,338,725; 9,342,886; 9,344,355;
9,344,868; 9,344,894; 9,345,012; 9,347,779; 9,349,293;
9,350,533; 9,350,635; 9,350,645; 9,350,683; 9,350,809;
9,351,144; 9,351,193; 9,354,806; 9,355,144; 9,356,858;
9,356,875; 9,357,331; 9,359,018; 9,360,333; 9,361,794;
9,361,802; 9,363,166; 9,363,651; 9,369,177; 9,369,295;
9,369,351; 9,369,943; 9,370,040; 9,371,099; 9,372,092;
9,372,094; 9,374,134; 9,374,136; 9,374,281; 9,377,924;
9,378,390; 9,378,528; 9,380,586; 9,384,054; 9,384,500;
9,385,933; 9,386,139; 9,386,150; 9,386,443; 9,389,594;
9,390,091; 9,390,137; 9,390,436; 9,391,784; 9,391,878;
9,392,416; 9,392,445; 9,396,040; 9,396,603; 9,398,035;
9,398,110; 9,398,169; 9,398,453; 9,398,467; 9,401,810;
9,401,863; 9,402,189; 9,407,542; 9,407,646; 9,407,702;
9,407,706; 9,411,916; 9,412,021; 9,413,479; 9,413,643;
9,413,689; 9,413,779; 9,414,183; 9,414,348; 9,417,331;
9,417,691; 9,418,340; 9,418,346; 9,419,981; 9,423,263;
9,424,556; 9,424,672; 9,426,020; 9,426,035; 9,426,040;
9,426,228; 9,426,610; 9,426,716; 9,426,769; 9,428,054;
9,429,661; 9,432,172; 9,432,248; 9,432,312; 9,432,359;
9,432,564; 9,436,231; 9,436,300; 9,436,917; 9,439,218;
9,442,935; 9,443,204; 9,443,430; 9,444,598; 9,444,727;
9,445,639; 9,448,079; 9,448,761; 9,449,154; 9,450,642;
9,450,972; 9,450,978; 9,451,383; 9,451,472; 9,451,627;
9,454,772; 9,455,903; 9,455,991; 9,460,213; 9,460,617;
9,461,970; 9,462,040; 9,462,437; 9,465,711; 9,467,440;
9,467,925; 9,469,030; 9,471,925; 9,471,934; 9,472,159;
9,473,364; 9,473,412; 9,473,893; 9,477,664; 9,477,690;
9,477,787; 9,479,441; 9,479,963; 9,483,939; 9,485,153;
9,485,157; 9,485,174; 9,485,673; 9,488,485; 9,489,403;
9,490,419; 9,491,051; 9,491,076; 9,491,564; 9,497,215;
9,499,175; 9,500,486; 9,501,856; 9,503,359; 9,503,466;
9,503,540; 9,504,051; 9,506,763; 9,507,498; 9,507,630;
9,509,792; 9,510,132; 9,510,264; 9,510,347; 9,510,362;
9,514,472; 9,514,717; 9,515,874; 9,515,914; 9,516,025;
9,516,461; 9,518,831; 9,521,158; 9,521,621; 9,525,617;
9,525,986; 9,528,839; 9,529,603; 9,531,635; 9,532,161;
9,534,911; 9,536,074; 9,536,105; 9,536,391; 9,537,457;
9,537,593; 9,541,393; 9,544,018; 9,544,162; 9,544,220;
9,547,828; 9,547,985; 9,549,363; 9,549,364; 9,551,580;
9,552,234; 9,553,728; 9,553,772; 9,553,773; 9,553,796;
9,553,933; 9,553,945; 9,557,188; 9,557,401; 9,558,559;
9,558,660; 9,558,664; 9,558,716; 9,559,750; 9,559,918;
9,562,779; 9,563,440; 9,563,854; 9,565,108; 9,565,111;
9,565,292; 9,565,543; 9,565,549; 9,569,587; 9,569,960;
9,570,046; 9,571,604; 9,574,898; 9,577,914; 9,577,915;
9,582,166; 9,582,242; 9,582,259; 9,584,164; 9,588,498;
9,588,968; 9,589,006; 9,589,108; 9,590,692; 9,590,790;
9,590,896; 9,591,035; 9,591,429; 9,594,499; 9,596,404;
9,600,261; 9,600,494; 9,600,780; 9,602,159; 9,602,379;
9,602,420; 9,602,623; 9,602,729; 9,603,024; 9,603,097;
9,606,619; 9,608,478; 9,608,912; 9,609,459; 9,609,471;
9,609,521; 9,609,552; 9,610,944; 9,612,311; 9,612,741;
9,613,065; 9,613,406; 9,613,527; 9,614,770; 9,615,192;
9,615,264; 9,615,266; 9,615,284; 9,616,993; 9,619,076;
9,619,138; 9,622,063; 9,626,628; 9,628,362; 9,628,371;
9,628,583; 9,629,581; 9,632,664; 9,633,364; 9,634,903;
9,634,928; 9,634,982; 9,635,050; 9,635,159; 9,639,184;
9,639,273; 9,639,346; 9,639,857; 9,641,382; 9,641,542;
9,641,803; 9,641,957; 9,641,994; 9,642,027; 9,645,709;
9,645,732; 9,646,315; 9,647,494; 9,647,884; 9,648,463;
9,651,343; 9,652,720; 9,654,222; 9,654,389; 9,654,478;
9,654,509; 9,654,911; 9,660,745; 9,660,969; 9,660,975;
9,661,451; 9,664,527; 9,665,648; 9,667,423; 9,667,501;
9,667,536; 9,667,716; 9,668,087; 9,668,193; 9,672,332;
9,672,659; 9,673,511; 9,673,858; 9,674,207; 9,674,426;
9,674,698; 9,674,700; 9,675,882; 9,678,660; 9,679,064;
9,684,081; 9,684,773; 9,686,312; 9,689,680; 9,691,287;
9,692,644; 9,693,201; 9,693,375; 9,696,884; 9,697,051;
9,697,175; 9,698,864; 9,698,867; 9,698,872; 9,698,996;
9,699,281; 9,699,375; 9,699,712; 9,703,791; 9,703,892;
9,705,737; 9,705,766; 9,705,914; 9,705,929; 9,706,000;
9,706,127; 9,706,349; 9,710,222; 9,710,480; 9,710,484;
9,710,961; 9,712,433; 9,713,061; 9,715,365; 9,715,780;
9,716,528; 9,716,683; 9,719,789; 9,721,003; 9,721,105;
9,721,612; 9,722,325; 9,722,905; 9,722,909; 9,723,463;
9,723,538; 9,723,653; 9,727,751; 9,727,879; 9,728,084;
9,730,017; 9,734,321; 9,734,457; 9,734,480; 9,735,834;
9,736,056; 9,736,286; 9,736,294; 9,736,650; 9,736,651;
9,742,492; 9,747,503; 9,747,663; 9,749,410; 9,749,600;
9,749,771; 9,749,808; 9,749,979; 9,753,639; 9,754,287;
9,755,711; 9,755,740; 9,756,549; 9,758,092; 9,759,800;
9,760,243; 9,761,132; 9,761,137; 9,762,387; 9,766,089;
9,767,687; 9,769,760; 9,769,821; 9,773,345; 9,774,410;
9,774,522; 9,774,534; 9,776,587; 9,778,050; 9,778,060;
9,778,771; 9,779,102; 9,779,112; 9,781,724; 9,785,149;
9,785,305; 9,785,509; 9,785,975; 9,787,616; 9,787,759;
9,788,234; 9,792,381; 9,792,432; 9,793,948; 9,793,989;
9,794,113; 9,794,179; 9,794,797; 9,794,860; 9,794,977;
9,798,010; 9,798,586; 9,800,493; 9,800,506; 9,800,791;
9,803,986; 9,806,774; 9,807,080; 9,811,589; 9,815,476;
9,818,136; 9,818,304; 9,823,839; 9,826,345; 9,826,368;
9,826,498; 9,830,048; 9,832,242; 9,838,392; 9,838,495;
9,838,496; 9,839,027; 9,841,494; 9,842,135; 9,842,282;
9,843,534; 9,843,647; 9,843,893; 9,846,735; 9,847,889;
9,847,982; 9,848,422; 9,852,381; 9,853,669; 9,853,883;
9,854,055; 9,857,185; 9,857,897; 9,860,140; 9,860,352;
9,860,725; 9,864,572; 9,866,383; 9,866,431; 9,869,561;
9,870,429; 9,870,511; 9,870,537; 9,870,642; 9,871,588;
9,876,747; 9,880,017; 9,880,555; 9,880,735; 9,880,945;
9,881,092; 9,881,384; 9,882,804; 9,883,209; 9,883,323;
9,883,340; 9,883,369; 9,883,507; 9,886,184; 9,886,509;
9,886,795; 9,887,743; 9,887,936; 9,888,021; 9,891,058;
9,891,072; 9,891,811; 9,892,176; 9,893,985; 9,894,158;
9,894,516; 9,895,604; 9,898,244; 9,900,079; 9,900,119;
9,900,169; 9,900,342; 9,900,748; 20040267610;
20050198036; 20060022048; 20070060099; 20070060109;
20070060114; 20070060129; 20070060136; 20070060173;
20070061197; 20070061198; 20070061211; 20070061229;
20070061242; 20070061243; 20070061244; 20070061245;
20070061246; 20070061247; 20070061300; 20070061301;
20070061302; 20070061303; 20070061317; 20070061328;
20070061331; 20070061332; 20070061333; 20070061334;

20070061335; 20070061336; 20070061363; 20070073717; 20070073718; 20070073719; 20070073722; 20070073723; 20070094042; 20070100650; 20070100651; 20070100652; 20070100653; 20070100805; 20070100806; 20070118533; 20070168354; 20070192294; 20070192318; 20070198485; 20070239724; 20070260635; 20070288427; 20080009268; 20080040224; 20080040225; 20080040226; 20080177994; 20080195428; 20080214148; 20080214149; 20080214150; 20080214151; 20080214152; 20080214153; 20080214154; 20080214155; 20080214156; 20080214157; 20080214162; 20080214166; 20080214204; 20080215428; 20080215429; 20080215475; 20080215557; 20080215623; 20080242279; 20080270220; 20080270417; 20090029687; 20090031006; 20090222329; 20090234711; 20090234745; 20090234861; 20090240568; 20090240569; 20090240586; 20090313318; 20100030578; 20100057801; 20100063877; 20100076845; 20100076994; 20100082430; 20100082431; 20100094878; 20100107225; 20100121705; 20100131584; 20100138293; 20100138296; 20100145804; 20100153208; 20100153211; 20100169179; 20100188975; 20100188990; 20100188991; 20100188992; 20100188993; 20100188994; 20100188995; 20100190470; 20100191575; 20100191576; 20100191604; 20100191612; 20100191613; 20100191846; 20100191847; 20100192120; 20100192170; 20100192207; 20100192212; 20100198681; 20100211458; 20100217662; 20100217663; 20100217837; 20100287048; 20100293051; 20100312572; 20110015993; 20110015994; 20110029378; 20110029387; 20110059693; 20110106614; 20110143731; 20110143733; 20110145076; 20110153428; 20110159902; 20110177799; 20110202874; 20110258046; 20110258049; 20110275393; 20110312310; 20110313853; 20110313862; 20110320264; 20110320265; 20110320266; 20110320267; 20110320268; 20110320269; 20110320270; 20110320271; 20110320279; 20110320280; 20110320281; 20110320282; 20120004984; 20120004985; 20120004986; 20120004987; 20120004988; 20120004989; 20120004990; 20120004991; 20120004992; 20120004993; 20120004994; 20120004995; 20120004996; 20120004997; 20120004998; 20120004999; 20120005000; 20120005001; 20120005002; 20120005003; 20120005004; 20120005005; 20120005006; 20120005007; 20120005008; 20120005009; 20120005010; 20120005011; 20120005012; 20120005013; 20120005014; 20120005020; 20120010945; 20120010946; 20120010947; 20120010948; 20120010949; 20120010950; 20120010951; 20120010952; 20120010953; 20120010954; 20120010955; 20120010956; 20120010957; 20120010958; 20120010959; 20120010960; 20120010961; 20120010962; 20120010963; 20120010964; 20120010965; 20120010966; 20120010967; 20120010968; 20120010969; 20120010970; 20120010971; 20120010972; 20120010973; 20120010974; 20120010975; 20120010976; 20120010977; 20120010978; 20120010979; 20120010980; 20120010981; 20120010982; 20120010983; 20120010984; 20120010985; 20120010986; 20120010987; 20120010988; 20120010989; 20120010990; 20120010991; 20120016739; 20120016740; 20120016750; 20120016751; 20120036010; 20120041819; 20120059711; 20120059718; 20120066057; 20120066198; 20120066199; 20120069131; 20120088470; 20120089845; 20120089996; 20120130811; 20120130812; 20120134291; 20120150629; 20120167185; 20120170521; 20120173358; 20120173359; 20120173360; 20120173361; 20120173362; 20120173363; 20120173364; 20120173365; 20120173366; 20120173367; 20120173368; 20120173369; 20120173370; 20120173371; 20120173372; 20120173373; 20120173374; 20120173375; 20120173376; 20120173377; 20120173378; 20120173379; 20120179562; 20120179563; 20120179564; 20120179565; 20120179566; 20120179567; 20120179568; 20120179785; 20120185349; 20120192249; 20120195206; 20120195222; 20120195223; 20120196565; 20120197792; 20120201133; 20120203677; 20120208496; 20120209705; 20120209706; 20120209707; 20120209708; 20120209709; 20120209710; 20120209750; 20120210391; 20120214441; 20120214443; 20120215602; 20120215612; 20120215622; 20120215623; 20120215624; 20120215625; 20120215626; 20120215635; 20120215639; 20120215640; 20120221685; 20120238255; 20120239498; 20120265613; 20120270567; 20120294195; 20120330750; 20130003613; 20130005299; 20130005322; 20130006729; 20130006780; 20130012178; 20130040703; 20130045710; 20130046582; 20130053005; 20130055097; 20130066723; 20130066750; 20130072149; 20130080447; 20130080607; 20130096998; 20130097015; 20130122874; 20130124317; 20130125219; 20130130672; 20130132578; 20130133028; 20130144722; 20130144724; 20130167196; 20130215116; 20130215795; 20130227659; 20130229951; 20130231084; 20130235766; 20130238424; 20130238443; 20130239194; 20130246183; 20130250768; 20130254035; 20130275209; 20130275226; 20130275227; 20130282482; 20130282491; 20130297404; 20130304581; 20130311297; 20130325610; 20140012664; 20140012665; 20140024340; 20140025494; 20140025502; 20140046761; 20140066100; 20140073357; 20140089089; 20140098671; 20140113583; 20140113622; 20140122243; 20140129332; 20140164113; 20140164630; 20140180825; 20140181100; 20140198687; 20140199962; 20140214526; 20140214527; 20140215513; 20140235230; 20140236718; 20140237250; 20140273998; 20140309806; 20140309870; 20140309880; 20140309886; 20140309891; 20140310594; 20140310610; 20140310739; 20140315527; 20140324572; 20140344065; 20140357222; 20150019329; 20150052192; 20150074259; 20150163366; 20150163694; 20150170072; 20150195171; 20150195176; 20150195184; 20150195185; 20150195192; 20150195212; 20150195216; 20150195296; 20150195414; 20150195692; 20150195698; 20150195714; 20150200713; 20150200714; 20150200738; 20150200810; 20150200846; 20150200870; 20150200882; 20150201329; 20150201331; 20150201333; 20150206337; 20150206343; 20150207725; 20150207916; 20150208203; 20150213056; 20150213088; 20150215243; 20150215323; 20150215786; 20150219464; 20150220127; 20150220555; 20150220988; 20150222477; 20150222490; 20150223009; 20150223201; 20150226565; 20150227538; 20150228195; 20150230078; 20150230091; 20150232065; 20150237021; 20150237130; 20150237659; 20150242868; 20150244721; 20150244826; 20150245276; 20150245291; 20150248231; 20150249942; 20150253946; 20150254303; 20150254465; 20150254557; 20150254692; 20150256354; 20150256569; 20150260536; 20150264626; 20150264627; 20150268057; 20150268355; 20150269361; 20150271258; 20150276421; 20150283902; 20150287241; 20150287246; 20150288805; 20150291157; 20150293512; 20150296335; 20150298317; 20150300835; 20150303740; 20150304123; 20150308838; 20150310739; 20150311948; 20150312394; 20150312707; 20150312764; 20150312863; 20150314449; 20150316640; 20150317144; 20150317649; 20150317836; 20150318891; 20150318892; 20150318911; 20150319076; 20150319077; 20150319084; 20150319630; 20150324582; 20150326450; 20150326523; 20150326560; 20150326598; 20150326609; 20150326688; 20150326689; 20150327260; 20150327261; 20150331652; 20150331930; 20150332165; 20150333997; 20150334031; 20150334123; 20150334768; 20150338223; 20150338525; 20150339371; 20150341140; 20150341169; 20150341241; 20150341275; 20150346993; 20150347116; 20150347683; 20150350018; 20150350335; 20150350409; 20150350835; 20150356763; 20150358830; 20150363748; 20150372819; 20150372903; 20150373206; 20150373556; 20150377635; 20150378583;

20150379240; 20150380818; 20150382278; 20160006773; 20160007209; 20160012132; 20160013950; 20160019515; 20160019788; 20160020864; 20160020967; 20160020979; 20160020987; 20160020988; 20160020997; 20160021006; 20160021009; 20160021010; 20160021011; 20160021013; 20160021014; 20160021017; 20160021018; 20160021126; 20160021491; 20160021492; 20160021493; 20160021510; 20160021544; 20160021596; 20160021647; 20160026542; 20160027054; 20160028445; 20160028609; 20160028750; 20160028751; 20160028752; 20160028753; 20160028754; 20160028755; 20160028762; 20160028763; 20160029182; 20160029210; 20160033289; 20160037303; 20160040996; 20160042350; 20160043775; 20160044035; 20160046021; 20160050183; 20160050210; 20160054984; 20160063528; 20160064955; 20160066132; 20160071020; 20160073229; 20160073252; 20160073271; 20160073373; 20160077187; 20160080030; 20160081102; 20160086108; 20160087328; 20160093206; 20160094398; 20160105556; 20160105906; 20160106368; 20160110156; 20160112744; 20160112745; 20160112821; 20160114247; 20160125735; 20160127857; 20160127900; 20160127942; 20160132370; 20160132397; 20160134161; 20160134468; 20160134514; 20160134516; 20160134539; 20160138492; 20160138926; 20160140353; 20160140625; 20160142109; 20160142111; 20160142248; 20160142901; 20160144853; 20160146617; 20160147416; 20160147826; 20160148513; 20160149805; 20160149856; 20160150501; 20160150575; 20160151710; 20160154113; 20160156450; 20160156593; 20160156670; 20160157067; 20160157088; 20160159368; 20160161268; 20160162472; 20160163191; 20160169683; 20160169692; 20160169930; 20160171278; 20160171885; 20160173327; 20160174267; 20160176408; 20160178381; 20160179749; 20160179874; 20160180384; 20160180500; 20160182121; 20160182170; 20160182365; 20160182397; 20160183060; 20160183120; 20160187148; 20160187491; 20160187492; 20160187493; 20160187856; 20160189098; 20160189544; 20160195403; 20160195602; 20160197800; 20160205419; 20160210602; 20160212178; 20160212740; 20160217146; 20160219012; 20160219038; 20160219042; 20160223343; 20160224951; 20160225027; 20160225301; 20160227465; 20160231122; 20160234272; 20160234637; 20160234648; 20160239181; 20160239688; 20160241721; 20160242217; 20160247394; 20160247397; 20160248390; 20160248627; 20160248661; 20160249293; 20160253342; 20160255478; 20160258754; 20160259951; 20160260325; 20160261977; 20160265933; 20160269981; 20160275081; 20160275102; 20160277201; 20160277261; 20160277469; 20160283516; 20160285173; 20160285481; 20160285841; 20160291820; 20160291834; 20160292434; 20160292830; 20160292999; 20160293001; 20160294493; 20160294548; 20160294811; 20160300150; 20160300302; 20160308793; 20160308975; 20160316036; 20160316037; 20160323279; 20160323731; 20160328376; 20160330107; 20160330200; 20160330567; 20160330589; 20160335796; 20160341564; 20160342584; 20160342862; 20160356612; 20160357367; 20160358479; 20160359665; 20160360303; 20160364224; 20160366044; 20160366553; 20160370462; 20160373891; 20160379094; 20160379485; 20160379488; 20160380776; 20160380914; 20160381087; 20170004303; 20170011338; 20170011343; 20170011465; 20170023944; 20170025000; 20170026893; 20170032129; 20170032667; 20170034041; 20170034692; 20170039695; 20170041246; 20170041472; 20170041868; 20170046956; 20170048079; 20170048853; 20170052675; 20170053623; 20170054644; 20170054732; 20170056724; 20170059353; 20170060397; 20170069208; 20170069209; 20170072851; 20170074659; 20170074663; 20170075701; 20170076599; 20170076606; 20170078170; 20170078922; 20170080952; 20170084077; 20170093687; 20170093899; 20170094455; 20170099184; 20170099226; 20170099592; 20170099684; 20170102700; 20170102703; 20170103088; 20170103213; 20170103654; 20170105104; 20170109612; 20170111271; 20170118307; 20170118518; 20170120846; 20170124883; 20170126406; 20170126647; 20170132922; 20170134646; 20170134921; 20170134938; 20170146350; 20170146353; 20170149639; 20170149882; 20170149952; 20170150369; 20170150469; 20170161639; 20170163527; 20170164264; 20170164340; 20170166115; 20170177710; 20170180262; 20170180914; 20170181629; 20170181630; 20170181645; 20170187661; 20170193300; 20170195044; 20170195045; 20170195049; 20170195050; 20170195166; 20170195554; 20170195644; 20170206215; 20170206512; 20170206529; 20170209789; 20170215073; 20170221463; 20170223516; 20170223628; 20170228937; 20170230118; 20170230888; 20170235744; 20170237669; 20170242428; 20170243026; 20170243392; 20170244484; 20170245096; 20170255705; 20170257178; 20170264437; 20170270195; 20170270556; 20170272144; 20170272315; 20170277911; 20170279878; 20170280113; 20170280273; 20170280308; 20170280333; 20170284839; 20170286852; 20170287003; 20170288988; 20170289762; 20170295081; 20170295604; 20170300693; 20170302374; 20170302663; 20170303068; 20170318117; 20170322312; 20170323478; 20170324730; 20170324791; 20170324849; 20170332240; 20170334069; 20170339099; 20170344703; 20170345299; 20170350717; 20170352262; 20170353884; 20170353978; 20170355301; 20170364409; 20170365102; 20170366342; 20170366456; 20170367086; 20170372054; 20170372576; 20170373393; 20170373775; 20170374073; 20170374490; 20180007518; 20180012461; 20180014241; 20180025010; 20180026891; 20180032535; 20180033060; 20180037336; and 20180049043, each of which is expressly incorporated herein by reference in its entirety.

In one form factor, a MANET device comprises a housing, a MANET transceiver radio and battery in the housing, and optionally a communication port for sending or receiving information through the MANET. The communication port is optional, in that a MANET device may serve as a repeater node of the network. A key feature of MANET nodes is that they generally communicate according to a protocol that permits mobility, and this is therefore a differentiating feature from generic ad hoc networks. In order to support mobility, a MANET node (or the vehicle in which it operates) typically has a portable or self-contained power supply, and will often be programmed to support communications within a subset of all nodes which support the same protocol(s). The programming may be updated, and typically, the various nodes of a MANET should execute the same version of the protocol. Another issue for group communications is common availability of hardware. While in some cases, industry standard hardware, such as WiFi (IEEE 802.11 type) transceivers may be used to communicate in an ad hoc network, and thus users may be expected to supply their own hardware, the use of commonly available hardware according to industry standards limits the available types of communications. In particular, WiFi radios tend to have limited range, and this range may be intentionally limited in order to assure frequency reuse in adjacent regions. Thus, WiFi tends to adopt a hub and spoke model network, with a router in the hub, which bridges to another type of network. While WiFi MANETs are known, their application is limited, and long-range communications are difficult to reliably achieve. Therefore, when seeking to deploy a MANET in a new location or venue, such as for use by a number of emergency responders, groups, etc., the logistics of initial setup may be complex or difficult, and remain an unsolved problem.

An example would be server login bypass permissions and radio tuning settings for the MANET transceiver, e.g., the "goTenna Pro" app (goTenna Inc., Brooklyn N.Y.) which requires a login and radio settings files to configure external hardware before operation. Normally these permissions/settings are downloaded from a cloud server, but with a network unavailable, this app and many others would be rendered either completely or near useless.

Thus, while MANETs are known, and provide useful functions, the level of skill required for normal users to successfully deploy and operate a MANET is high, and the risks during deployment are significant.

SUMMARY OF THE INVENTION

The present technology provides a deployment system intended to address one or more of the aforementioned issues.

For example, the kit may provide a transportable server, which provides a hotspot or local area network system for various devices, and which provides a customized redirected home page for the various devices which seek to provision their smartphones with the proper applications, settings, and other data files necessary for field operation. The redirected home page may be customized based on the type of the device accessing the network, and in particular, each browser may identify the respective device and generate a customized page for that device, type of device, application, or any other use-specific contextual information. This permits, upon connection, a relatively simple and obvious pathway for providing customized updates for each device accessing the network. While it might be advantageous to provide Internet or other network access after logging in to the network, this is not required, as a key feature is the availability of downloads from a local area network server, presented automatically, in a context/need-specific manner, based on data presented by the accessing client such as operating system, host application, locale, or any other host of possible variables. This context specific presentation of the proper data and routines to provision a device offline offers a user-friendly manner to deploy offline without technical expertise which hobbles traditional attempts to solve this problem manually.

In the case of a smartphone, the download may be in the form of an "app", for example an Android app (apk file) or Apple iOS app (ipa file), accessible to the user by a hyperlink, from the local server or the like. The download may be a special file type, which is automatically recognized, authenticated, and processed/installed by the user's device, or it may be an app-specific data file requested by its appropriate application (if already on user's phone, or recently installed from the system). In some cases, a file to be downloaded is to be passed to another device, e.g., a firmware file for a peripheral, and therefore the smartphone may not specifically process the file at all. In other cases, an app on the smartphone, either pre-installed, or downloaded through the redirected page, handles further file downloads. The user device may also be a tablet, laptop, or other computational device.

This technology therefore provides a local/location/system/application/venue specific way to provide files to users, which employs an industry standard way for communications, which does not require the user to know the specific list of resources needed, or where to find them. This permits automated control by the administrator of the process with minimal end-user knowledge required.

The local server may be provided in a kit, such as a transport case with a plurality of programmable devices, to facilitate custom deployments. In a preferred embodiment, which is not limiting to the generality of the technology, the transport case has a solution to maintain rechargeable batteries of the devices in a charged, ready-to-go state. For example, the transport case may include a large battery, which can recharge the batteries within a plurality of radio devices, or a single external power supply for recharging the batteries. The transport case may accommodate, for example, 2, 3, 4, 5, 6, 7, 8, 9, 10, 12, 15, 16, 18, 20, 21, 24, 25, 27, 28, 30, 32, 35, 36, 40, 45, or 50 devices, for example.

The kit preferably comprises a local server, which stores one or more distributable copy of the application(s) as well as any desired firmware or supporting data files (such as configuration settings or map data). In a typical deployment scenario, each user has a smartphone that operates according to industry standard protocols, permits private software distribution, and provides a user interface. For example, most Android phones would meet these criteria. On the other hand, Apple restricts third-party downloads, but permits private software distribution through the iOS Enterprise Developer program.

The local server preferably acts as a WiFi access point, which is available for user's smartphones. Each user would open a WiFi connection, and be automatically presented with a "pop up" screen (e.g., captive portal) directing them to the proper resources for their context/need, or they may be redirected to the same guiding screen via a browser. Since a custom app may not yet be available to the user, a browser-based interface is provided, which may authenticate and track the users, and provide a link to a download to the user's smartphone, such as an Android "apk" file or Apple "ipa" file. Once the app is downloaded and installed, the user may interface to the local server through the app automatically, or via browser interfaces.

In a preferred embodiment, the app, after installation, may then pair the smartphone with an auxiliary device, such as a particular MANET transceiver, for example by Bluetooth communications, and check the firmware of the auxiliary device to ensure that it is properly updated. Typically, auxiliary devices are provided within the transport case and are already updated to the desired firmware version, but this is not required.

The local server may communicate with the various devices within the kit, to monitor state of battery, firmware version and capabilities, and other parameters, before deployment. The communication may be through a micro USB port or USB type C port, which provides wired charging and communications. Alternately, the local server may communicate with the devices through Bluetooth, and wireless charging. If the communications with the local server are wireless, the devices may be programmed to enter a sleep mode, and wake up periodically to report their status and return to sleep. For example, the wake cycle may be once per hour, and the communication may be one or a few packets of information. The local server may also send a hibernate commend, for example when the transport case is in transport on an airplane, to suppress spurious communications for a specified duration, e.g., 8 hours. Preferably, the local server sets wakeup timers on the devices which expire at different times, to avoid collisions at the end of the cycle. The local server, for example, can wake up for 5 minutes per hours, and program the devices to report at some time during that 5 minutes. When not in deployment/servicing mode, this system would in a preferred embodiment be synchronized and updated itself via a connection with another remote cloud server—or may also be provisioned with new files/data manually through SD cards or other digital storage mediums.

The local server may perform inventory management, by logging the identity of a user who is associated with a particular device, for example to ensure return of the hardware, and to track user who may be in the field.

In some deployment scenarios, the local server is located within range of the auxiliary device, which may be a MANET transceiver, during operation. Therefore, if the local server has a MANET transceiver associated with it, it can monitor and engage in MANET communications. Thus, the local server can archive communications, provide files to users, receive streams of communications from users, and reliably bridge the available networks. For example, the local server may be a tablet or laptop computer, and may have access to a cellular network, satcom link, wired or wireless Internet access, etc. While other nodes may also provide these services, in many scenarios, it is desired to minimize power consumption by the auxiliary devices and the smartphones, to prolong life. The local server as part of the kit may have a large battery, or may be powered by a reliable power main, and thus significantly reduced power constraints. Further, with respect to bridging to other networks, the local server and transport case may be placed in a convenient fixed location for the duration of a deployment, and thus need not be limited by mobility constraints.

The local server may in some cases be a "supernode" for the various auxiliary devices or user smartphones/devices, or otherwise have special purposes or properties, though this is not required. Indeed, in some deployment scenarios, the local server is not reliably within range of one or more devices, and therefore may have no active role during the deployment.

In some cases, the deployment kit is rented or otherwise has a use which is monitored for accountability and accounting. For example, the kit may be provided to a first responder unit on a pay-as-you-go plan, such that the usage of the devices is tracked, and the amount of usage (e.g., number of devices, amount of data, time, location, etc.) monitored and used as a basis of billing. The server may track the usage by simply monitoring when devices are removed from associated slots in the case, or by communications with each respective device after it is returned to the case. The local server can then, after deployment, report to a distant server or cloud system, the amount of usage for billing purposes. The local server can also receive diagnostic and error messages from the devices, which can be processed locally within the local server, or communicated to a distant server. For example, a battery may become weak and in need of replacement, or communication capability of a device may be impaired or degraded. Further, based on diagnostic and error messages, a different firmware may subsequently be deployed in a particular location or venue, to overcome interference or other local conditions.

The deployment kit therefore may include one or more of the following functions:

Transport of a set of auxiliary devices to a deployment site;

Transportable power for recharging batteries of the devices and/or smartphones;

Downloading of application software to smartphones;

Downloading of firmware to devices, either directly or through a smartphone;

Bridging between communication networks;

Data delivery services for the devices or smartphones during active deployment;

Storage and logging of communications;

Logging of users and association of user with respective device; and

Accounting functions.

It is therefore an object to provide a deployment system, comprising a web and file server which controls a wireless hotspot, and which generates a customized redirect page that provides one or more download links for the user device(s) or automatic presentation of appropriate data for automated processes, which may be fully customized based on the user, the browser, operating system, location, or app used to access the hotspot, the user's device type, or other factors.

Another object provides a local software deployment system, comprising a server, configured to: provide an access point for a wireless network; redirect an incoming request to a uniform resource locator (URL) selectively customized based on characteristics of the requestor; receive a request from the device, dependent on an object content associated with the uniform resource locator, through the wireless network, to download a file from the server; and download the file from the server. This permits an automated process to occur without manual involvement.

Another embodiment provides the local server in a rapid deployment kit, having a transport case; a power supply, within the transport case; a plurality of devices, configured to fit within the transport case, having a first state wherein they are maintained within the transport case, and connected to a circuit for battery charging from the power supply, and a second state wherein they are removed from the transport case and are available for mobile use.

The local server may be configured to: provide an access point for a wireless network; present an option, through the wireless network, to a device connected to the server through the wireless network, to download a file from the server; and communicate directly with the plurality of ad hoc network transceivers.

It is another object to provide a rapid deployment ad hoc network transport case, comprising: a power supply; a plurality of slots, each slot configured to accept respective hardware and having an electrical connector interface for charging a rechargeable battery in the hardware from the power supply; and a server, configured to: provide an access point for a wireless network; present an option, through the wireless network, to a user device connected to the server through the wireless network, to download a file from the server; and communicate directly with the plurality of ad hoc network transceivers through the respective electrical connector interfaces in each of the plurality of slots.

It is a further object to provide a local software deployment system, comprising a server, configured to provide an access point for a wireless network; redirect an incoming request to at least one of a web page and a uniform resource locator, selectively customized based on characteristics of the requestor; at least one of: (a) present an option, through the wireless network, on the customized web page or target of the uniform resource locator, to a device connected to the server through the wireless network, to download a file from the server, selectively dependent on the customization based on the characteristics of the requestor; or (b) a request from the device, dependent on an object content associated with the customized web page or uniform resource locator, through the wireless network, to download a file from the server; and download the file from the server. The incoming request may be for a web page, and the option presented through the wireless network, on the web page. The incoming request may also be to a uniform resource locator, and the request received from the device to download a file from the server.

It is a still further object to provide a device transport case, comprising: a battery; a plurality of slots, each slot configured to receive a respective device and having an interface for charging a rechargeable battery in the respective device from the battery; and an electrical interface for a server, configured to communicate directly with the plurality of devices through the respective interfaces for each of the plurality of slots. The system may further comprise a plurality of the respective devices, interfaced within a respective plurality of slots for charging the respective rechargeable battery of each respective device.

The hotspot or wireless network may be an IEEE 802.11 compliant network.

The transport case may be compliant with one or more of ATA spec 300, Fed Std 101C, and MIL-STD-810F.

The power supply may comprise a rechargeable battery, a 120 VAC power entry module, and/or a 12 VDC input.

The server may comprise a Linux server, a Microsoft Windows® server, an Apple MacOS server, or a Google Android server, for example.

Other objects will become apparent.

BRIEF DESCRIPTION OF THE DRAWINGS

FIG. 1 shows a rapid deployment kit according to the present invention.

DETAILED DESCRIPTION OF THE PREFERRED EMBODIMENT

The present solution provides a portable and lightweight "smart server" inside of a briefcase form factor transport case, that is capable of hosting the files that would normally hosted in the cloud, and distributed through app stores, and instead stores them locally for access and installation when the Internet is unavailable.

The present technology adds a layer of critical user-friendly intelligence that makes off-grid app deployment something that requires that the end-user have no particular technical experience. Leveraging normal WiFi hotspot technology, the local server is able to quickly establish a data connection with any smartphone using a common, industry standard wireless interface. Upon connecting over WiFi, the local server is able to automatically leverage another common smartphone interface, the "captive portal" function which enables the server to trigger a small pop-up screen on any modern smartphone.

This pop-up screen is what provides the beginning of the unique user experience. The pop up screen, effectively a mobile web browser screen, is able to detect the specific operating system of mobile device which has just connected (like iOS or Android), and use that information to present a filtered list of available applications for that operating system on a common browser screen.

The user now has to only tap on the application they wish to download on to their phone and the smart server delivers the download. For Android this is a regular file download. For Apple iOS, the smart server executes a platform-specific protocol for the installation of Enterprise-signed applications without use of the iOS Store.

As the final step, upon initiating the download, the server provides a new browser screen with operating system-specific installation instructions.

The local server is capable of also storing any requisite app-specific data like, map and settings files in its own databases. Indeed, the local server can maintain a broad range of maps, and only download a subset of the maps to the smartphone app. A properly configured client application (which would be the case after downloading from the local server and installing according to the provided instructions) that knows how to query the local server appropriately for its requisite data files, the local server can deliver those critical files to a connected user off-grid.

The local server is not only able to connect to smartphones to provide services via WiFi, it is also configured to interface with other electronic devices over USB (or other available I/O ports). The deployment kit may be connected to a power and data array of e.g., 30 USB ports, to which various devices connect to for charging and optionally firmware update services.

The local server may be configured to automatically scan all ports and similar to its ability to detect iOS/Android when it connects over WiFi, it is capable of detecting and interfacing with compatible hardware over its other ports. Upon connection of a device to the local server, the local server can check the firmware status (e.g., version check) of the device. The local server will then compare the reported firmware version to an active firmware file which it has stored locally. If it finds that there is a mismatch between the firmware file it has active in the local server, and a specific unit's firmware identification, it can automatically deliver that firmware file to the device, and control the device through the update. In some cases, the device may not employ a shadow firmware update process, and therefore the device may be at risk of a failed update in an inoperative state. In this case, the local server can automatically test the firmware for errors, and reload all or a portion of the firmware that contains errors. In this case, the local server plays the role of a bootloading master device. If the device includes its own bootloader, the job of the local server ends upon delivering the firmware file as the device then takes care of the installation. However, the local server does monitor to ensure the installation was successful, and if not, can redeliver the files or trigger factory resets and other recovery mechanisms.

Operationally, when the local-server is not in "deployment mode", i.e., it its home location, it is expected to be connected through the Internet to a cloud service that provides it with its appropriate files, e.g., apps, app-supporting data, firmware, etc. For example, the transport case includes an AC power entry module, or 10-24 VDC input (e.g., 12 V nominal unregulated from a car), and is plugged in to a power main, and the local server connects through a wireless network, e.g., WiFi or 4G wireless, to the Internet or a private network. The local server may also have an SD-card slot or USB interface to permit a properly configured set of external data to be side-loaded into the local server, without requiring external communications. This allows the UI/UX services it provides to be leveraged even if the data didn't get in via the cloud beforehand. Other interfaces are of course possible.

The local server, or the transport case, may have a GPS receiver, and therefore know its location. Indeed, even if neither the local server nor the transport container have GPS, a geolocation may be obtained from the various smartphones, or manually entered through a user interface.

In some cases, the local server may interface with an optional Internet access solution, satellite hub, for backhaul, or app install validation (something iOS requires). Where the local server is set up in a command center, an HDMI port may be provided for large screen viewing of deployment data, or communications, for example. A touchscreen may also be supported. A user-developed custom application may be supported.

While the local server may be a tablet computer or laptop as discussed above, the limited functionality also permits a light-weight computer, such as a Raspberry Pi 3 model B, see en.wikipedia.org/wiki/Raspberry_Pi; elinux.org/RPi_Hub. www.raspberrypi.org/documentation/hardware/raspberrypi/README.md, each of which is expressly incorporated herein by reference in its entirety.

The local server is preferably available for arbitrary user programming, though its core functions of app and firmware distribution, are preferably isolated from optional functions. The local server may provide Ethernet (e.g., wired networking) and WiFi (e.g., wireless networking) interfacing, Bluetooth, USB for input and/or output devices, storage, video input and output, micro-SD for data storage and retrieval, audio interface, etc.

The transport case may include storage for various accessories, such as antennas, peripherals, rechargers and cables, and the like, so that all the elements needed for the deployment, except the smartphone, are provided in a single case.

The local server may also distribute other information, apps, or plugins, to the user's smartphones, separate from the device functions. The software app on the smartphone may provide a bridge to permit other apps to communicate over a network established within the venue, and thus relieve the need for the app to control all communications directly. For example, the app may bridge to the TCP/IP protocol of the smartphone. However, if this is not firewalled, the capacity of the network could be overwhelmed. Therefore, if the app permits protocol bridging, to provide a generic interface for other communications, it also implements a strict filtering and bandwidth management. The app may also communicate with the operating system and other apps on the phone using various APIs and protocols known in the art and available in, for example, an Android 7 or 8, or iOS 10 or 11, for example.

Another way to communicate between apps is through Bluetooth; while direct app-to-app communications may be limited, Bluetooth messages may be relayed to as respective device, and then returned to the smartphone, and received by a registered app for that message.

Thus, the users may have various needs, which can be fulfilled by the local server.

The preferred embodiment, shown in FIG. 1, provides:

APP DEPLOYMENT

Wirelessly install any app to your iOS and Android devices completely off-grid.

A/C & AUXILIARY POWER

Accepts A/C and auxiliary external power sources for operation and long-term storage.

LOCAL SERVER HOSTING

Integrated 64-bit 1.5 GHz Ubuntu Linux computer can support any local tactical server needs.

TOUCHSCREEN 7-inch touchscreen display enables intuitive and rapid operation.

DEVICE MAINTENANCE

Charge, transport, and automatically execute radio software updates.

COMPACT & LIGHTWEIGHT

Designed to fulfill commercial airline carry-on requirements. The kit is provided in a form factor weighing in at less than 25 pounds (11.34 kg), 19.2"×15.2"×7.3".

CLOUD SYNC

Automatically syncs with the goTenna Pro Management Portal to ensure all software is up-to-date over WiFi.

RUGGED

Secure and transport devices in a MILSPEC (e.g., MIL C-4150-J) Pelican™ case, e.g., Pelikan IM2400 Storm case, www.pelicancases.com/Storm-iM2400-P389.aspx.

POWER BANK

Built-in rechargeable power for over 30 full charges of goTenna Pro devices.

REMOTE COMMUNICATIONS

Optional integrated satellite BGAN backhaul station.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. It is intended that the specification and examples be considered exemplary only with the true scope and spirit of the invention indicated by the following claims. All examples illustrate embodiments of the invention, but should not be viewed as limiting the scope of the invention.

What is claimed is:

1. A local software deployment system, comprising:
    a transport case;
    a power supply, within the transport case;
    a plurality of electronic devices each comprising a rechargeable battery, configured to fit within the transport case, each respective electronic device having a first state wherein a respective electronic device is maintained within the transport case, and connected to a circuit for recharging the rechargeable battery from the power supply, and a second state wherein the respective electronic device is disconnected from the circuit, removed from the transport case, and available for mobile use as a mobile ad hoc network transceiver powered by the rechargeable battery, the plurality of electronic devices being configured to together form a mobile ad hoc network; and
    a local area network server comprising an IEEE 802.11 wireless network interface, within the transport case, configured to:
        redirect an incoming request received through the IEEE 802.11 wireless network from a requestor comprising a smartphone to a customized web page generated by the local area network server, selectively customized based on information included within the request;
        present an option, on the customized web page, to download a file comprising provisioning information for interaction of a respective requestor and a respective electronic device from the local area network server, selectively dependent on the customization of the customized web page; and, dependent on an object content associated with the customized web page, through the wireless network, to download a file from the local area network server; and
        download the file from the local area network server.

2. The local software deployment system according to claim 1, wherein the incoming request is to a first web page, and the option is presented through the IEEE 802.11 wireless network, on the redirected customized web page distinct from the first web page.

3. The local software deployment system according to claim 1, wherein the file comprises an executable program.

4. The local software deployment system according to claim 3, wherein the executable program comprises software selectively authenticated for a respective type of electronic device.

5. The local software deployment system according to claim 3, wherein the executable program comprises software selectively authenticated for a respective requestor.

6. The local software deployment system according to claim 1, wherein the server comprises a Linux server.

7. The local software deployment system according to claim 1, wherein the transport case is compliant with ATA spec 300.

8. The local software deployment system according to claim 1, wherein the transport case is compliant with Fed Std101C.

9. The local software deployment system according to claim 1, wherein the transport case is compliant with MIL-STD-810F.

10. The local software deployment system according to claim 1, wherein the power supply comprises a rechargeable battery.

11. The local software deployment system according to claim 1, wherein the power supply comprises an AC power entry module.

12. The local software deployment system according to claim 1, wherein the power supply comprises a 10-24 VDC input.

13. The local software deployment system according to claim 1, wherein the respective electronic devices each communicate with the smartphone using a Bluetooth communications .

14. A mobile deployment system, comprising:
a transport case;
a power supply within the transport case;
a plurality of slots within the transport case, each slot configured to receive and release a respective electronic device and having an interface for charging, from the power supply, a rechargeable battery in the respective electronic device comprising a mobile ad hoc network transceiver powered by the rechargeable battery, the plurality of electronic devices being configured to together form a mobile ad hoc network;
an IEEE 802.11 wireless network access point; and
a local area network server, configured to:
communicate directly with the plurality of electronic devices through the respective interfaces for each of the plurality of slots;
communicate indirectly with the plurality of devices through respective smartphones;
redirect incoming requests received through the IEEE 802.11 wireless network access point to a respective customized web page, selectively customized based on information provided by respective smartphone making a respective request, each respective customized web page comprising an option to download a configuration file from the local area network server for communication with a respective electronic device associated with the respective smartphone, selectively dependent on the customization of the customized web page, to provision the respective electronic device to act as a node of a mobile ad hoc network comprising the plurality of electronic devices; and
download the configuration file to the respective smartphone upon selection of the option.

15. The mobile deployment system according to claim 14, further comprising a plurality of the respective electronic devices, interfaced within the respective plurality of slots within the transport case.

16. The mobile deployment kit according to claim 15, wherein the transport case further comprises a power entry module selected from one or more of the group consisting of a 10-24 VDC power entry module and an AC power entry module, configured to receive external power and to energize the power supply.

17. The mobile deployment kit according to claim 16, wherein the power supply comprises a rechargeable battery.

18. A local software deployment method, comprising:
providing a local server associated with an IEEE 802.11 wireless network interface within a transport case having a power supply, the transport case further comprising a plurality of slots configured to receive a plurality of electronic devices, each respective electronic device comprising a rechargeable battery, and being configured to fit within a respective slot in the transport case, each respective electronic device having a first state wherein a respective electronic device is maintained within the slot in transport case, and connected to a circuit for recharging the rechargeable battery from the power supply, and a second state wherein the respective electronic device is disconnected from the circuit, removed from the slot in transport case, and available for use as a mobile ad hoc network transceiver powered by the rechargeable battery, the plurality of electronic devices being configured to together form a mobile ad hoc network;
redirecting an incoming request received through the IEEE 802.11 wireless network interface from a requestor comprising a smartphone to a customized web page generated by the local area network server, selectively customized based on information included within the request;
presenting an option, on the customized web page, to download a file comprising provisioning information for interaction of a respective requestor and a respective electronic device from the local area network server, selectively dependent on the customization of the customized web page, dependent on an object content associated with the customized web page, through the wireless network, to download a file from the local area network server; and
downloading the file from the local area network server.

19. The local software deployment method according to claim 18, wherein:
the incoming request is to a first web page, and the option is presented on the redirected customized web page distinct from the first web page; and
the file comprises an executable program, selectively authenticated for a respective electronic device.

* * * * *